United States Patent
Guillon et al.

(10) Patent No.: US 11,609,124 B2
(45) Date of Patent: Mar. 21, 2023

(54) METHOD FOR MEASURING SEVERAL WAVEFRONTS INCOMING FROM DIFFERENT PROPAGATION DIRECTIONS

(71) Applicants: UNIVERSITE DE PARIS, Paris (FR); CENTRE NATIONAL DE LA RECHERCHE SCIENTIFIQUE (CNRS), Paris (FR); INSTITUT NATIONAL DE LA SANTE ET DE LA RECHERCHE MEDICALE (INSERM), Paris (FR); SORBONNE UNIVERSITE, Paris (FR)

(72) Inventors: Marc Guillon, Versailles (FR); Gilles Tessier, Paris (FR); Tengfei Wu, Nanterre (FR); Pascal Berto, Paris (FR)

(73) Assignees: UNIVERSITE DE PARIS, Paris (FR); CENTRE NATIONAL DE LA RECHERCHE SCIENTIFIQUE (CNRS), Paris (FR); INSTITUT NATIONAL DE LA SANTE ET DE LA RECHERCHE MEDICALE (INSERM), Paris (FR); SORBONNE UNIVERSITE, Paris (FR)

( * ) Notice: Subject to any disclaimer, the term of this patent is extended or adjusted under 35 U.S.C. 154(b) by 0 days.

(21) Appl. No.: 17/487,313

(22) Filed: Sep. 28, 2021

(65) Prior Publication Data
US 2022/0099499 A1    Mar. 31, 2022

(30) Foreign Application Priority Data

Sep. 29, 2020   (EP) .................................. 20306121

(51) Int. Cl.
*G01J 9/00*   (2006.01)
*G06T 7/32*   (2017.01)
(Continued)

(52) U.S. Cl.
CPC .............. *G01J 9/00* (2013.01); *G02B 5/30* (2013.01); *G06T 7/32* (2017.01); *G06T 7/37* (2017.01);
(Continued)

(58) Field of Classification Search
None
See application file for complete search history.

(56) References Cited

U.S. PATENT DOCUMENTS 5,448,053 A * 9/1995 Rhoads ..................... G01J 9/00
356/121

OTHER PUBLICATIONS

Yang et al., "Multiple-object Shack-Hartmann wavefront sensor design for a wide field of view on the retina", Chinese Optics Letters, col. 13, vol. 12 dated 2015, pp. 120801-1 through 120801-5.
(Continued)

*Primary Examiner* — Shadan E Haghani
(74) *Attorney, Agent, or Firm* — Shumaker, Loop & Kendrick, LLP

(57) ABSTRACT

A method for determining wavefront shapes of N angular channels $C_L$ of different propagation directions $P_L$, said propagation directions $P_L$ being determined by a mean propagation direction vector $\vec{u_L}$, from a single signal image acquisition I(x,y) of a multi-angular signal light beam containing said angular channels, each angular channel Ci being separated from other angular channels Cj by an angular separation $\Delta\alpha_{ij}$ defined by $\Delta\alpha_{ij}=\arccos(\vec{u_i}\cdot\vec{u_j})$, where "·" stands for the inner product between $\vec{u_i}$ and $\vec{u_j}$.

34 Claims, 20 Drawing Sheets

(51) Int. Cl.
   G06T 7/50    (2017.01)
   G06T 7/37    (2017.01)
   H04N 5/232   (2006.01)
   G02B 5/30    (2006.01)
   H04N 5/225   (2006.01)

(52) U.S. Cl.
   CPC .......... *G06T 7/50* (2017.01); *H04N 5/2256* (2013.01); *H04N 5/23229* (2013.01); *H04N 5/23299* (2018.08); *G06T 2207/20081* (2013.01); *G06T 2207/20084* (2013.01)

(56) References Cited

OTHER PUBLICATIONS

Aknoun et al., "Quantitative retardance imaging by means of quadri-wave lateral shearing interferometry for label-free fiber imaging in tissues", Optics Communications, vol. 422 dated 2018, pp. 17-27.

European Search Report for EP 20306121 completed Mar. 15, 2021 (1 page).

Pascal Berto et al. "Wavefront-sensing with a thin diffuser", arxiv.org, Cornell University Library, 201 Olin Library Cornell University Ithaca, NY, 14853, Optics Letters, Oct. 10, 2017, XP081295668.

Sam Schott et al." Characterization of the angular memory effect of scattered light in biological tissues", Optics Express, vol. 23, No. 10, p. 13505-13516, May 14, 2015.

John D. Perreault, "Triple Wollaston-prism complete-Stokes imaging polarimeter", Optics Letters, vol. 38, No. 19, p. 3874-3877, Oct. 1, 2013.

E.J. Candes, "Compressive sampling", In Proceedings of the international congress of mathematicians, vol. 3, pp. 1433-1452, Aug. 2006.

Nikolas Klaus Metzger et al., "Harnessing speckle for a sub-femtometre resolved broadband wavemeter and laser stabilization", Nature Communications, vol. 8, 15610, Jun. 2017 (8 pages).

* cited by examiner

METHOD FOR MEASURING SEVERAL WAVEFRONTS INCOMING FROM DIFFERENT PROPAGATION DIRECTIONS

TECHNICAL FIELD

The present invention relates to an optical system for laser beam characterization, quantitative phase imaging and other applications.

BACKGROUND

Wavefront sensors, referred to as WFS in the following, are used to measure the wavefront of a light beam, defined as its curvature relative to a planar wavefront shape. They find applications in several domains ranging from laser beam metrology to quantitative phase imaging of biological objects and astronomy.

A WFS is typically composed of a phase or intensity mask placed before an intensity detector, a camera for example. The mask is used to create an intensity pattern on the camera. First, a reference beam is sent onto the WFS, with a planar wavefront or any other a priori known reference wavefront to measure a reference intensity pattern. Next, a signal beam is sent onto the WFS and generates a signal intensity pattern. The intensity pattern changes due to the wavefront change, even in the absence of intensity modulation, because of the mask that is placed before the intensity detector. In a typical WFS, the change in the intensity pattern corresponds to a complex geometrical distortion: Every point of the signal intensity pattern is translated when compared to the reference intensity pattern. If the reference intensity pattern is obtained using a planar wavefront, a translation vector maps $\vec{s}$ is proportional to a transverse component of the local wave vector $\vec{k}_\perp$ of the impinging beam:

$$\frac{\vec{k}_\perp}{k_0} = \frac{\vec{s}}{d}$$

where $k_0$ is the wavenumber and d is the distance between the mask and the camera. The sought-for wavefront can typically be identified to be the optical path difference $\delta$, which can be computed thanks to an integration:

$$\nabla \delta = \frac{\vec{k}_\perp}{k_0}$$

The wavefront measurement is obtained thanks to a reconstruction algorithm that: i) computes a translation map between the signal intensity pattern and the reference intensity pattern ii) integrates the translation map, applying the proper proportionality coefficient to get the wavefront change, and iii) adds the reference wavefront to the wavefront change.

All current WFS can only measure a single intensity pattern, and thus a single wavefront per image acquisition. However, if the light beam is composed of several beams originating from different sources emitting at different propagation directions, each of which exhibiting a different wavefront, all these wavefronts cannot be reconstructed simultaneously. The reconstruction algorithm will converge towards a solution but this result is physically meaningless.

All current WFS enables only measuring the different wavefronts contained in the multi-angular light beam using sequential acquisitions.

Angular multiplexing of several wavefront, i.e. simultaneous angular-wavefront measurement, is of interest for many applications such adaptive optics and diffractive tomography:

Adaptive optics can improve the performance of an optical system by measuring its aberrations, which can be digitally or physically compensated for. As illustrated in FIG. 1A, the aberration measurement is usually performed in the pupil of the optical system using a wavefront sensor. By analyzing the wavefront incoming from a guide star S1; S2, or point source in the object plane, the resolution of the image around the guide star can be improved. However, as its aberrations generally vary in the field of view, the correction will only be efficient in a limited area around the analyzed guide star called "isoplanatic patch". To improve the performance of the optical system over a wide field of view it is necessary to measure the wavefront incoming from different point-source located in the field of view, in different isoplanetic patch. In the pupil, this means measuring different wavefronts incoming from different propagation directions. The current technical solution consists in recording as many sequential measurements as the number of distinct guide stars Si.

Optical Diffraction Tomography, also called Tomographic Diffractive Microscopy or Quantitative Phase Tomography, gives access to the 3D refractive index map n(x,y,z) of an object. In classical implementation, several wavefront (or quantitative phase images) are usually acquired in transmission mode under multiple illumination angles, as illustrated in FIG. 1B. Each wavefront then provide the 2D projection of the refractive index distribution of the object $\varphi(x,y) \propto \int n(x,y,z)dz$. from which the 3D refractive index n(x,y,z) can be estimated. However, sequential acquisition is hardly compatible with high speed 3D refractive imaging and Tomographic flow cytometry.

Recent work based on the use of a periodic phase mask demonstrates angular wavefront multiplexing but only for a limited number of wavefronts and dynamic phase ranges (L. Yang et al, Chinese optics letter 2015), as can be shown in FIG. 2. As illustrated, A Shack-Harmann WFS can detect the wavefront of several beams simultaneously by angular multiplexing. However, due to the periodic structure of the intensity pattern in this case, only a small number of beams can be multiplexed.

It is desirable to have a WFS that obviates all or part of the above-mentioned drawbacks and that makes it possible to determine the wavefront shapes of a multi-angular signal light.

SUMMARY OF THE INVENTION

First Embodiment—Small Memory-Effect Range

Exemplary embodiments of the invention aim to satisfy the need for a single-shot multi-angular wavefront measurement and relate to a method for determining wavefront shapes of N angular channels $C_L$ of different propagation directions $P_L$, said propagation direction being determined by mean propagation direction vectors $\vec{u}_L$, from a single signal image acquisition I(x,y) of a multi-angular signal light beam containing said angular channels, each angular channel Ci being separated from other angular channels Cj by an angular separation $\Delta\alpha_{ij}$ defined by $\Delta\alpha_{ij}=\arccos(\vec{u}_i \cdot \vec{u}_j)$, where "·" stands for the inner product between $\vec{u}_i$ and $\vec{u}_j$, with a device comprising an optical assembly made at least of an optical mask and an imaging sensor for generating and recording intensity patterns of incident beams, by having these beams reflect on, or propagate through, the optical mask, the optical mask having the optical properties:
  i) to cause the intensity pattern to depend on the wavefront shape, so that a tilt applied to the wavefront shape, with said tilt being smaller than an angular memory effect $\delta\alpha$ of said optical mask, results in a local displacement amount of the intensity pattern, and
  ii) for two incident beams $M_n$, $M_m$ of respective propagation directions determined by mean propagation direction vectors $\vec{u_n}$, $\vec{u_m}$, respectively, said incident beams $M_n$, $M_m$ having a same wavefront shape and separated from each other by a separation angle defined by $\Delta\alpha_{mn}=\arccos(\vec{u_m} \cdot \vec{u_n})$ larger than the angular memory effect $\delta\alpha$, to produce uncorrelated intensity patterns over a surface area A of the imaging sensor, two uncorrelated random intensity patterns being defined as statistically orthogonal relatively to a zero-mean cross-correlation product, the angular memory effect $\delta\alpha$ being smaller than angular separations $\Delta\alpha_{ij}$ of angular channels $C_L$:

$$\delta\alpha > \Delta\alpha_{ij}, \text{ for all } i, j \in [1, N], \text{ with } i \neq j$$

the method comprising:
  a) providing several reference intensity patterns $R_L(x,y)$, wherein each reference intensity pattern $R_L(x,y)$ corresponds to a respective propagation direction $P_L$, L varying between 1 and N, x and y being coordinates,
  b) recording one single signal image I(x,y) of the intensity pattern generated by said multi-angular signal light beam which comprises the N propagation directions $P_L$, using the device, the single signal image I(x,y) being representative of light impinging on the at least one surface area A;
  c) computing intensity-weight data $W_L^I(x,y)$ and deformation data $T_L^I(x,y)$, for all L varying from 1 to N, the intensity-weight data $W_L^I(x,y)$ and the deformation data $T_L^I(x,y)$ being representative of an intensity modulation and a diffeomorphism, respectively, of each given reference intensity pattern $R_L(x,y)$, at propagation direction $P_L$, for the single signal image I(x,y),
all the N intensity-weight data $W_L^I(x,y)$ and the N deformation data $T_L^I(x,y)$ being computed, for L varying from 1 to N, so as to minimize, for all sampling points (x,y) of the surface area A, from the single signal image I(x,y):
a difference $D_A$ between the single signal image I(x,y) on the one hand, and the sum of reference intensity patterns $R_L$ multiplied by intensity-weight data $W_L^I(x,y)$ and deformed by deformation data $T_L^I(x,y)$, on the other hand:

$$D_A = \left\| I(x, y) - \sum_{L=1}^{N} W_L^I(x, y) R_L\left[(x, y) + T_L^I(x, y)\right] \right\|_A$$

the symbol $\|.\|_A$ designating a norm calculated for all (x,y) sampling points in the surface area A;

for the surface A, each given reference intensity patterns $R_L(x,y)$ being orthogonal to each reference intensity pattern $R_K(x,y)$ relatively to the zero-mean cross-correlation product, when K natural number different from L and chosen between [1; N];
  d) generating data for each propagation direction $P_L$ representative of:
the shape of the wavefront by integrating the deformation data $T_L^I(x,y)$,
the intensity map based on the weight $W_L^I(x,y)$.

The invention enables to simultaneously measure wavefront shapes at different propagation directions using a single image acquisition from a same multi-angular light beam. This aspect is advantageous for a variety of applications such as optical metrology, laser metrology, quantitative phase microscopy, diffractive tomography (Biology, chemistry . . . ), adaptive optics, ophthalmology and optical thermometry.

The method according to the invention may present several advantages compared to known methods in the related art: i) it allows to multiplex more wavefronts as compared to wavefront sensor based on periodic phase mask, ii) it is easy to implement and it may yield a more compact measurement system, iii) it performs multi-angular measurement simultaneously which makes possible its application to quickly evolving system or moving object, iv) in diffractive tomography, it reduces the cost and robustness of the measurement by avoiding the use of angular scanning devices.

The term "signal intensity pattern" refers to a distribution of signal intensity wherein different regions of the pattern have different amounts or degrees of signal intensity. The signal intensity pattern may be a speckle pattern, characterized by a randomly distributed point-like intensity structure.

The term "mean propagation direction vector" refers to a three-dimensional unit vector whose pointing direction may be determined by the angular barycenter of the intensity distribution at infinity.

The term "diffuser" should be understood as any element that scatters light, that is to say any material that is able to diffuse specular light, i.e. light with a primary direction, to a diffuse light, i.e. light with random or pseudo-random light direction and phase delays. For instance, a diffuser can be an engineered pseudo-diffuser made of a metasurface.

By "uncorrelated intensity patterns", it should be understood that, given a measure of similarity, the intensity patterns are not related to each other. For example, the position of maxima intensity in a pattern is not related to the position of maxima spot in the other. An additional example is encountered when the cross-correlation product is used as a measure of similarity. In this case, the statistical average of the zero-mean cross-correlation product between two uncorrelated signal intensity patterns is uniformly zero. The zero-mean cross correlation product between two signals $S_1$ and $S_2$ is defined as $\langle (S_1-\langle S_1\rangle)*(S_2-\langle S_2\rangle)\rangle_A$, where $\langle .\rangle_A$ stands for surface averaging over a surface area A.

Uncorrelated intensity patterns relatively to the zero-mean cross correlation product is of specific interest because it provides a simple mathematical mean to estimate the deformation data $T_L^I(x,y)$, the intensity weight data $W_L^I(x,y)$ and thus of the minimum of $D_A$. If reference intensity patterns $R_L(x,y)$ are exactly orthogonal to one another for all $L\in[1,N]$ relatively to the cross-correlation product, and if $T_L^I(x,y)$ and $W_L^I(x,y)$ are constant over the surface area A, then $T_L^I(x,y)$, and $W_L^I(x,y)$ can be directly obtained from the N cross-correlation images $C_A(I,R_L)=(I-\langle 1\rangle_A)*(R_L-\langle R_L\rangle_A)$.

Each of the N cross-correlation image exhibits a peak: the intensity-weight data $W_L'(x,y)$ is the amplitude of this peak and the deformation data $T_L'(x,y)$ is the displacement vector between the said peak or its centroid, from the center of the zero-mean cross-correlation product image $C_A(I, R_L)$.

The term "memory effect" is a property of an optical mask predicting that a tilt in the wavefront, results in a translation of the intensity pattern at a distance behind the optical mask. This assumption remains valid in a so-called memory effect angle range $\delta\alpha$. Considering two incoherent incident beams being separated by an angular separation $\Delta\alpha$, In these embodiments, the optical mask exhibits a small memory effect angle $\delta\alpha < \Delta\alpha$. In this case, the optical mask may produce two uncorrelated intensity patterns over the surface of the imaging sensor. In particular, in a given area A of the imaging sensor, the two intensity patterns are also uncorrelated.

The measured wavefront shapes may be characteristic of some aberrations introduced by an optical system, a biological tissue or the atmosphere.

The method may comprise at step a), recording said reference intensity patterns $R_L(x,y)$ using the device, each reference intensity pattern $RL(x,y)$ being generated by a respective reference incident beam L with propagation direction $P_L$, L varying from 1 to N.

The Optical Mask

The optical mask may have a memory effect angle ranging from 0° to 180°.

Preferably, the optical mask comprises at least one diffuser, notably an engineered pseudo-diffuser. Advantageously, said engineered pseudo-diffuser has the property to produce intensity patterns that are substantially orthogonal relatively to the zero-mean cross-correlation product over at least one surface area A, for a plurality of respective incident beams of different propagation directions having a same wavefront shape.

Comparatively to microlens arrays and gratings usually used in methods in the related art, diffusers have the advantage to be of relatively low-cost.

Preferably, the optical mask comprises a plurality of diffusers, notably a plurality of engineered pseudo-diffusers.

The optical mask may be a transmission optical mask or a reflective optical mask.

An optical mask working in transmission may comprise, for example, etched glass or silica substrate, ground glass, opal glass, sandblasted glass or plastic, etched glass or plastic, molded materials produced by a randomly textured mold, nano or micro-particles as in paints, deposited on a transparent substrate.

Preferably, the transmissive optical mask includes a patterned surface such as a computer-designed wrinkled surface.

A reflective optical mask may include a rough surface such as sandblasted metal, plastic or ceramic, or etched metal, plastic, or ceramic, or molded materials produced by a rough mold, or paint deposited on a substrate, or combinations thereof.

diffractive optical element.

The optical mask may comprise at least one optical fiber bundle, a metasurface, or a freeform optical element.

The optical mask may comprise a plurality of optical fiber bundles, of metasurfaces, or of freeform optical elements.

The optical mask may comprise at least one array of micro-optical elements, each micro-optical element generating on the imaging sensor an intensity pattern different from the intensity pattern generated by the micro-optical elements located at least in its vicinity.

The optical mask may comprise a plurality of arrays of micro-optical elements as described here above.

The optical mask may comprise at least an array of micro-lenses with random aberration or an array of micro-lenses randomly arranged spatially.

The optical mask may comprise a plurality of arrays of micro-lenses with random aberration or a plurality of arrays of micro-lenses randomly arranged spatially.

The optical mask may comprise any combination thereof.

The Imaging Sensor

The imaging sensor may be a monochromatic sensor or a color sensor.

The imaging sensor may be a matrix-imaging sensor.

The imaging sensor may be, for example, a CCD, CID or CMOS imaging sensor.

The imaging sensor may be based on a single pixel detector coupled to a spatial light modulator like a digital micro-mirrors device.

The intensity pattern image may be produced by one matrix-imaging sensor or several matrix-imaging sensors.

The optical mask may be placed at a distance d from the imaging sensor ranging from 0 to up to more than $$10\frac{D}{\theta},$$

where D is the size of me imaging sensor and $\theta$ the scattering angle of the optical mask.

The at least one surface A may cover at least 4 pixels of the imaging sensor surface, preferably ranging from 4 pixels to 100% of the imaging sensor surface.

An intermediate optical system may be placed between the optical mask and the imaging sensor, the said optical system imaging the diffuser at a distance d from the imaging sensor. The advantage of this optical system being to allow a fine-tuning of both the magnification and the distance between the image of the optical mask and the imaging sensor plane.

The intermediate optical system may comprise at least one lens. For example, the intermediate optical system may consist of a Galileo telescope.

The Light Beam

The light beam may comprise several beams originating from different sources emitting at different propagation directions.

The light beam may be generated from a single incoherent source.

The light beam may be generated from a plurality of incoherent sources.

The light beam may be generated from a plurality of separate LEDs or lasers.

In particular, the light beam is generated using several point sources or guide stars emitting coherently or not, for example fluorescent or luminescent point sources, located in an object plane at different point x, y, z and generating different propagation directions on the WFS in a Fourier plane.

The multi-angular signal light beam may be generated by illuminating a polarization assembly located before the optical assembly by an initial light beam containing at least one angular channel, so that different polarization states of said initial light beam are encoded into different angular channels CL of the multi-angular signal light beam.

The polarization state of a transverse wave can be conveniently described by the two dimensional complex Jones vector. The Jones vector thus involves four coefficients. Among these four degrees of freedom, one stands for the intensity.

An alternative description of the polarization state, closer to experimental measurements, consists in describing the polarization state thanks to the Stokes parameters: $S_0$, $S_1$, $S_2$ and $S_3$. In any cases, the knowledge of these four coefficients provides full information about the intensity (Intensity=$S_0$), the polarization degree $$p = \frac{\sqrt{S_1^2 + S_2^2 + S_3^2}}{S_0}$$

and the polarization state $$\left(\psi = \frac{1}{2}\arctan\left(\frac{S_2}{S_1}\right), \chi = \frac{1}{2}\arctan\left(\frac{S_3}{\sqrt{S_1^2 + S_2^2}}\right)\right)$$

of the beam. The polarization state of the beam can be linear (in any direction, $S_3=0$, $\chi=0$), circular (of right or left handedness, $S_1=S_2=0$, $S_3=+/-1$, $\chi=\pm\pi/4$), or any elliptical geometry (of any orientation and eccentricity). Experimentally, the Stokes parameters can be determined in a single shot by using a combination of wollaston prisms and retardation phase plates as in (Perreault, John D. "*Triple Wollaston-prism complete-Stokes imaging polarimeter.*" Optics letters 38.19 (2013): 3874-3877).

Preferably, the polarization assembly contains at least one polarization optic.

The polarization optic may be a quarter wave-plate, a half-waveplate, a polarizer, a Wollaston prism, a Glan-Taylor polarizer, a Glan-Thomson polarizer, a Rochon prism a Nomarski prism or any other polarization dependent optic, so that different polarization states of the initial light beam are encoded into different angular channels CL of the multi-angular signal light beam.

The Reference Beams

The reference angular beams L may arise from the output of an optical system having a reference configuration and said reference incident beams L may have distinct wavefront shapes.

In some embodiments, the reference incident beams have a same known wavefront shape, which may be planar or spherical, for instance.

Reference beams may have angular separation ranging from 0.0001° to 180°.

The number of reference intensity patterns for which the spatial correlation data are computed may be larger than 2.

The reference incident beams may have a same wavefront shape, or not.

Depending on the application, the wavefront shapes of the reference incident beams must be known, or not. In its principle, a WFS can only measure a wavefront change.

In applications aiming to measure the wavefront shapes of the signal light beam, the wavefront shape of the reference intensity patterns $R_L(x,y)$ must be known.

However, if imaging a biological sample for instance, one may be only interested in the wavefront change associated with the sample. In this case, the wavefront shapes associated with each reference intensity patterns $R_L(x,y)$ is not of interest and may be unknown.

According to some embodiments, signal sub-images I'(x,y), notably macro-pixels, each representative of light impinging on a portion A' of the at least one surface area A, are extracted from the single signal image I(x,y). The advantage of extracting sub-images may be to simplify the computation of data by involving smaller images and simpler weight and deformation data.

The signal sub-image may cover at least 4 pixels of the one signal image, up to 100% of the intensity pattern image I(x,y).

The signal sub-image I'(x,y) may be a macro-pixel whose size is larger than or equal to 2 pixels of the imaging sensor, preferentially larger than N pixels, with N the number of angular channels, in which case deformation data $T_L^I(x,y)$ and intensity weight data $W_L^I(x,y)$ may be assumed to be constant over the macro-pixel surface area.

Wavefront Determination Method

As mentioned above, calculation of deformation data $T_L^I(x,y)$ and intensity-weight data $W_L^I(x,y)$ results from the minimization of $D_A$ defined as:

$$D_A = \left\| I(x,y) - \sum_{L=1}^{N} W_L^I(x,y) R_L[(x,y) + T_L^I(x,y)] \right\|_A$$

where $\|.\|_A$ is a norm, typically the quadratic norm. $\|.\|_A$ can also be a so-called $L_1$ norm or any other norm defined mathematically.

Several numerical techniques are possible to compute such a norm minimization.

For instance, intensity-weight data $W_L^I(x,y)$ and deformation data $T_L^I(x,y)$ may be computed thanks to deep learning approaches using neuronal networks. Convolutional neuronal networks are typically suited to achieve such image processing. In deep learning approaches, the algorithm leading to minimizing $D_A$ are preferably be trained thanks to a collection of signal images, references intensity patterns with respective N wavefronts known.

Alternatively, intensity-weight data $W_L^I(x,y)$ and deformation data $T_L^I(x,y)$ may be computed thanks a genetic algorithm. In this approach, a large number of collection of would-be solutions are randomly tested, evaluated, selected according to the value of $D_A$ and best solutions are crossed to one another to generate more optimal solutions. The algorithm terminates when reaching a satisfactory enough solution minimizing $D_A$.

Alternatively, deformation data $T_L^I(x,y)$ and intensity-weight data $W_L^I(x,y)$ can be estimated by splitting the surface area A into several smaller surface portions A'.

$T_L^I(x',y')$ and $W_L^I(x',y')$, with (x',y') coordinates on A', are then estimated for each surface portion A' and for every propagation direction $P_L$ by:

i) Assuming that $W_L^I(x',y')=W'_L$ and $T_L^I(x',y')=T'_L$ where $W'_L$ is a constant and positive scalar and $T'_L$ a constant two-dimensional translation vector, over the surface portion A', with (x',y') coordinates on A', ii) computing the intensity-weight data $W'_L$ and the deformation data $T'_L$, between the signal sub-image I'(x,y) and each of the reference intensity patterns $R_L(x,y)$ so as to minimize, for the corresponding surface area A', the difference $D_{A'}$;

$$D_{A'} = \left\| I(x,y) - \sum_{L=1}^{N} W'_L R_L[(x,y) + T'_L] \right\|_{A'}$$

iii) updating the deformation data $T_L^I(x,y)$ and the intensity data $W_L^I(x,y)$ for all coordinates (x,y) on the surface A by applying the equality $T_L^I(x,y)=T_L^I(x',y')=T'_L$ and $W_L^I(x,y)=W_L^I(x',y')=W'_L$ with $x=x',y=y'$.

For example, when the imaging sensor is a matrix imaging sensor, the surface portion A' corresponds to the surface of a macro-pixel whose size is larger than or equal to 2 pixels of the imaging sensor. In this case, the surface A of the imaging sensor may be expressed as a sum of a surface portions Ai.

In this example, the method comprises in step c, where the surface $A=\Sigma Ai$, with Ai being the surface of a macro-pixel:
  computing intensity-weight data $W_L^I(Ai)$ and deformation data $T_L^I(Ai)$ which are constant for the macro-pixel of surface Ai, for all L varying from 1 to N, by minimizing the difference $D_{Ai}$,
  updating the intensity-weight data $W_L^I(x,y)$ and the deformation data $T_L^I(x,y)$ for all coordinates (x,y) on the surface A,
  with $W_L^I(x,y)=W_L^I(Ai)$ and $T_L^I(x,y)=T_L^I(Ai)$ for all (x,y) belongs to Ai.

Relying on sub-images enables to work at a local scale. At a local scale the signal intensity pattern may be a linear combination of simply translated reference intensity patterns $R_L(x,y)$ and pattern deformations may be neglected, making algorithms simpler. In this case, the local translation of the signal intensity pattern is proportional to the local tilt of the wavefront. The size of the sub-images depends on geometrical and physical parameters of the WFS.

The intensity-weight data $W_L^I(x,y)$ and the deformation data $T_L^I(x,y)$, notably in the case when the signal sub-images are linear combinations of locally translated reference intensity patterns $R_L(x,y)$, may be estimated by several simple computational means.

In some embodiments, The intensity-weight data $W_L^I(x,y)$ and the deformation data $T_L^I(x,y)$, may be obtained by using a Digital Image Correlation method, notably by computing cross-correlation product images, for each signal sub-image, between the signal sub-image and each of the reference intensity patterns $R_L(x,y)$, the plurality of reference incident beams L being uncorrelated relatively to the cross-correlation product, the cross-correlation product image between the signal sub-image and each of the intensity patterns $R_L(x,y)$ having a peak, the intensity-weight data being the amplitude of the peak and the deformation data $T_L^I(x,y)$ being the translation vector between the said peak or its centroid from the center of the cross-correlation product image.

Alternatively, the intensity-weight data $W_L^I(x,y)$ and the deformation data $T_L^I(x,y)$, may be obtained by computing a Wiener deconvolution of the signal sub-images by the reference intensity patterns $R_L(x,y)$, or a Wiener deconvolution of the intensity patterns $R_L(x,y)$ by the signal sub-images. These Wiener deconvolution having a peak, the intensity-weight data $W_L^I(A)$ being the amplitude of the peak and the deformation data $T_L^I(A)$ being the displacement vector between the said peak or its centroid, from the center of the zero-mean cross-correlation product image.

Alternatively, the deformation data $T_L^I(x,y)$ and intensity-weight data $W_L^I(x,y)$ can be estimated by computing a matrix inversion algorithm, where the matrices to be inverted being related to at least a transform of a sub-image of a reference intensity pattern $R_L(x,y)$, such as a Fourier transform. Matrix inversion can involve for instance Moore-Penrose pseudo-inversion, singular value decomposition, Tikhonov regularization, etc.

In the case when the signal sub-images are linear combinations of locally translated reference intensity patterns $R_L(x,y)$ or conversely, when local deformation of the reference intensity patterns cannot be neglected over the sub-images area A', the intensity-weight data $W_L^I(x,y)$ and deformation data $T_L^I(x,y)$ may be computed thanks to more elaborated algorithms, notably:

a) for every sub-images, an iterative optimization algorithm aiming at minimizing a mean-squared-difference between the experimental signal intensity pattern and the signal intensity pattern retrieved from reference intensity pattern deformation. This minimization can be carried out numerically relying for instance on genetic type algorithms, or steepest descent algorithm.

b) Intensity-weight data $W_L^I(x,y)$ and deformation data $T_L^I(x,y)$ may be computed thanks to a compressed sensing algorithm. A description of compressed sensing theory can be found, for instance, in Candès, E. J. (2006, August), *Compressive sampling*, In Proceedings of the international congress of mathematicians (Vol. 3, pp. 1433-1452) and in references cited therein.

Such compressed sensing algorithm enables to simultaneously minimize two quantities, one of which being the root mean squared error between the experimental data (the signal intensity beam) and the rebuilt data. The other quantity to be minimized here is the number of non-zero coefficients in each translation image.

Other minimization reconstruction algorithms may also be used.

Other Technical Features

Generating wavefront data comprises integrating displacement data $T_L^I(x,y)$ over at least one direction of the at least one image and may comprise adding the known reference wavefront shapes, which may be simply planar or spherical.

In some embodiments, the reference wavefront shapes are not known but may arise from the system in a reference configuration. The single signal intensity beam must then be recorded after a slight modification of the system, for instance, the introduction of an optically thin sample in the optical path of the optical light beam. In this case, the wavefronts obtained by integrating displacement data $T_L^I(x,y)$ are then directly the measure of the wavefront deformation introduced by the sample.

Second Embodiment: Large Memory Effect Range

Further embodiments of the invention relate to a method for determining wavefront shapes of N angular channels $C_L$ of different propagation directions $P_L$, said propagation directions $P_L$ being determined by mean propagation direction vectors $\vec{u_L}$, from a single signal image acquisition I(x,y) of a multi-angular signal light beam containing said angular channels, each angular channel Ci being separated from other angular channels Cj by an angular separation $\Delta\alpha_{ij}$ defined by $\Delta\alpha_{ij}=\arccos(\vec{u_i}\cdot\vec{u_j})$, where "·" stands for the inner product between $\vec{u_i}$ and $\vec{u_j}$, with a device comprising an optical assembly made at least of an optical mask and an imaging sensor for generating and recording intensity patterns of incident beams, by having these beams reflect on, or propagate through, the optical mask, the optical mask having the optical properties:
  i) to cause the intensity pattern to depend on the wavefront shape, so that a tilt applied to the wavefront shape, with said tilt being smaller than an angular memory effect $\delta\alpha$ of said optical mask, results in a local displacement amount of the intensity pattern, and ii) for two incident beams $M_n$, $M_m$ of respective propagation directions $P_n$, $P_m$ determined by mean propagation direction vectors $\vec{u_n}$ and $\vec{u_m}$, respectively, said incident beams having a same wavefront shape and separated from each other by a separation angle defined by $\Delta\alpha_{nm}=\arccos(\vec{u_m}\cdot\vec{u_n})$ smaller than the angular memory effect $\delta\alpha$, ie $\Delta\alpha_{mn}<\delta\alpha$, to produce uncorrelated intensity patterns over at least one surface area $A_n$ of the imaging sensor, the surface area $A_n$ having a largest spatial extent $L_{An}$ smaller that $\Delta\alpha_{nm}\cdot d$, with d being a separation distance between the optical mask and the imaging sensor, two uncorrelated random intensity patterns being defined as statistically orthogonal relatively to a zero-mean cross-correlation product, the angular memory effect $\delta\alpha$ being larger than angular separations $\Delta\alpha_{ij}$ of angular channels $C_L$:

$$\delta\alpha > \Delta\alpha_{ij}, \text{ for all } i, j \in [1, N], \text{ with } i \neq j$$

the method comprising,
a) providing several reference intensity patterns $R_L(x,y)$, wherein each reference intensity pattern $R_L(x,y)$ corresponding to a respective propagation direction $P_L$, L varying from 1 to N, x and y are coordinates;
b) recording one single signal image $I(x,y)$ of the intensity pattern generated by said multi-angular signal light beam which comprises the N propagation directions $P_L$, using the device, the single signal image $I(x,y)$ being representative of light impinging on a surface area A of the imaging sensor; the surface A comprising the at least one surface portion $A_n$;
c) for the at least one surface portion $A_n$:
i) extracting a signal sub-image $I'(x,y)$, representative of light impinging on the at least one surface portion $A_n$, from the single signal image $I(x,y)$:

$$I(x, y) = I'(x, y) \text{ with } (x, y) \in A_n,$$

ii) computing intensity-weight data $W_L^I(x,y)$ and deformation data $T_L^I(x,y)$, with $(x,y)$ coordinates of the surface portion $A_n$, for all L varying from 1 to N, the intensity-weight data $W_L^I(x,y)$ and the deformation data $T_L^I(x,y)$ being representative of an intensity modulation and a diffeomorphism, respectively, of each given reference intensity pattern $R_L(x,y)$, at propagation direction $P_L$, for the signal sub-image $I'(x,y)$,
all the N intensity-weight data $W_L^I(x,y)$ and the N deformation data $T_L^I(x,y)$ being computed, for L varying from 1 to N, so as to minimize, for all sampling points $(x,y)$ of the surface portion $A_n$, from the signal sub-image $I'(x,y)$:
a difference $D_{An}$ between the single signal image $I(x,y)$ on the one hand, and the sum of reference intensity patterns $R_L$ multiplied by intensity-weight data $W_L^I(x,y)$ and deformed by deformation data $T_L^I(x,y)$, on the other hand:

$$D_{A_n} = \left\| I'(x, y) - \sum_{L=1}^{N} W_L^J(x, y) R_L\big[(x, y) + T_L^J(x, y)\big] \right\|_{A_n}$$

the symbol $\|.\|_{A_n}$ designating a norm calculated for all $(x,y)$ sampling points in the surface portion $A_n$;

for the surface portion $A_n$ each given reference intensity patterns $R_L(x,y)$ being orthogonal to each reference intensity pattern $R_K(x,y)$ relatively to the zero-mean cross-correlation product, when K natural number different from L and chosen between [1; N];
iii) generating data for each propagation direction $P_L$ representative of:
the shape of the wavefront by integrating the deformation data $T_L^I(x,y)$,
the intensity map based on the weight $W_L^I(x,y)$.

In these embodiments, the optical mask exhibits a large memory effect angle $\delta\alpha>\Delta\alpha$, where $\Delta\alpha$ is the separation angle between two angular beams. In this case, the optical mask may produce two similar intensity patterns on the imaging sensor but shifted by a quantity $\Delta\alpha\cdot d$, where d is a distance between the optical mask and the matrix sensor. However, in a given area $A_n$ having a large spatial extend $L_{An}<\Delta\alpha\cdot d$, the two intensity patterns are locally uncorrelated.

The measured wavefront shapes may be characteristic of some aberrations introduced by an optical system, a biological tissue or the atmosphere.

The method may comprise at step a), recording said reference intensity patterns $R_L(x,y)$ using the device, each reference intensity pattern $R_L(x,y)$ being generated by a respective reference incident beam L with propagation direction $P_L$, L varying from 1 to N.

In alternative embodiments, step a) comprises:
recording at least one reference intensity patterns $R_K(x,y)$, preferably a single reference intensity pattern $R_K(x,y)$, using the device, K being between 1 and N; and
if necessary, generating numerically the other intensity patterns $R_L(x,y)$, L being between 1 and N different from K, using the recorded intensity patterns.

In particular, step a) comprises recording a single intensity pattern $R_K(x,y)$. The other N−1 $R_L(x,y)$, with L different from K are generated numerically using the recorded intensity pattern $R_K(x,y)$.

Preferably, the other intensity patterns $R_L(x,y)$ are generated by applying a simple translation transformation to the recorded reference intensity pattern $R_K(x,y)$.

For example, the other intensity patterns $R_L(x,y)$ may be generated by:
achieving a cross-correlation product of the single signal image $I(x,y)$ and the recorded reference pattern $R_K(x,y)$, the cross-correlation product image between the signal image and each of the recorded intensity patterns $R_K(x,y)$ having N maxima, and
shifting spatially the recorded reference pattern $R_K(x,y)$ to the corresponding position based on each maximum position in order to generate the corresponding reference intensity pattern reference $R_L(x,y)$.

These embodiments take advantage of the fact that the intensity patterns obtained for a plurality of respective incident angular beams of different propagation directions with the same wavefront are identical but shifted by an amount $\Delta\alpha\cdot d$, with d being a separation distance between the optical mask and the imaging sensor, and $\Delta\alpha$ being the separation angle of incident angular beams.

According to some embodiments, step a) may comprise:
recording a reference intensity pattern $R_K(x,y)$ corresponding to a propagation direction $P_L$ different from the propagation directions $P_L$ contained in the single signal image $I(x,y)$ using the device, and
generating numerically the all N intensity patterns $R_L(x,y)$ using the recorded intensity pattern Rk $(x,y)$, with L varying from 1 to N.

Preferably, at step a) generating the N reference intensity patterns comprises:

- achieving a cross-correlation product of the single signal image I(x,y) and the recorded reference pattern $R_K(x,y)$, the cross-correlation product image between the signal image and each of the recorded intensity patterns $R_K(x,y)$ having N maxima, and
- shifting spatially the recorded reference pattern $R_K(x,y)$ to the corresponding position based on each maximum position in order to generate the corresponding reference intensity pattern reference $R_L(x,y)$.

The Optical Mask

The optical mask may have a memory effect angle ranging from 0° to 180°.

In some embodiments, the optical mask may have an infinite angular memory effect.

Preferably, the optical mask comprises at least one diffuser, notably an engineered pseudo-diffuser. Advantageously, said engineered pseudo-diffuser has the property to produce intensity patterns that are substantially orthogonal relatively to the zero-mean cross-correlation product over at least one surface portion $A_n$, for a plurality of respective incident beams of different propagation directions having a same wavefront shape.

The optical mask may comprise a plurality of diffusers, notably a plurality of engineered pseudo-diffusers.

Comparatively to microlens arrays and gratings usually used in methods in the related art, diffusers have the advantage to be of relatively low-cost.

The optical mask may be a transmission optical mask or a reflective optical mask.

An optical mask working in transmission may comprise, for example, etched glass or silica substrate, ground glass, opal glass, sandblasted glass or plastic, etched glass or plastic, molded materials produced by a randomly textured mold, nano or micro-particles as in paints, deposited on a transparent substrate.

Preferably, the transmissive optical mask includes a patterned surface such as a computer-designed wrinkled surface.

A reflective optical mask may include a rough surface such as sandblasted metal, plastic or ceramic, or etched metal, plastic, or ceramic, or molded materials produced by a rough mold, or paint deposited on a substrate, or combinations thereof.

The optical mask may comprise at least one diffractive element.

The optical mask may comprise a plurality of diffractive elements.

The optical mask may comprise at least one optical fiber bundle, a metasurface, or a freeform optical element.

The optical mask may comprise a plurality of optical fiber bundles, of metasurfaces, or of freeform optical elements.

The optical mask may comprise at least an array of micro-optical elements, each micro-optical element generating on the imaging sensor an intensity pattern different from the intensity pattern generated by the micro-optical elements located at least in its vicinity.

The optical mask may comprise a plurality of arrays of micro-optical elements as described here above.

The optical mask may comprise at least one array of micro-lenses with random aberration or an array of micro-lenses randomly arranged spatially.

The optical mask may comprise a plurality of arrays of micro-lenses with random aberration or a plurality of arrays of micro-lenses randomly arranged spatially.

The optical mask may comprise any combination thereof.

The Imaging Sensor

The imaging sensor may be a monochromatic sensor or a color sensor.

The imaging sensor may be a matrix-imaging sensor.

The imaging sensor may be, for example, a CCD, CID or CMOS imaging sensor.

The imaging sensor may be based on a single pixel detector coupled to a spatial light modulator like a digital micro-mirrors device.

An intermediate optical system may be placed between the optical mask and the imaging sensor, the said optical system imaging the diffuser at a distance d from the imaging sensor. The advantage of this optical system being to allow a fine-tuning of both the magnification and the distance between the image of the optical mask and the imaging sensor plane.

The intermediate optical system may comprise at least one lens. For example, the intermediate optical system may consist of a Galileo telescope.

The intensity pattern image may be produced by one matrix-imaging sensor or several matrix-imaging sensors.

The optical mask may be placed at a distance d from the imaging sensor ranging from 0 to up to more than $$10\frac{D}{\theta},$$

where D is the size of the imaging sensor and θ the scattering angle of the optical mask.

The at least one surface $A_n$ may be a macro-pixel whose size is larger than or equal to 2 pixels of the imaging sensor.

The at least one surface $A_n$ has a largest spatial extent $L_{An}$ $L_{A_n} < \Delta\alpha_{ij} \cdot d$.

The surface A may cover at least 4 pixels of the imaging sensor surface, preferably ranging from 4 pixels to 100% of the imaging sensor surface.

The surface A may comprise at least 2 surfaces $A_n$, each surface $A_n$ having a largest spatial extent $L_{An}$ with $L_{A_n} < \Delta\alpha_{ij} \cdot d$.

When the imaging senor is a matrix imaging sensor, the surface A is advantageously expressed as a sum of a plurality of surface portions An, each surface portion $A_n$ having a largest spatial extent $L_{A_n} < \Delta\alpha_{ij} \cdot d$:

$$A = \sum_n A_n$$

The method may comprise, at step c, computing intensity-weight data $W_L'(A_n)$ and deformation data $T_L'(A_n)$ for each surface portion $A_n$ for all L varying from 1 to N, by minimizing the differences $D_{An}$ for each surface portion $A_n$.

The Light Beam

The light beam may comprise several beams originating from different sources emitting at different propagation directions.

The light beam may be generated from a single incoherent source.

The light beam may be generated from a plurality of incoherent sources.

The light beam may be generated from a plurality of separate LEDs or lasers.

Alternatively, the light beam is generated using several point sources or guide stars emitting coherently or not, for example fluorescent or luminescent point sources, located in an object plane at different point x, y, z and generating different propagation directions on the WFS in a Fourier plane.

The multi-angular signal light beam may be generated by illuminating a polarization assembly located before the optical assembly by an initial light beam containing at least one angular channel, so that different polarization states of the initial light beam are encoded into different angular channels CL of the multi-angular signal light beam.

The polarization state of a transverse wave can be conveniently described by the two-dimensional complex Jones vector. The Jones vector thus involves four coefficients. Among these four degrees of freedom, one stands for the intensity.

An alternative description of the polarization state, closer to experimental measurements, consists in describing the polarization state thanks to the Stokes parameters: $S_0$, $S_1$, $S_2$ and $S_3$. In any cases, the knowledge of these four coefficients provides full information about the intensity (Intensity=$S_0$), the polarization degree $$p = \frac{\sqrt{S_1^2 + S_2^2 + S_3^2}}{S_0}$$

and the polarization state $$\left(\psi = \frac{1}{2}\arctan\left(\frac{S_2}{S_1}\right), \chi = \frac{1}{2}\arctan\left(\frac{S_3}{\sqrt{S_1^2 + S_2^2}}\right)\right)$$

of the beam. The polarization state of the beam can be linear (in any direction, $S_3=0$, $\chi=0$), circular (of right or left handedness, $S_1=S_2=0$, $S_3=+/-1$, $\chi=\pm\pi/4$), or any elliptical geometry (of any orientation and eccentricity). Experimentally, the Stokes parameters can be determined in a single shot by using a combination of wollaston prisms and retardation phase plates as in (Perreault, John D. "*Triple Wollaston-prism complete-Stokes imaging polarimeter.*" Optics letters 38.19 (2013): 3874-3877)

Preferably, the polarization assembly may contain at least one polarization optic.

The polarization optic may be a quarter wave-plate, a half-waveplate, a polarizer, a Wollaston prism, a Glan-Taylor polarizer, a Glan-Thomson polarizer, a Rochon prism a Nomarski prism or any other polarization dependent optic, so that different polarization states of the initial light beam are encoded into different angular channels CL of the multi-angular signal light beam.

The Reference Beams

The reference angular beams L may arise from the output of an optical system having a reference configuration and said reference incident beams L may have distinct wavefront shapes.

In some embodiments, the reference incident beams have a same known wavefront shape which may be planar or spherical, for instance.

Reference intensity patterns RL(x,y) may have angular separation ranging from 0.000001° to 180°.

The number of reference intensity patterns for which the spatial correlation data are computed may be larger than 2.

The reference incident beams may have a same wavefront shape, or not.

Depending on the application, the wavefront shapes of the reference incident beams must be known, or not. In its principle, a WFS can only measure a wavefront change.

In applications aiming to measure the wavefront shapes of the signal light beam, the wavefront shape of the reference intensity patterns $R_L(x,y)$ must be known.

However, if imaging a biological sample for instance, one may be only interested in the wavefront change associated with the sample. In this case the wavefront shapes associated with each reference intensity patterns $R_L(x,y)$ is not of interest and may be unknown.

Wavefront Determination Method

As mentioned above, for the at least one surface portion $A_n$ of the surface A, deformation data $T_L^I(x,y)$ and intensity-weight data $W_L^I(x,y)$ are calculated by minimizing the distance $D_{A_n}$ defined as:

$$D_{An} = \left\| I'(x,y) - \sum_{L=1}^{N} W_L^I(x,y) R_L\left[(x,y) + T_L^I(x,y)\right] \right\|_{A_n}$$

where $\|.\|_{A_n}$ is a norm, typically the quadratic norm $\|.\|_{A_n}$ can also be a so-called $L_1$ norm or any other norm defined mathematically.

Several numerical techniques are possible to compute such a norm minimization.

The intensity-weight data $W_L^I(x,y)$ and the deformation data $T_L^I(x,y)$, may be obtained by using a Digital Image Correlation method, notably by computing cross-correlation product images, between the signal image and each of the reference intensity patterns $R_L(x,y)$, with (x,y) coordinates of the at least one portion surface $A_n$, the cross-correlation product image between the signal sub-image and each of the intensity patterns $R_L(x,y)$ having a peak, the intensity-weight data being the amplitude of the peak and the deformation data $T_L^I(x,y)$ being the translation vector between the said peak or its centroid from the center of the cross-correlation product image.

Alternatively, the intensity-weight data $W_L^I(x,y)$ and the deformation data $T_L^I(x,y)$, may be obtained by computing a Wiener deconvolution of the signal sub-image I'(x,y) by the reference intensity patterns $R_L(x,y)$, or a Wiener deconvolution of the intensity patterns $R_L(x,y)$ by the signal sub-image. These Wiener deconvolution having a peak, the intensity-weight data $W_L^I(A)$ being the amplitude of the peak and the deformation data $T_L^I(A)$ being the displacement vector between the said peak or its centroid, from the center of the zero-mean cross-correlation product image.

Alternatively, the deformation data $T_L^I(x,y)$ and intensity-weight data $W_L^I(x,y)$ can be estimated by computing a matrix inversion algorithm, where the matrices to be inverted being related to at least a transform of a sub-image of a reference intensity pattern $R_L(x,y)$, such as a Fourier transform. Matrix inversion can involve for instance Moore-Penrose pseudo-inversion, singular value decomposition, Tikhonov regularization, etc.

Other minimization reconstruction algorithms may also be used.

For example, an iterative optimization algorithm aiming at minimizing a mean-squared-difference between the experimental signal intensity pattern and the signal intensity pattern retrieved from reference intensity pattern deformation. This minimization can be carried out numerically relying for instance on genetic type algorithms, or steepest descent algorithm.

Intensity-weight data $W_L^I(x,y)$ and deformation data $T_L^I(x,y)$ may be computed thanks to a compressed sensing algorithm. A description of compressed sensing theory can be found, for instance, in Candès, E. J. (2006, August),

*Compressive sampling*, In Proceedings of the international congress of mathematicians (Vol. 3, pp. 1433-1452) and in references cited therein.

Such compressed sensing algorithm enables to simultaneously minimize two quantities, one of which being the root mean squared error between the experimental data (the signal intensity beam) and the rebuilt data. The other quantity to be minimized here is the number of non-zero coefficients in each translation image.

Other Technical Features

Generating wavefront data comprises integrating displacement data $T_L^I(x,y)$ over at least one direction of the at least one image and may comprise adding the known reference wavefront shapes, which may be simply planar or spherical.

In some embodiments, the reference wavefront shapes are not known but may arise from the system in a reference configuration. The single signal intensity beam must then be recorded after a slight modification of the system, for instance, the introduction of an optically thin sample in the optical path of the optical light beam. In this case, the wavefronts obtained by integrating displacement data $T_L^I(x,y)$ are then directly the measure of the wavefront deformation introduced by the sample.

WFS, Small Memory-Effect Range

The invention also relates to a wavefront sensor for a multi-angular signal light beam from a single image acquisition $I(x,y)$ of the said multi-angular signal light beam, said multi-angular light beam comprising N angular channels of different propagation directions $P_L$, said propagation directions being determined by a mean propagation direction vector $\vec{u_L}$, each angular channel Ci being separated from other angular channels Cj by an angular separation $\Delta\alpha_{ij}$ defined by $\Delta\alpha_{ij} = \arccos(\vec{u_i} \cdot \vec{u_j})$, where "." stands for the inner product between $\vec{u_i}$ and $\vec{u_j}$, The wavefront sensor comprising an optical assembly made at least of:
an optical mask and an imaging sensor for generating and recording intensity patterns of incident beams, by having these beams reflect on, or propagate through, the optical mask, the optical mask having the optical properties:
i) to cause the intensity pattern to depend on the wavefront shape, so that a tilt applied to the wavefront shape, with said tilt being smaller than an angular memory effect $\delta\alpha$ of said optical mask, results in a local displacement amount of the intensity pattern, and
ii) for two incident beams $M_n$, $M_m$ of respective propagation directions $P_n$, $P_m$ determined by mean propagation direction vectors $\vec{u_n}$ and $\vec{u_m}$, respectively, said incident beams Mn, Mm having a same wavefront shape and separated from each other by a separation angle defined by $\Delta\alpha_{mn} = \arccos(\vec{u_m} \cdot \vec{u_n})$ larger than the angular memory effect $\delta\alpha$, ie $\Delta\alpha_{mn} > \delta\alpha$, to produce uncorrelated intensity patterns over a surface area A of the imaging sensor, two uncorrelated random intensity patterns being defined as statistically orthogonal relatively to a zero-mean cross-correlation product, the angular memory effect $\delta\alpha$ being smaller than angular separations $\Delta\alpha_{ij}$ of angular channels C:

$\delta\alpha < \Delta\alpha_{ij}$, for all $i, j \in [1, N]$, with $i \neq j$ the imaging sensor recording:
a) several reference intensity patterns $R_L(x,y)$, each reference intensity pattern $R_L(x,y)$ being generated by having a respective reference incident beam L with propagation directions $P_L$, reflect on or propagate through the optical mask L varying from 1 to N, x and y being coordinates;
b) one single signal image $I(x,y)$ of the intensity pattern generated by having the multi-angular signal light beam which comprises the N propagation directions $P_L$ reflect on or propagate through the optical mask, the single signal image $I(x,y)$ being representative of light impinging on the at least one surface area (A);

computing means for:
c) computing intensity-weight data $W_L^I(x,y)$ and deformation data $T_L^I(x,y)$, the intensity-weight data $W_L^I(x,y)$ and the deformation data $T_L^I(x,y)$ being representative of an intensity modulation and a diffeomorphism, respectively, of each reference intensity pattern at propagation direction $P_L$, the intensity-weight data $W_L^I(x,y)$ and the deformation data $T_L^I(x,y)$ being computed so that to minimize, for the at least one surface area A, a quantity that depends on the differences $D_A$ between the single signal image $I(x,y)$ on the one hand, and the sum of reference intensity patterns $R_L(x,y)$ multiplied by intensity-weight data $W_L^I(x,y)$ and deformed by deformation data $T_L^I(x,y)$, on the other hand:

$$D_A = \left\| I(x,y) - \sum_L W_L^I(x,y) R_L[(x,y) + T_L^I(x,y)] \right\|_A$$

the symbol $\|.\|_A$ designating a norm calculated for all (x,y) sampling points in the surface area A;
d) generating data for each propagation direction $P_L$ representative of:
the shape of the wavefront by integrating the deformation data $T_L^I(x,y)$,
the intensity map based on the weight $W_L^I(x,y)$.

The optical mask comprises at least one diffuser, notably an engineered pseudo-diffuser.

The optical mask may comprise a plurality of diffusers, notably a plurality of engineered pseudo-diffusers.

The optical mask may be a transmission optical mask or a reflective optical mask.

An optical mask working in transmission may comprise, for example, etched glass or silica substrate, ground glass, opal glass, sandblasted glass or plastic, etched glass or plastic, molded materials produced by a randomly textured mold, nano or micro-particles as in paints, deposited on a transparent substrate.

Preferably, the transmissive optical mask includes a patterned surface such as a computer-designed wrinkled surface.

A reflective optical mask may include a rough surface such as sandblasted metal, plastic or ceramic, or etched metal, plastic, or ceramic, or molded materials produced by a rough mold, or paint deposited on a substrate, or combinations thereof.

diffractive optical element.

The optical mask may comprise at least one diffractive element.

The optical mask may comprise a plurality of diffractive elements.

The optical mask may comprise at least one optical fiber bundle, a metasurface, or a freeform optical element.

The optical mask may comprise a plurality of optical fiber bundles, of metasurfaces, or of freeform optical elements.

The optical mask may comprise at least an array of micro-optical elements, each micro-optical element generating on the imaging sensor an intensity pattern different from the intensity pattern generated by the micro-optical elements located at least in its vicinity.

The optical mask may comprise a plurality of arrays of micro-optical elements as described hereabove.

The optical mask may comprise at least one array of micro-lenses with random aberration or an array of micro-lenses randomly arranged spatially.

The optical mask may comprise a plurality of arrays of micro-lenses with random aberration or a plurality of arrays of micro-lenses randomly arranged spatially.

The optical mask may comprise any combination thereof.

The computing means may be configured for:
extracting signal sub-images, each representative of light impinging on a portion A' of the at least one surface area, from the single signal image I(x,y);
estimating deformation data $T_L'(x,y)$ for each sub-image and for every propagation directions $P_L$ by:
i) computing the intensity-weight data $W_L'(x,y)$ and the deformation data $T_L'(x,y)$ between the signal sub-image and each of the reference intensity patterns $R_L(x,y)$ so as to minimize, for the corresponding surface area A', a quantity that depends on the differences $D_{A'}$;
ii) updating the deformation data $T_L'(x,y)$ by storing the deformation data $T_L'(x,y)$ at at least one point (x,y) inside said surface area A'.

The computing means may be configured to estimate the deformation data $T_L'(x,y)$ by computing zero-mean cross-correlation product images, for each signal sub-image, between the signal sub-image and each of the reference intensity patterns $R_L(x,y)$, the plurality of reference incident beams L being uncorrelated relatively to the zero-mean cross-correlation product,
the zero-mean cross-correlation product image between the signal sub-image and each of the reference intensity patterns $R_L(x,y)$ having a peak and the displacement amount being the distance between the said peak, or its centroid, from the center of the zero-mean cross-correlation product image.

The computing means may be configured to compute the intensity-weight data $W_L'(x,y)$ and the deformation data $T_L'(x,y)$ thanks to: —a Wiener deconvolution of the signal sub-images by the reference intensity patterns $R_L(x,y)$, or —a Wiener deconvolution of the reference intensity patterns $R_L(x,y)$ by the signal sub-images.

WFS, Large Memory-Effect Range

The invention also relates to a wavefront sensor for a multi-angular signal light beam from a single image acquisition I(x,y) of the said multi-angular signal light beam, said multi-angular light beam comprising N angular channels of different propagation directions $P_L$, said propagation directions being determined by a mean propagation direction vector $\vec{u_L}$, each angular channel Ci being separated from other angular channels Cj by an angular separation $\Delta\alpha_{ij}$ defined by $\Delta\alpha_{ij}=\arccos(\vec{u_i}\cdot\vec{u_j})$, where "·" stands for the inner product between $\vec{u_i}$ and $\vec{u_j}$, The wavefront sensor comprising an optical assembly made at least of:
an optical mask and an imaging sensor for generating and recording intensity patterns of incident beams, by having these beams reflect on, or propagate through, the optical mask,
the optical mask having the optical properties:
i) to cause the intensity pattern to depend on the wavefront shape, so that a tilt applied to the wavefront shape, with said tilt being smaller than an angular memory effect $\delta\alpha$ of said optical mask, results in a local displacement amount of the intensity pattern, and
ii) for two incident beams Mn, Mm of propagation directions determined by three dimensional-unit propagation direction vectors $\vec{u_n}$ and $\vec{u_m}$, respectively, said incident beams Mn, Mm having a same wavefront shape and separated from each other by a separation angle defined by $\Delta\alpha_{mn}=\arccos(\vec{u_m}\cdot\vec{u_n})$ smaller than the an angular memory effect $\delta\alpha$, ie $\Delta\alpha_{mn}<\delta\alpha$, to produce uncorrelated intensity patterns over at least one surface portion $A_n$ of the imaging sensor, the surface portion $A_n$ having a largest spatial extent $L_{An}$ smaller that $\Delta\alpha_{nm}\cdot d$, with d being a separation distance between the optical mask and the imaging sensor,
the angular memory effect $\delta\alpha$ being larger than angular separations $\Delta\alpha_{ij}$ of angular channels $C_L$:

$$\delta\alpha > \Delta\alpha_{ij}, \text{ for all } i, j \in [1, N], \text{ with } i \neq j$$

the imaging sensor recording:
a) at least one reference intensity patterns $R_K(x,y)$, the reference intensity pattern $R_K(x,y)$ being generated by having a respective reference incident beam L with propagation directions $P_L$ reflect on or propagate through the optical mask L varying from 1 to N, with N being the number of different reference incident beams, x and y being coordinates;
b) one single signal image I(x,y) of the intensity pattern generated by having the multi-angular signal light beam which comprises the N propagation directions $P_L$ reflect on or propagate through the optical mask, the single signal image I(x,y) being representative of light impinging on at least one surface area (A) comprising the at least one surface portion An;
computing means for:
c) generating numerically one or several reference intensity patterns $R_L(x,y)$ using the recorded reference pattern $R_K(x,y)$,
d) for the at least one surface $A_n$:
i) extracting a signal sub-image I'(x,y), representative of light impinging on the at least one surface $A_n$, from the single signal image I(x,y):

$$I(x, y) = I'(x, y) \text{ with } (x, y) \in A_n,$$

ii) computing intensity-weight data $W_L'(x,y)$ and deformation data $T_L'(x,y)$, with (x,y) coordinates of the surface portion $A_n$, for all L varying from 1 to N, the intensity-weight data $W_L'(x,y)$ and the deformation data $T_L'(x,y)$ being representative of an intensity modulation and a diffeomorphism, respectively, of each given reference intensity pattern $R_L(x,y)$, at propagation direction $P_L$, for the signal sub-image I"(x,y),
all the N intensity-weight data $W_L'(x,y)$ and the N deformation data $T_L'(x,y)$ being computed, for L varying from 1 to N, so as to minimize, for all sampling points (x,y) of the surface area $A_n$, from the signal sub-image I'(x,y):
a difference $D_{An}$ between the single signal image I'(x,y) on the one hand, and the sum of reference intensity patterns $R_L$ multiplied by intensity-weight data $W_L'(x,y)$ and deformed by deformation data $T_L'(x,y)$, on the other hand:

$$D_{A_n} = \left\| I'(x, y) - \sum_{L=1}^{N} W_L^I(x, y) R_L[(x, y) + T_L^I(x, y)] \right\|_{A_n}$$

the symbol $\|.\|_{A_n}$ designating a norm calculated for all (x,y) sampling points in the surface area $A_n$;
for the surface $A_n$, each given reference intensity patterns $R_L(x,y)$ being orthogonal to each reference intensity pattern $R_K(x,y)$ relatively to the zero-mean cross-correlation product, when K natural number different from L and chosen between [1; N];
    iii) generating data for each propagation direction $P_L$ representative of:
the shape of the wavefront by integrating the deformation data $T_L^I(x,y)$,
the intensity map based on the weight $W_L^I(x,y)$.
  The computing means may be configured for:
    splitting the surface A of the imaging sensor into a plurality of surface portion $A_n$ having a largest spatial extent $L_{An} < \Delta\alpha_{ij} \cdot d$, for all i, j∈ [1, N], with i≠j
    estimating deformation data $T_L^I(x,y)$ for each sub-image and for every propagation direction $P_L$ by:
    i) computing the intensity-weight data $W_L^I(x,y)$ and the deformation data $T_L^I(x,y)$ between the signal sub-image and each of the reference intensity patterns $R_L(x,y)$ so as to minimize, for the corresponding surface portion $A_n$, a quantity that depends on the differences $D_{A_n}$;
    ii) updating the deformation data $T_L^I(x,y)$ by storing the deformation data $T_L^I(x,y)$ at at least one point (x,y) inside said surface portion $A_n$.
  The computing means may be configured for:
    achieving a cross-correlation product of the single signal image I(x,y) and the recorded reference pattern $R_K(x,y)$, the cross-correlation product image between the signal image and each of the recorded intensity patterns $R_K(x,y)$ having N maxima, and
    shifting spatially the recorded reference pattern $R_K(x,y)$ to the corresponding position based on each maximum position in order to generate the corresponding reference intensity pattern reference $R_L(x,y)$.
  The imaging sensor may record:
    a reference intensity pattern $R_K(x,y)$ corresponding to a propagation direction $P_L$ different from the propagation directions $P_L$ contained in the single signal image I(x,y) using the device.
The computing means may be configured to
  generating numerically the all N intensity patterns $R_L(x,y)$ using the recorded intensity pattern Rk(x,y), with L varying from 1 to N. Preferably, by:
  achieving a cross-correlation product of the single signal image I(x,y) and the recorded reference pattern $R_K(x,y)$, the cross-correlation product image between the signal image and each of the recorded intensity patterns $R_K(x,y)$ having N maxima, and
  shifting spatially the recorded reference pattern $R_K(x,y)$ to the corresponding position based on each maximum position in order to generate the corresponding reference intensity pattern reference $R_L(x,y)$.
The Optical Mask
  Preferably, the optical mask comprises at least one diffuser, notably an engineered pseudo-diffuser.
  The optical mask may comprise a plurality of diffusers, notably a plurality of engineered pseudo-diffusers.
  The optical mask may be a transmission optical mask or a reflective optical mask.

An optical mask working in transmission may comprise, for example, etched glass or silica substrate, ground glass, opal glass, sandblasted glass or plastic, etched glass or plastic, molded materials produced by a randomly textured mold, nano or micro-particles as in paints, deposited on a transparent substrate.
  Preferably, the transmissive optical mask includes a patterned surface such as a computer-designed wrinkled surface.
  A reflective optical mask may include a rough surface such as sandblasted metal, plastic or ceramic, or etched metal, plastic, or ceramic, or molded materials produced by a rough mold, or paint deposited on a substrate, or combinations thereof.
diffractive optical element.
  The optical mask may comprise at least one diffractive element.
  The optical mask may comprise a plurality of diffractive elements.
  The optical mask may comprise at least one optical fiber bundle, a metasurface, or a freeform optical element.
  The optical mask may comprise a plurality of optical fiber bundles, of metasurfaces, or of freeform optical elements.
  The optical mask may comprise at least an array of micro-optical elements, each micro-optical element generating on the imaging sensor an intensity pattern different from the intensity pattern generated by the micro-optical elements located at least in its vicinity.
  The optical mask may comprise a plurality of arrays of micro-optical elements as described hereabove.
  The optical mask may comprise at least an array with random aberration or an array of micro-lenses randomly arranged spatially.
  The optical mask may comprise a plurality of arrays with random aberration or a plurality of arrays of micro-lenses randomly arranged spatially.
  The optical mask may comprise any combination thereof.
  The computing means may be configured to estimate the deformation data $T_L^I(x,y)$ by computing zero-mean cross-correlation product images, for each signal sub-image, between the signal sub-image and each of the reference intensity patterns $R_L(x,y)$, the plurality of reference incident beams L being uncorrelated relatively to the zero-mean cross-correlation product,
  the zero-mean cross-correlation product image between the signal sub-image and each of the reference intensity patterns $R_L(x,y)$ having a peak and the displacement amount being the distance between the said peak, or its centroid, from the center of the zero-mean cross-correlation product image.
  The computing means may be configured to compute the intensity-weight data $W_L^I(x,y)$ and the deformation data $T_L^I(x,y)$ thanks to:
    a Wiener deconvolution of the signal sub-images by the reference intensity patterns $R_L(x,y)$, or
    a Wiener deconvolution of the reference intensity patterns $R_L(x,y)$ by the signal sub-images.
    Optical Device
According to a further aspect of the invention, an optical device is provided, comprising: a wavefront sensor according to the invention as defined above; and a light emitting source for generating a multi-angular light beam with specific propagation direction vectors which is a broadband laser system, notably a chirped pulse amplifier laser system.
  In some embodiments, the optical device may comprise a polarization assembly located before the wavefront sensor according to the invention in order to encode several polarization states of one or several wavefronts into N angular channels $C_L$.

Preferably, the polarization assembly may contain at least one polarization optic.

The polarization optic may be a quarter wave-plate, a half-waveplate, a polarizer, a Wollaston prism, a Glan-Taylor polarizer, a Glan-Thomson polarizer, a Rochon prism a Nomarski prism or any other polarization dependent optic, so that different polarization states of an initial light beam are encoded into different angular channels CL of the multi-angular signal light beam.

In some embodiments, the multi-angular wavefront sensor coupled to a polarization assembly is used to extract information about local birefringence of biological sample. At the state of the art (Aknoun, Sherazade, et al. "*Quantitative retardance imaging by means of quadri-wave lateral shearing interferometry for label-free fiber imaging in tissues.*" Optics Communications 422 (2018): 17-27.), however such measurement is performed by sequentially illuminating a biological with different polarization directions. The proposed embodiments provide single-shot birefringence measurement.

Exemplary embodiments of the present invention also relate to the use of a multi-angular wavefront sensor for a multi-angular signal light beam according to the invention, in: optical metrology, laser metrology, quantitative phase microscopy (Biology, chemistry . . . ), adaptive optics, ophthalmology and optical thermometry.

BRIEF DESCRIPTION OF THE DRAWINGS

The accompanying drawings, which are incorporated in and constitute a part of the specification, illustrate presently preferred embodiments of the invention, and together with the description, serve to explain the principles of the invention. In the drawings.

DETAILED DESCRIPTION

Figure 1A:
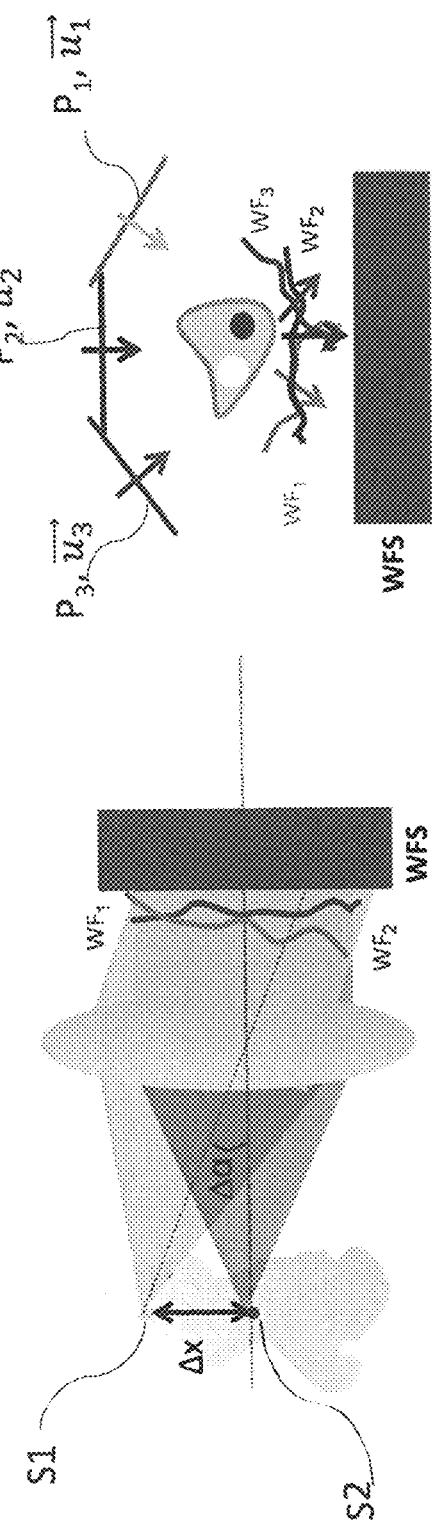
FIG. 1A is a schematic illustrating the principle of adaptive optics with a large field of view.
Figure 1B:
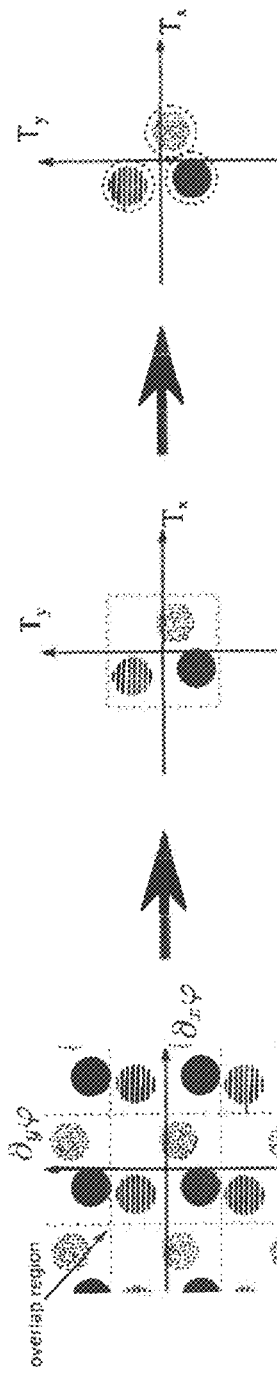
FIG. 1B is a schematic illustrating the principle of adaptive optics depicting diffractive tomography.
Figure 2:
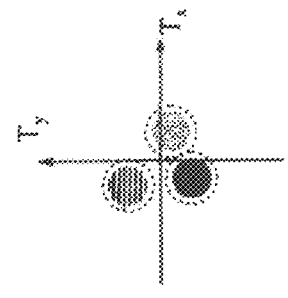
FIG. 2 is an example related to prior art.

Whenever possible, the same reference numbers will be used throughout the drawings to refer to the same or like parts.

In accordance with the invention, and as broadly embodied, in FIGS. 3A, 3B, 3C, and 4, an optical device 15 is provided.

The optical device 15 may comprise a single light emitting source or an assembly of light emitting sources for generating a multi-angular signal light beam 12 with specific propagation directions. Depending on the application of the optical device 10, the light sources 11 may be a LED or an assembly of LEDs or Lasers. The light sources can also be by an assembly of scattering, fluorescent or luminescent emitters.

For illustration purposes, the light source or the assembly light emitting sources are shown as block 11.

The signal light beam comprises N angular channels $C_L$ with different propagation directions $P_L$ determined by mean propagation direction vectors $\vec{u_L}$. Each angular channel $C_i$ is separated from other angular channels $C_j$ by an angular separation $\Delta\alpha_{ij}$ defined by $\Delta\alpha_{ij} = \arccos(\vec{u_i} \cdot \vec{u_j})$, where "·" stands for the inner product between $\vec{u_i}$ and $\vec{u_j}$.

Figure 4:
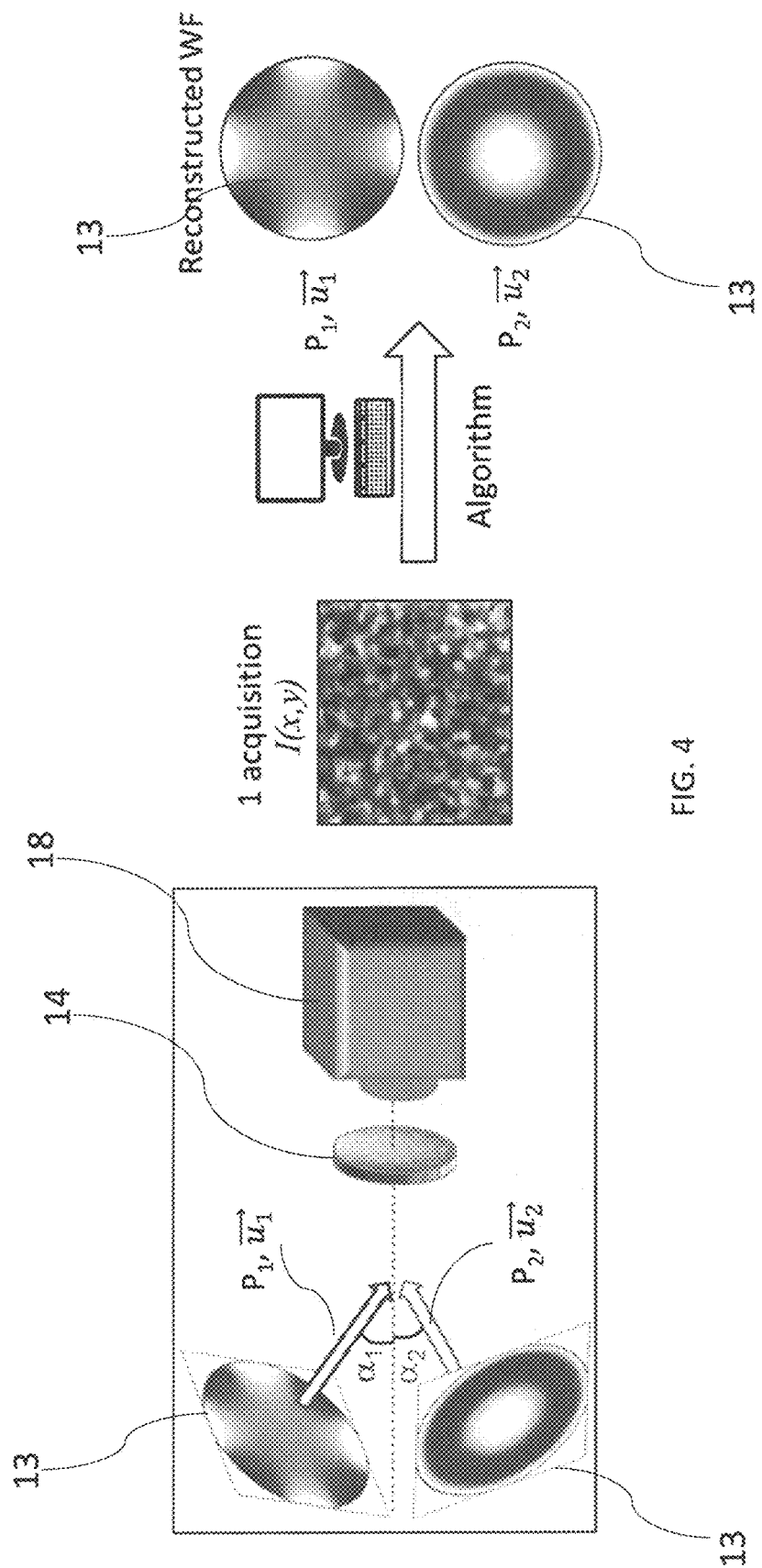
FIG. 4 is a schematic illustration of an embodiment of an optical system according to the invention.

FIG. 4 illustrates an example, in which the signal light beam 12 comprises two angular channels $C_1$ and $C_2$ of respective propagation directions P1 and P2 with respective mean propagation direction vectors $\vec{u_1}$ and $\vec{u_2}$. The angular Channels C1 and C2 have different wavefront shapes 13.

The optical device 15 further comprises a wavefront sensor 10. The latter includes a device 16 comprising an optical mask 14 and an imaging sensor 18 for generating and recording intensity patterns of incident beams. For calculation purposes, computing means are also provided. The computing means may comprise a memory storing, a set of instructions and processor for executing said set of instructions, such as a PC computer or dedicated microcontroller bound. For purposes of illustration, the computing means are shown as block 17, which may be part of the wavefront sensor 10 or separate from the latter.

As shown in FIGS. 3A to 3D and 4, the optical mask 14 is illuminated by the light beam 12 presenting wavefronts 13.

Figure 3A:
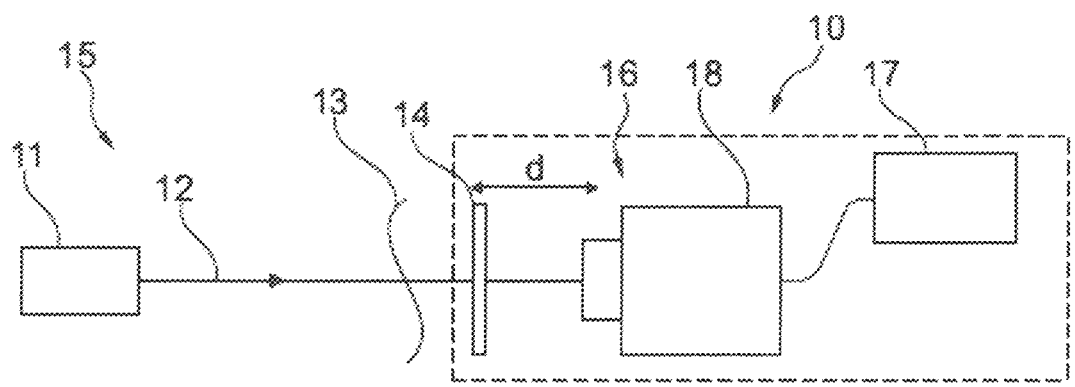
FIG. 3A is a schematic illustration of an embodiment of an optical system according to the invention.
Figure 3C:
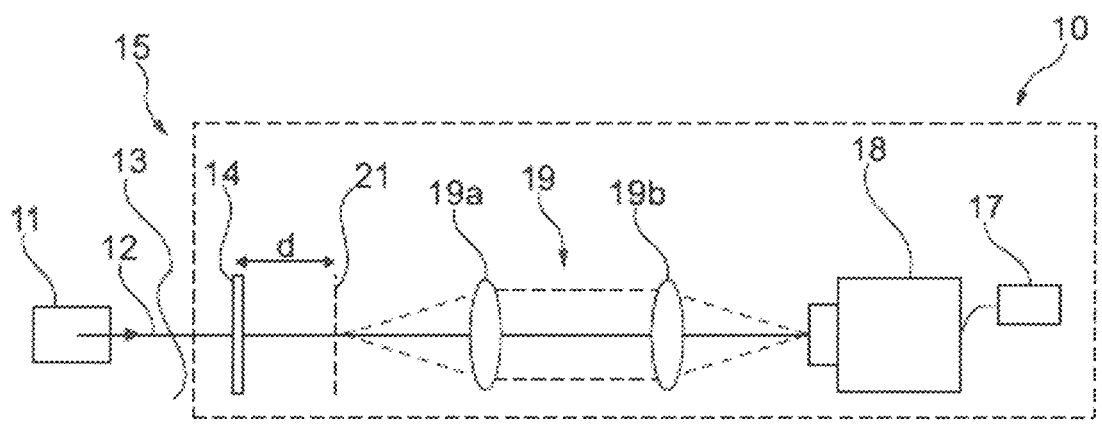
FIG. 3C is a schematic illustration of an embodiment of an optical system according to the invention.

FIGS. 3A and 4 display an embodiment of the wavefront sensor 10 where the optical mask is working in transmission preferably at the close vicinity of the imaging sensor 18, for example at a distance d, ranging from 0 to 10 D/θ, where D is the size of the imaging sensor and θ the scattering angle of the optical mask.

Figure 3B:
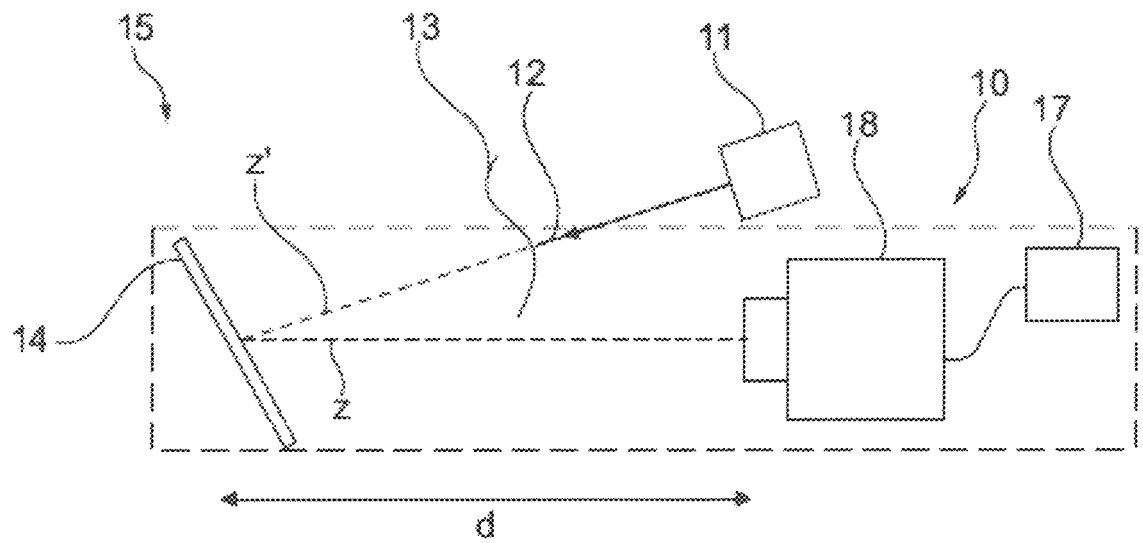
FIG. 3B is a schematic illustration of an embodiment of an optical system according to the invention.
Figure 3D:
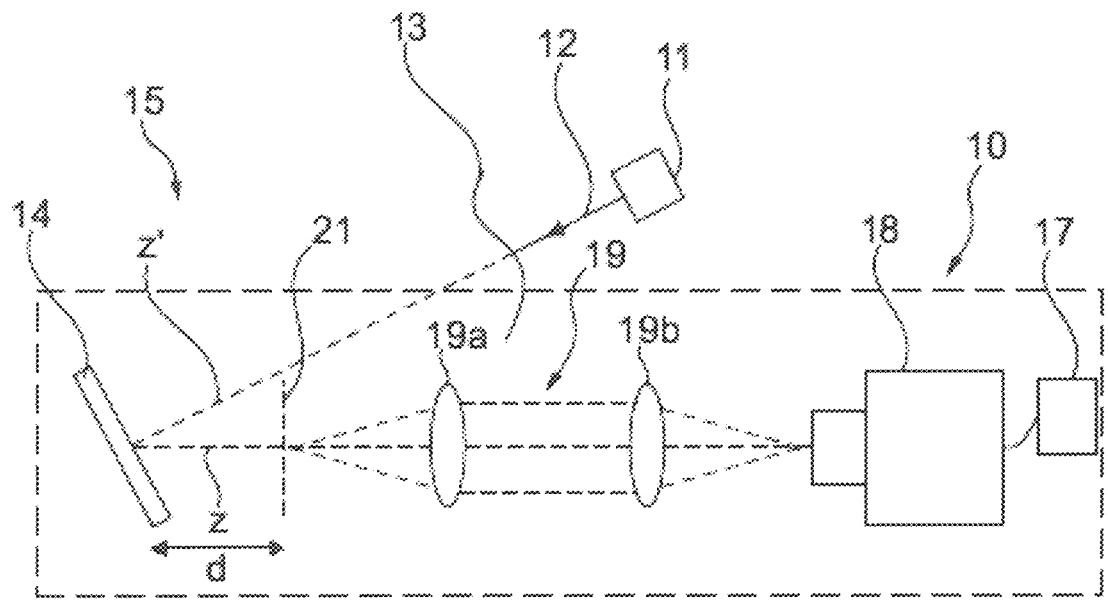
FIG. 3D is a schematic illustration of an embodiment of an optical system according to the invention.

FIGS. 3B and 3D show an alternative embodiment where the optical mask 14 is working in reflection, preferably in a close vicinity of the imaging sensor.

The light beam 22 emerging from the optical mask 14 is then captured using the imaging sensor 18, yielding an intensity pattern image I(x,y). The intensity pattern of the emergent light beam 22 is a superposition of individual intensity patterns IL weighted by their respective contributions to the signal beams constituting light beam 12.

An example of signal intensity pattern generated with the optical mask 14 is shown in FIG. 4. In FIG. 4, the signal intensity pattern corresponds to an intensity pattern generated by a diffuser.

Figure 5:
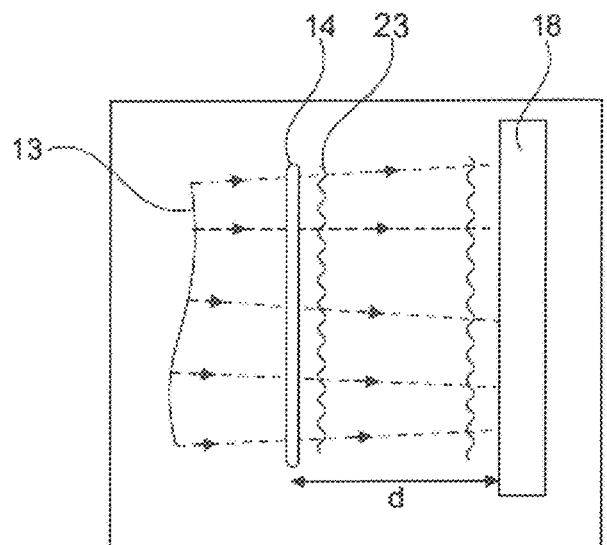
FIG. 5 is a schematic illustration of optical mask properties according to the invention.

Optical mask crossing causes the intensity pattern to depend on the wavefront shape, so that a tilt applied to the wavefront shape results in a displacement of said intensity pattern, as can be seen in FIG. 5. Such property is also commonly referred to as the "memory effect" of the optical mask. This assumption may be valid until a so-called memory effect angle or angular memory effect, as described hereafter.

Figure 6A:
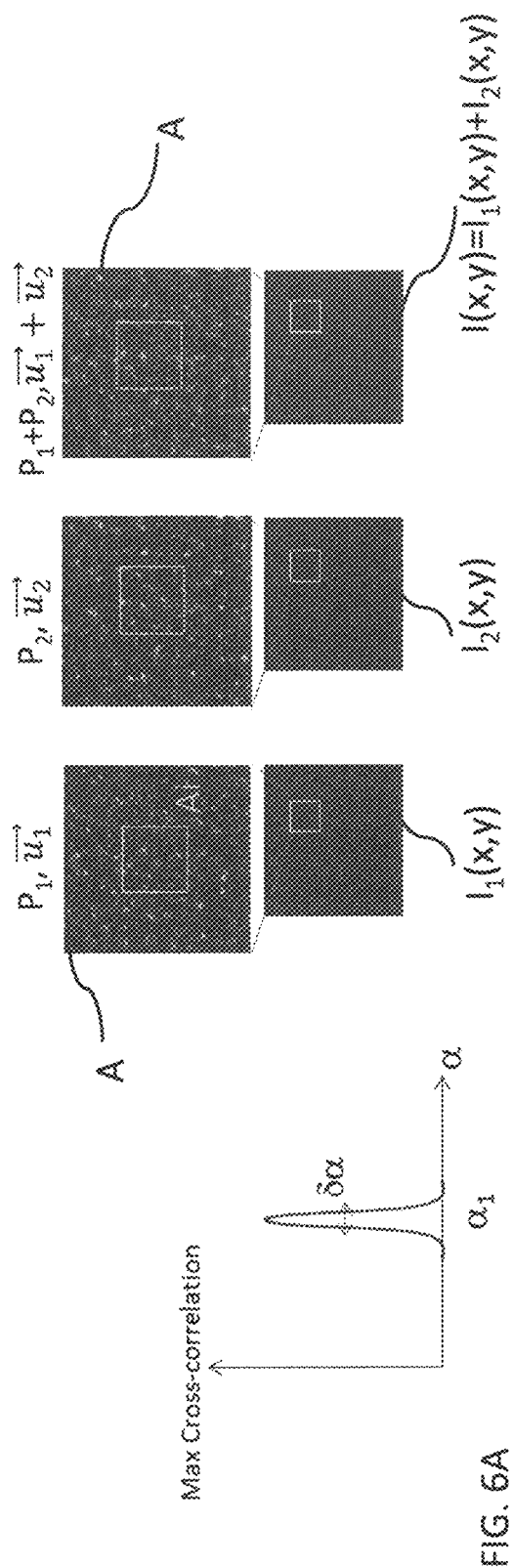
FIG. 6 is a schematic illustration of optical mask properties according to the invention.

Depending on the angular separation $\Delta\alpha_{ij}$ of channels $C_i$ and $C_j$ and on the value of the memory angle $\delta\alpha_{ij}$, two cases can be distinguished:

the optical mask 14 may exhibit a small memory effect angle $\delta\alpha<\Delta\alpha_{ij}$. This case is illustrated in FIG. 6A through the example of two angular channels C1 and C2, but can be generalized for all N angular channels. As can be shown, the resulting individual intensity patterns I1 and I2 on the imaging sensor, corresponding to propagation directions P1 and P2 with mean propagation direction vector $\vec{u_1}$ and $\vec{u_2}$ respectively, are uncorrelated over the surface of the imaging sensor. In particular, in a given area A of the imaging sensor, the two individual intensity patterns remain uncorrelated.

Figure 7A:
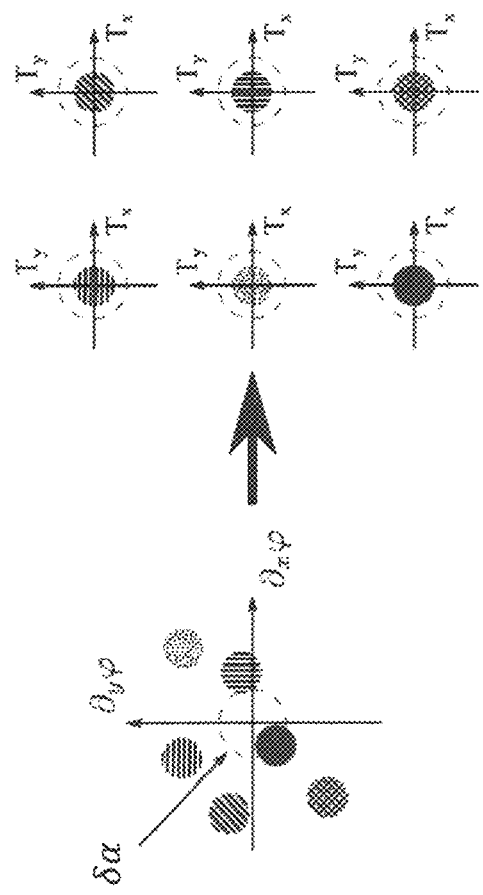
FIG. 7 is a schematic illustration of optical mask properties according to the invention.

Further, it is worth noting, as illustrated in FIG. 7A, that a small gradient phase, ie a tilt in a given wavefront, results in a simple translation of the corresponding intensity pattern, while a strong phase gradient, larger than the dashed circle, results in a completely different and uncorrelated speckle pattern. Hence, it is preferable for the memory effect angle $\delta\alpha$ of the optical mask 14 to be larger than the extent of the gradient phase distribution, while remaining smaller than the angular separation $\Delta\alpha ij$ between two different angular channels $C_i$ and Cj. In other words, it is preferable for the tilt in the wavefront to be smaller than the angular memory effect of the optical mask.

In a second embodiment, the optical mask may exhibit a large memory effect angle $\delta\alpha>\Delta\alpha_{ij}$. This case is illustrated in FIGS. 6B and 7B.

Figure 6B:
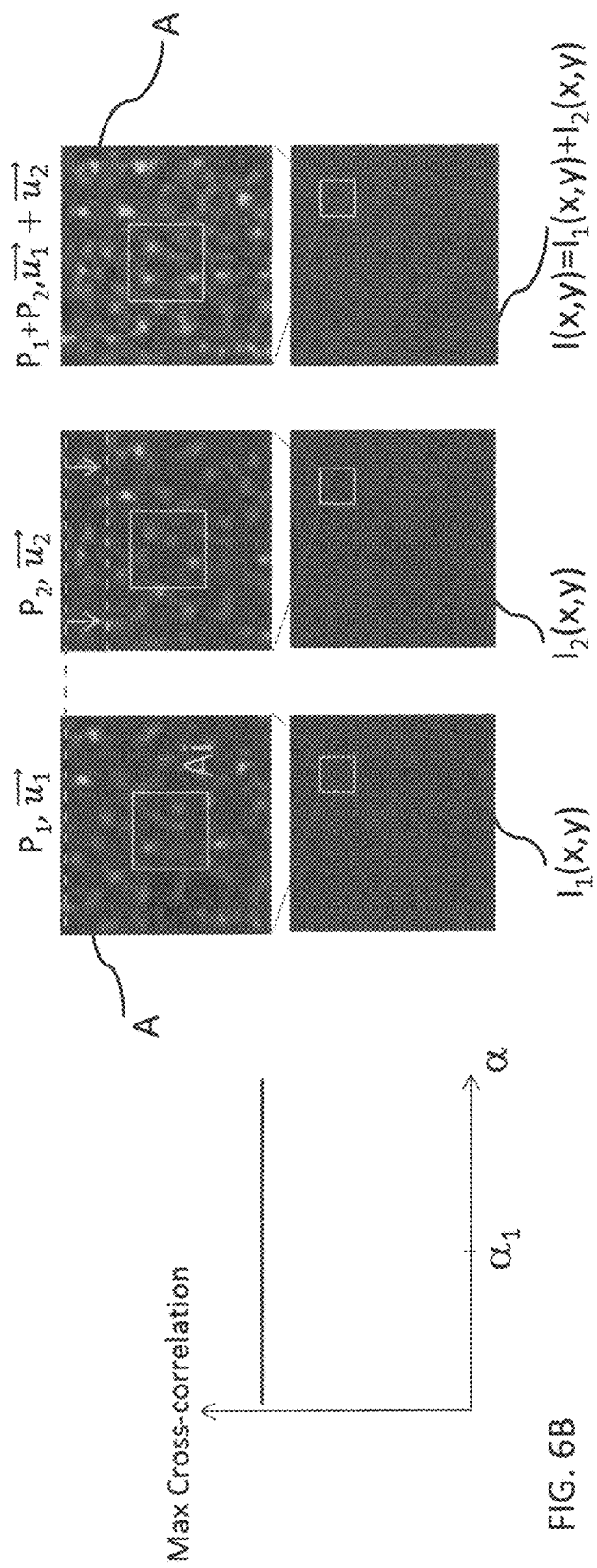
Figure 7B:
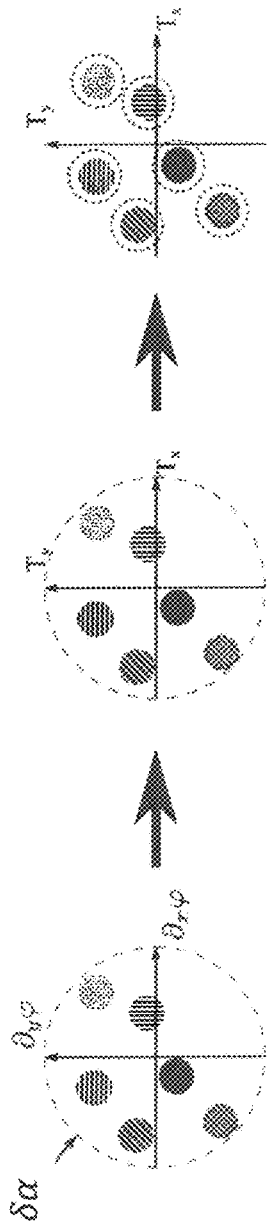

In FIG. 6B, two angular channels C1 and C2 are used. As shown, resulting individual intensity patterns on the imaging sensor corresponding to different propagation directions P1 and 2 with respective mean propagation direction vectors $\vec{u_1}$ and $\vec{u_2}$, are similar but shifted by a quantity $\Delta\alpha_{ij}\cdot d$, where d is the distance between the optical mask and the matrix sensor. However, in a given surface portion $A_n$ having a large spatial extend $L_{An}<\Delta\alpha_{ij}\cdot d$, the two intensity patterns are locally uncorrelated.

In the following, embodiments in relation with the case in which the optical mask 14 may exhibit a small memory effect angle will be described.

In these embodiments, the optical mask may comprise an engineered pseudo-diffuser, a diffuser or a diffractive optical element.

The optical mask comprises for example a plurality of diffusers or pseudo-diffusers, or a combination thereof, preferably diffusers or pseudo-diffusers.

Otherwise, the optical mask may be any optical mask:
i) causing the intensity pattern to depend on the wavefront shape, so that a tilt applied to the wavefront shape, with said tilt being smaller than an angular memory effect $\delta\alpha$ of said optical mask, results in a local displacement amount of the intensity pattern, said angular memory effect $\delta\alpha$ being smaller than each angular separation $\Delta\alpha_{ij}$,
ii) producing uncorrelated intensity patterns over a surface area A of the imaging sensor, for a plurality of respective incident angular beams of different propagation directions having a same wavefront shape.

The property ii) is evaluated relatively to a given measure of similarity.

A measure of similarity between two intensity patterns can be mathematically characterized using correlation tools. For example, a measure may consist in localizing critical points of the intensity such as intensity maxima and to look for correlations between intensity maxima localization of the two intensity patterns. This can be quantified using a Pearson correlation coefficient. It can also be quantified using the mean average distance to the nearest neighbor weighted by the critical point density.

Figure 8:
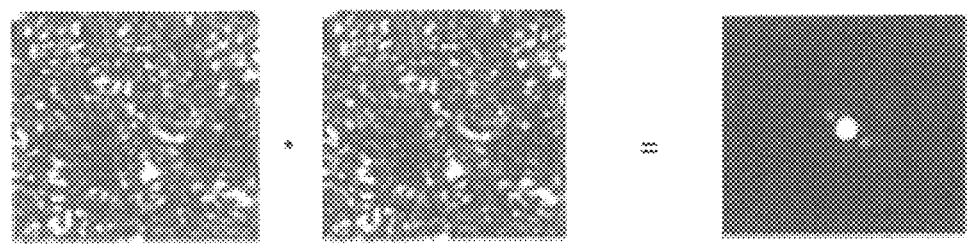
FIG. 8 is a schematic illustration of optical mask properties according to the invention.

A measure of similarity between two intensity patterns may also be estimated by computing a zero-mean cross-correlation product. A statistical average of the zero-mean cross-correlation product between two uncorrelated random signals is zero. In contrast, a statistical average of the zero-mean cross-correlation product of an intensity pattern with itself is a function admitting an extremum, in particular a maximum. An illustration of the zero-mean cross-correlation product of the speckle of FIG. 8 with itself (also called auto-correlation product) is shown in FIG. 8. The result displayed in FIG. 8 exhibits an intense central bright spot demonstrating the high degree of correlation of an intensity pattern with itself.

Alternatively, a Wiener deconvolution can be used rather than a zero-mean cross-correlation product. The result of a Wiener deconvolution applied to an intensity pattern with itself is similar to what is displayed in FIG. 8.

Figure 9:
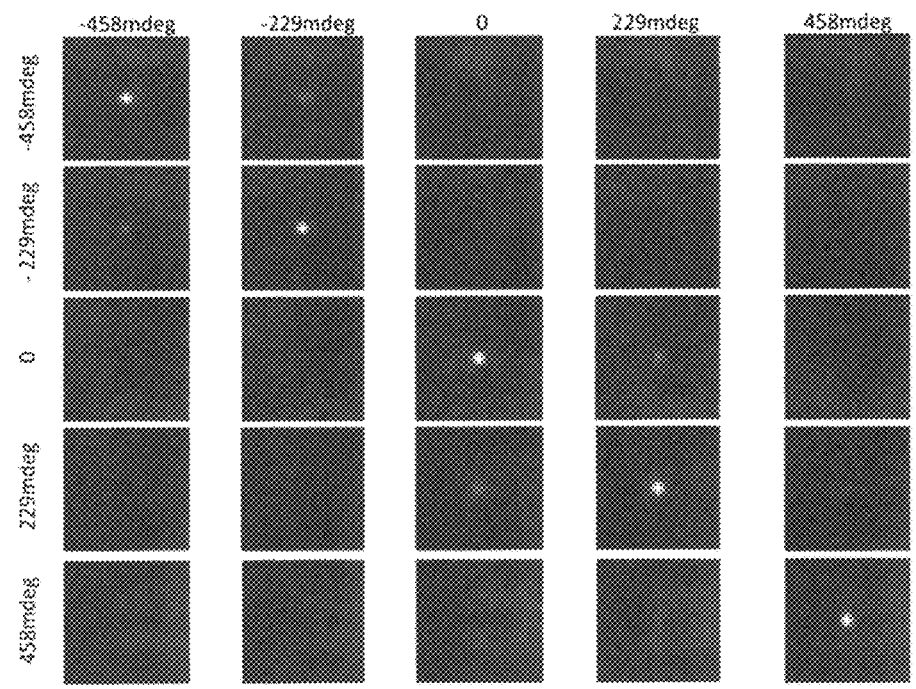
FIG. 9 is a schematic illustration of optical mask properties according to the invention.

An example illustrating property ii) is shown in FIG. 9.

FIG. 9 shows an illustration of correlation images corresponding to a surface A computed between reference intensity patterns $R_L(x,y)$ obtained with the optical mask 14 using five angular beams with propagation directions $P_L$. The angular beams are separated by a separation angles ranging from −458 mdeg to 458 mdeg.

FIG. 9 shows a 5×5 matrix of images. Each image at position (i, j) represents the cross-correlation between the sub-images at propagation directions Pi and Pj.

As shown, the diagonal of the matrix exhibits bright spots demonstrating the high degree of correlation of an intensity pattern with itself, whereas out of diagonal terms are almost perfectly zero, illustrating the absence of correlation between patterns obtained at different propagation directions.

The wavefront sensor 10 mentioned above may be used to determine the wavefront shapes of the multi-angular signal light beam 22 from a single signal image acquisition of the said multi-angular signal light beam.

Figure 10:
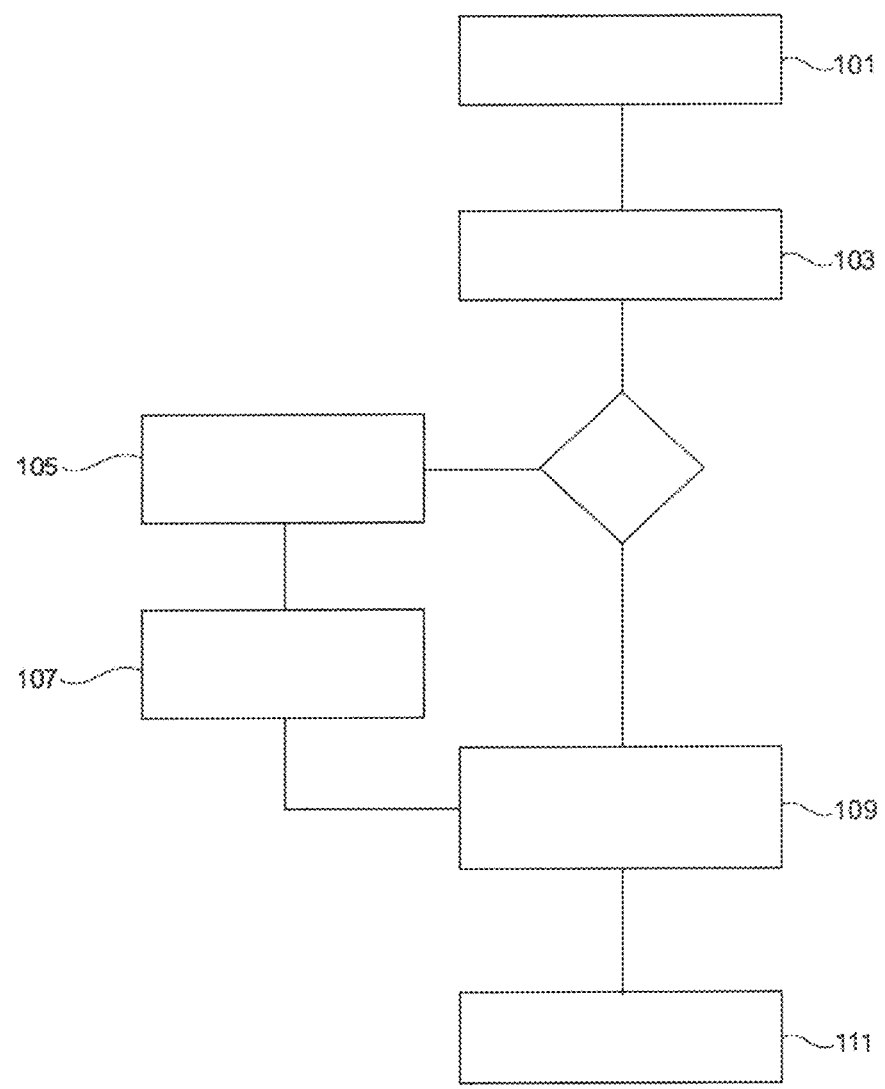
FIG. 10 is a schematic of different embodiment of a method according to the invention.

FIG. 10 illustrates a method according to the present invention.

First, at step 101, several reference intensity patterns $R_L(x,y)$ are recorded. Each reference intensity pattern $R_L(x,y)$ is generated by sending a reference incident monochromatic beam L with propagation directions $P_L$ having mean propagation direction vectors $\vec{u_L}$, onto the wavefront sensor 10, L varying between 1 and N, and x and y denoting coordinates. The reference incident monochromatic beams may exhibit a controlled wavefront shape, such as a planar or a spherical wavefront.

Then, at step 103, a single signal image I(x,y) of the intensity pattern is recorded using the imaging sensor 18. The latter is generated by sending the said multi-angular signal light beam 12 onto the optical mask 14. The light beam 12 comprises the N propagation directions $P_L$ In a variant, reference intensity patterns $R_L(x,y)$ are recorded after capturing the single signal image I(x,y) of the intensity pattern generated by said multi-angular signal light beam 12

In this embodiment, the optical mask exhibits a small angular memory effect.

In order to determine the wavefront shape at all N propagation directions $P_L$ deformation data $T_L^I(x,y)$ are computed at step 109 using the computing means 17. Such data are representative of a diffeomorphism of each reference intensity pattern $R_L(x,y)$.

At step 109, intensity-weight data $W_L^I(x,y)$ is also computed. This feature is representative of an intensity modulation of each reference intensity pattern at propagation direction $P_L$ with mean propagation direction vector $\vec{u_L}$.

All N intensity-weight data $W_L^I(x,y)$ and N deformation data $T_L^I(x,y)$ are computed, for L varying from 1 to N, so as to minimize, for all sampling points (x,y) of the surface area A, from the single signal image I(x,y):

a difference $D_A$ between the single signal image I(x,y) on the one hand, and the sum of reference intensity patterns $R_L$ multiplied by intensity-weight data $W_L^I(x,y)$ and deformed by deformation data $T_L^I(x,y)$, on the other hand:

$$D_A = \left\| I(x,y) - \sum_{L=1}^{N} W_L^I(x,y) R_L\left[(x,y) + T_L^I(x,y)\right] \right\|_A$$

the symbol $\|.\|_A$ designating a norm calculated for all (x,y) sampling points in the surface area A;

The quantity may comprise a regularization term.

Figure 11:
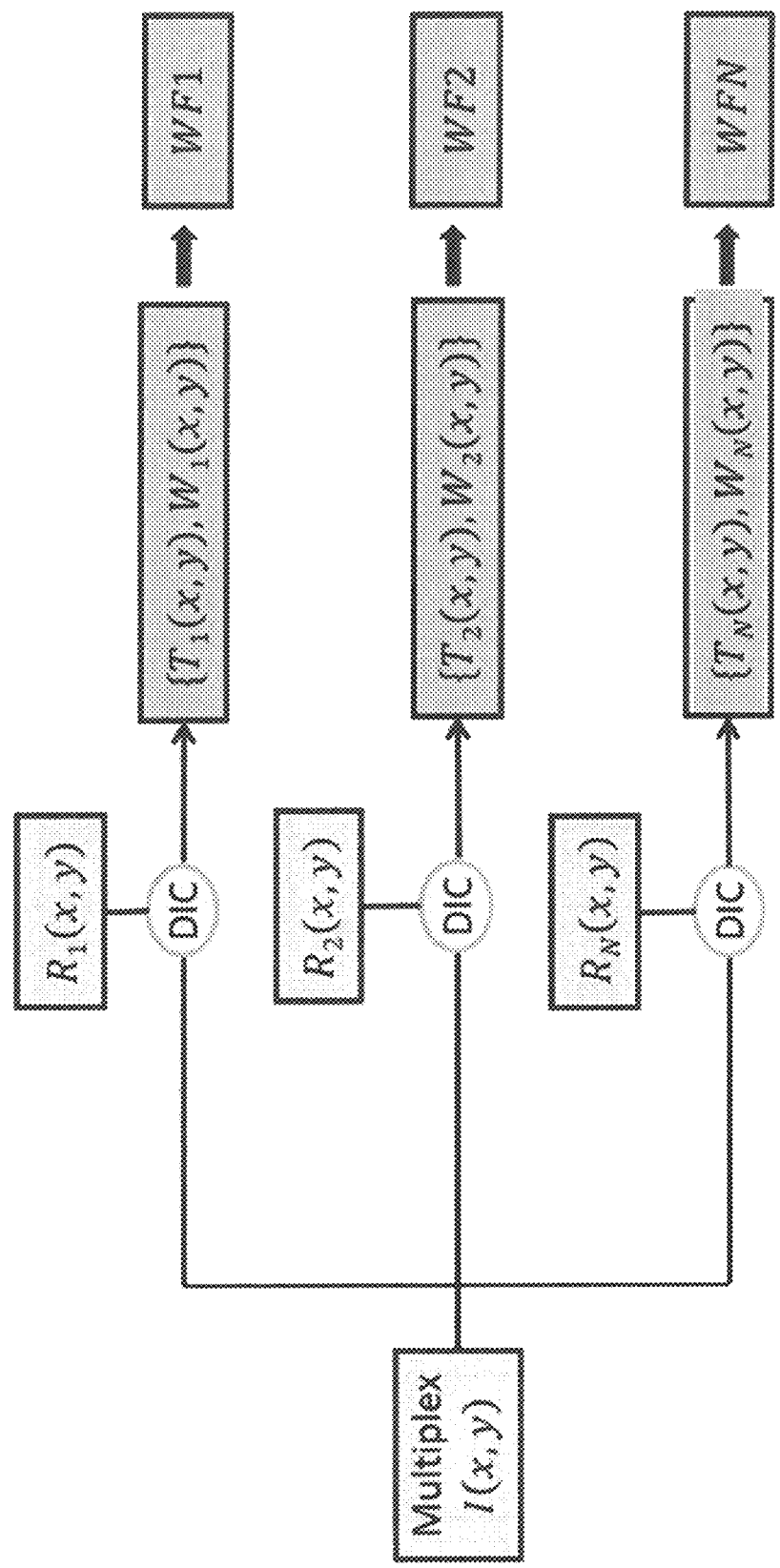
FIG. 11 is a schematic of different embodiment of a method according to the invention.

An optimization method aimed at minimizing the distance $D_A$ is now described in accordance with FIG. 11.

As illustrated, the intensity-weight data $W_L^I(x,y)$ and the deformation data $T_L^I(x,y)$ are estimated by using a Digital Image Correlation method (DIC). In a preferred embodiment, the DIC method is performed by computing zero-mean cross-correlation product images between the signal image I(x,y) and each of the reference intensity patterns. As mentioned previously, the plurality of reference incident beams L are uncorrelated relatively to the zero-mean cross-correlation product. Therefore, the zero-mean cross-correlation product images between the signal image and each one of the reference intensity patterns $R_L(x,y)$ exhibit a peak, the intensity-weight data $W_L^I(x,y)$ being the amplitude of the peak and the deformation data $T_L^I(x,y)$ being the displacement vector between the peak (or its centroid) from the center of the zero-mean cross-correlation product image.

Finally, at step 111 data are generated for each propagation directions $P_L$ representative of: the shape of the wavefront by integrating the deformation data $T_L^I(x,y)$ over at least one direction of the intensity pattern image, preferably over the two directions of the intensity pattern image; and the intensity map based on the intensity-weight data $W_L^I(x,y)$.

In some embodiments, the contrast of the single signal image I(x,y) may decrease with the increase of the amount of angular channels $C_K$. Thus, the accuracy of the wavefronts reconstruction can be affected. It is preferable to rely on a global optimization method to retrieve $T_L^I(x,y)$ and $W_L^I(x,y)$.

Figure 12:
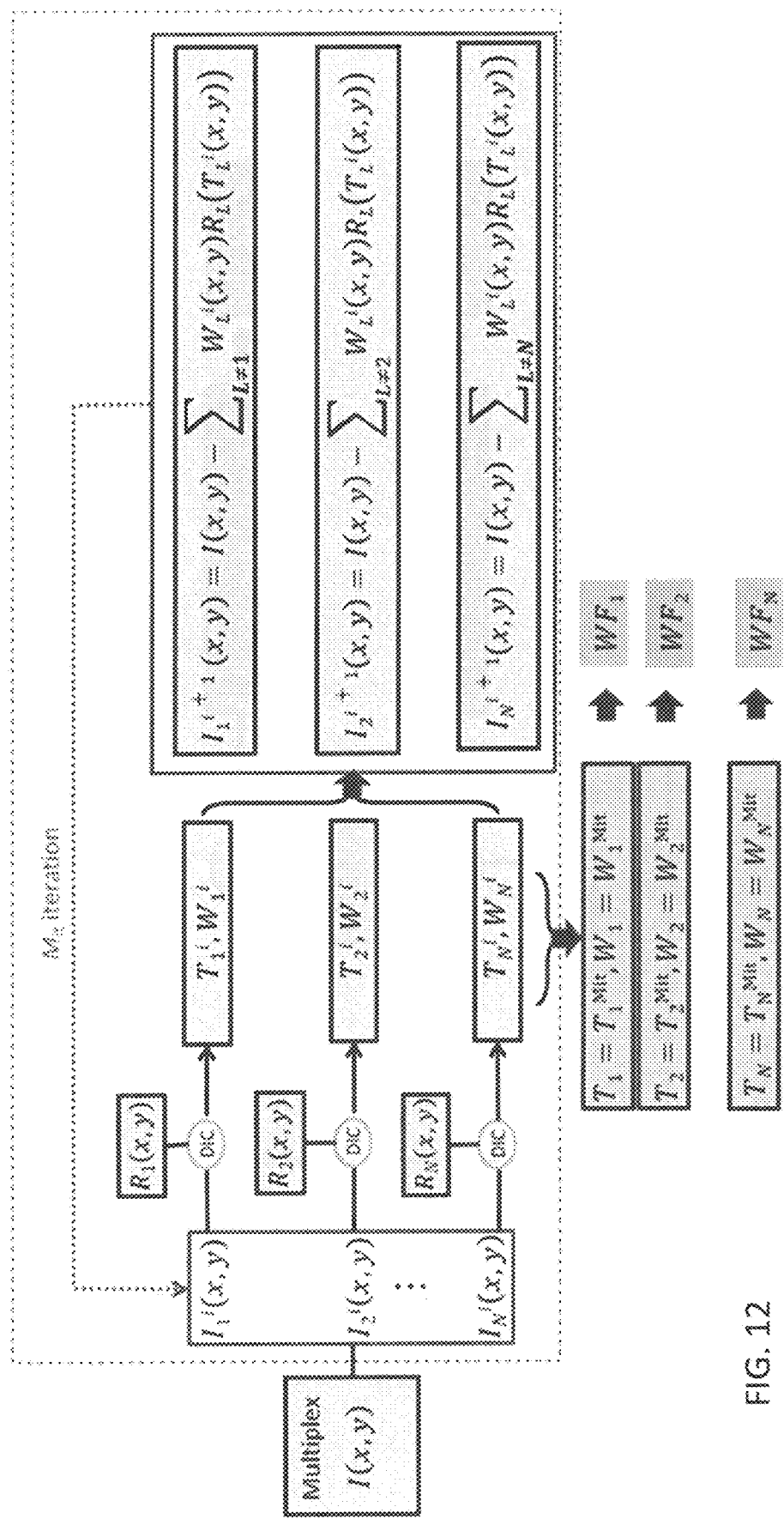
FIG. 12 is a schematic of different embodiment of a method according to the invention.

An example of a global optimization method according to the invention will be now described in accordance with FIG. 12.

Said method consists in iteratively trying to improve the candidate solution of the optimization problem.

At the first iteration M=1, $T_L^{I,1}(x,y)$ and $W_L^{I,1}(x,y)$ are obtained in a similar way as previously described.

Herein, unlike the previous embodiment, $T_L^{I,1}(x,y)$ and $W_L^{I,1}(x,y)$ are not directly integrated. Instead, a second iteration is performed, in order to obtain new values for these data.

To that extent, at this iteration, for each propagation direction $P_L$, the single signal image I(x,y) is replaced by $I^2(x,y) = I(x,y) - \sum_{L \neq K} W_L^{I,1} R_L((x,y) + T_L^{I,1}(x,y))$.

Then, a DIC method is used again to update $T_L^{I,2}(x,y)$ and the weighted coefficient $W_L^{I,2}(x,y)$.

The same process is then repeated for the following iterations as illustrated in FIG. 12. At a given iteration p, for each propagation direction $P_L$:

the single signal image I(x,y) is replaced by $I^p(x,y) = I(x,y) - \sum_{L \neq K} W_L^{I,p-1} R_L((x,y) + T_L^{I,p-1}(x,y))$, then a DIC method is used to update $T_L^{I,p}(x,y)$ and the weighted coefficient $W_L^{I,p}(x,y)$ After M iterations, the final transformation function $T_L^{I,Mit}(x,y)$ and weighted coefficient $W_N^{I,Mit}(x,y)$ are used to recover the wavefronts by using a 2D integration algorithm.

The method described above takes advantage of the fact that the single signal image I(x,y) corresponds to the incoherent sum of the individual intensity patterns from different wavefronts. Hence, any individual intensity pattern $I_L(x,y)$ containing only one individual wavefront can be retrieved by subtracting the other individual intensity patterns from the single signal image I(x,y).

In some applications, for instance for complex distorted wavefronts, it is preferable to work at a local scale rather than to perform the estimation on the global intensity pattern. One possibility consists in splitting the intensity pattern into signal sub-images, each representative of light impinging on a portion A' and to estimate local deformation data $T_L^I(x,y)$ for each sub-image and for every propagation direction $P_L$.

In this case, the method may comprise two additional steps 105 and 107 preceding step 109. At step 105, the single signal image is split into several sub-images of surface A'.

At step 107, for every propagation direction $P_L$ and for each sub-image of surface A', the intensity-weight data $W_L(x',y')$ and the deformation data $T_L(x',y')$ are estimated by:

i) Assuming that $W_L^I(x',y')=W'_L$ and $T_L^I(x',y')=T'_L$ where $W'_L$ is a constant and positive scalar and $T'_L$ a constant two-dimensional translation vector, over the surface area A', with (x',y') coordinates on A', and ii) computing the intensity-weight data $W'_L$ and the deformation data $T'_L$, between the signal sub-image I(x,y) and each of the reference intensity patterns $R_L$(x,y) so as to minimize, for the corresponding surface area A', the difference $D_{A'}$;

$$D_{A'} = \left\| I(x, y) - \sum_{L=1}^{N} W'_L R_L[(x, y) + T'_L] \right\|_{A'}$$

In the same way as for the global surface A, the intensity-weight data $W_L^I$ and the deformation data $T_L^I$ may be estimated by performing a Digital Image Correlation method, notably by computing zero-mean cross-correlation product images, for each signal sub-image, between the signal sub-image and each of the reference intensity patterns. As the plurality of reference incident angular beams L are uncorrelated relatively to the zero-mean cross-correlation product, the zero-mean cross-correlation product image between the signal sub-image and each of the reference intensity patterns $R_L$(x,y) exhibits a peak. The intensity-weight data corresponds to the amplitude of the peak and the deformation data is the displacement vector between the said peak or its centroid from the center of the zero-mean cross-correlation product image.

Finally, at step 109, deformation data $T_L^I(x,y)$ an intensity data WL for all coordinates (x,y) on the surface A are obtained by applying the equality $T_L^I(x,y)=T_L^I(x',y')=T'_L$ and $W_L^I(x,y)=W_L^I(x',y')=W'_L$ with x=x', y=y'.

Figure 13:
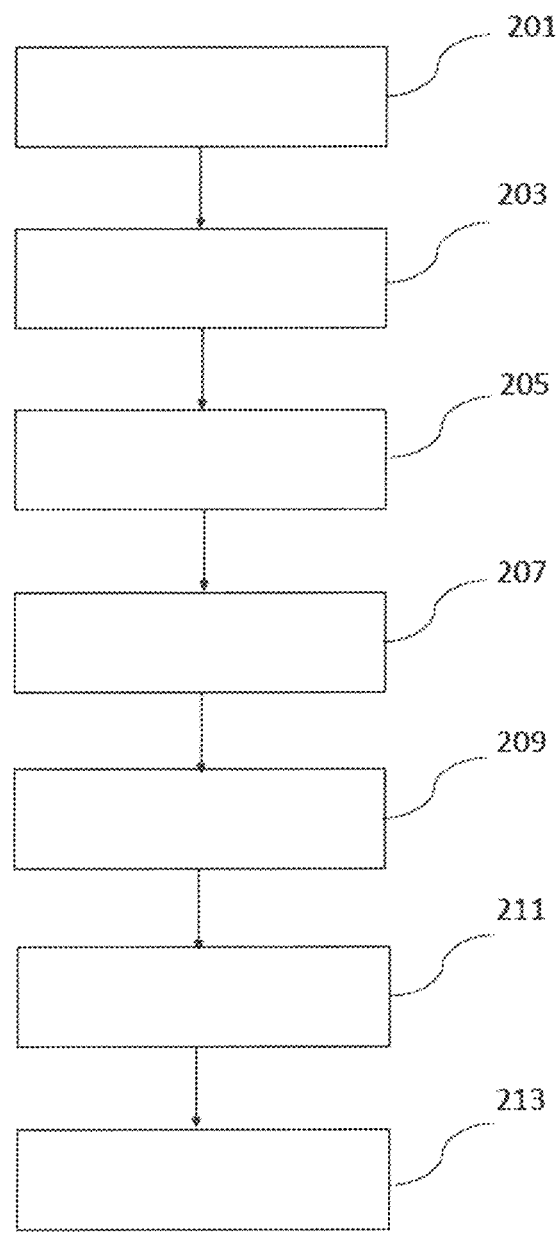
FIG. 13 is a schematic of different embodiment of a method according to the invention.

FIG. 13 illustrates a method according to a further embodiment of the present invention.

Unlike the previous embodiments, the optical mask in the following has a large memory effect angle range $\delta\alpha > \Delta\alpha_{ij}$, for all i,j∈[1,N], with i≠j.

First, at step 201, as in the previous embodiments, the single signal image I(x,y) of an intensity pattern is recorded using the imaging sensor 18. The latter is generated by sending the said multi-angular signal light beam 12 onto the optical mask 14. The light beam 12 comprises the N channels $C_L$ each having a propagation direction $P_L$.

Then, at step 207, several reference intensity patterns $R_L$(x,y) are provided, wherein each reference intensity pattern $R_L$(x,y) corresponds to a respective propagation direction $P_L$, L varying between 1 and N, and x and y denoting spatial coordinates.

To that end, the method comprises, previous to step 207, a step 203 wherein at least one intensity patterns $R_K$(x,y) is recorded using device 16, K being between 1 and N; and if the number of the recorded intensity patterns is smaller than N, the method further comprises a step 205 consisting in generating numerically the other intensity patterns $R_L$(x,y), L being between 1 and N different from K, using the recorded pattern RK, so as to obtain N references patterns corresponding to propagation directions $P_L$, L varying between 1 and N.

Preferably, step 205 comprises first achieving a cross-correlation of the single signal image I(x,y) and the at least one recorded reference patterns $R_K$(x,y). As a result, N maxima are obtained. Then, the at least one recorded reference intensity pattern $R_K$(x,y) is spatially shifted to the corresponding position based on each maximum position and generates the other reference intensity pattern references $R_L$(x,y).

This method takes advantage of the fact that the intensity patterns obtained for a plurality of respective incident angular beams of different propagation directions but having the same wavefront are identical but shifted by an amount $\Delta\alpha \cdot d$, d being a separation distance between the optical mask and the imaging sensor 18.

Alternatively, in step 203, a reference intensity pattern $R_K$(x,y) is generated from an incident beam with a propagation direction $P_L$ different from the propagation directions contained in the single signal image I(x,y).

Then, in step 205, all N references $R_L$(x,y) are generated numerically using the recorded reference intensity pattern $R_K$(x,y) in a similar way as described above, ie by:

achieving a cross-correlation of the single signal image I(x,y) and the recorded reference pattern $R_K$(x,y) for identifying the N maxima, and spatially shifting the recorded reference intensity pattern $R_K$(x,y) to the corresponding position based on each maximum position for generating the N reference intensity pattern references $R_L$(x,y).

In order to determine the wavefront shape at the N propagation directions $P_L$ deformation data $T_L^I(x,y)$ are computed at step 213 using computing means, as well as intensity-weight data $W_L^I(x,y)$.

First, at a step 209, the intensity pattern I(x,y) is split into several sub-images I'(x,y), each representative of light impinging on a surface portion $A_n$ of the imaging sensor with An having a large extent $L_{An}$ smaller than $\Delta\alpha_{ij} \cdot d$.

When the imaging sensor is a matrix, $A_n$ corresponds advantageously to the surface of a micropixel.

At step 211, for each surface portion $A_n$, the intensity-weight data $W_L^I(x,y)$ and the deformation data $T_L^I(x,y)$ are calculated between the signal sub-image I' and each of the reference so as to minimize, for all sampling points (x y) of each surface portion $A_n$, from the single signal sub-image I'(x,y):

a difference $D_{An}$ between the sub-image I' on the one hand, and the sum of reference intensity patterns $R_L$ multiplied by intensity-weight data $W_L^I(x,y)$ and deformed by deformation data $T_L^I(x,y)$, on the other hand:

$$D_{A_n} = \left\| I'(x, y) - \sum_L W_L^I(x, y) R_L[(x, y) + T_L^I(x, y)] \right\|_{A_n}$$

the symbol $\|.\|_{A_n}$ designating a norm calculated for all (x,y) sampling points in the surface portion $A_n$;

The quantity may comprise a regularization term.

In some embodiments, the intensity-weight data $W_L$(x,y) and the deformation data $T_L$(x,y) are estimated by:

iii) Assuming that $W_L^I(x,y)=W'_L$ and $T_L^I(x,y)=T'_L$ where $W'_L$ is a constant and positive scalar and $T'_L$ a constant two-dimensional translation vector, over the surface area $A_n$, with (x,y) coordinates on $A_n$, and iv) computing the intensity-weight data $W'_L$ and the deformation data $T'_L$, between the signal sub-image and each of the reference intensity patterns $R_L$(x,y) so as to minimize, for the corresponding surface area $A_n$, the difference $D_{An}$;

$$D_{A_n} = \left\| I(x, y) - \sum_L W'_L R_L[(x, y) + T'_L] \right\|_{A_n}$$

In the same way as was previously described with respect to FIG. 11, the intensity-weight data $W_L^I$ and the deformation data $T_L^I$ may be estimated by a Digital Image Correlation method. The that end, a zero-mean cross-correlation product images is computed, for each surface portion $A_n$, between the signal sub-image and each of the reference intensity patterns, the plurality of reference intensity patterns being uncorrelated in the sub-image I' relatively to the zero-mean cross-correlation product, the zero-mean cross-correlation product image between the signal sub-image I' and each of the reference intensity patterns $R_L(x,y)$ having a peak, the intensity-weight data being the amplitude of the peak and the deformation data $T_L^I$ being the displacement vector between the said peak or its centroid from the center of the zero-mean cross-correlation product image.

Finally, at step 213, data are generated for each propagation direction $P_L$ representative of: the shape of the wavefront by integrating the deformation data $T_L^I(x,y)$ over at least one direction of the intensity pattern image, preferably over the two direction of the intensity pattern image; and the intensity map based on the intensity-weight data $W_L^I(x,y)$.

In some embodiments, the contrast of the single signal image $I(x,y)$ may decrease with the increase of the amount of angular channels Ck. Thus, reconstruction of wavefronts accuracy can be affected. It is preferable to achieve a global optimization method to retrieve $T_L(x,y)$ and $W_L(x,y)$.

An example of a global optimization method according to the invention similar to the one of FIG. 12 will be now described.

Said method consists in iteratively trying to improve the candidate solution of the optimization problem.

For each surface portion $A_n$,

At the first iteration M=1, $T_L^{I,1}(x,y)$ and $W_L^{I,1}(x,y)$ are obtained in a similar way as previously described.

Then a second iteration is performed, in order to obtain new values for these data.

To that extent, at this iteration, for each propagation direction $P_L$, the signal sub-image I'(x,y) is replaced by $I'^{,2}(x,y)=I'(x,y)-\Sigma_{L\neq K}W_L^{I,1}R_L((x,y)+T_L^{I,1}(x,y))$.

Then, a DIC method is used again to update $T_L^2(x,y)$ and the weighted coefficient $W_L^2(x,y)$.

The same process is then repeated for the following iterations. At a given iteration p, for each propagation direction $P_L$:

the signal sub-image I'(x,y) is replaced by $I'^{,p}(x,y)=I'(x,y)-\Sigma_{L\neq K}W_L^{I,p-1}R_L((x,y)+T_L^{I,p-1}(x,y))$, then a DIC method is used to update $T_L^{I,p}(x,y)$ and the weighted coefficient $W_L^{I,p}(x,y)$ After M iterations, the final transformation function $T_L^{I,Mit}(x,y)$ and weighted coefficient $W_N^{I,Mit}(x,y)$ are used to recover the wavefronts by using a 2D integration algorithm.

Figure 14:
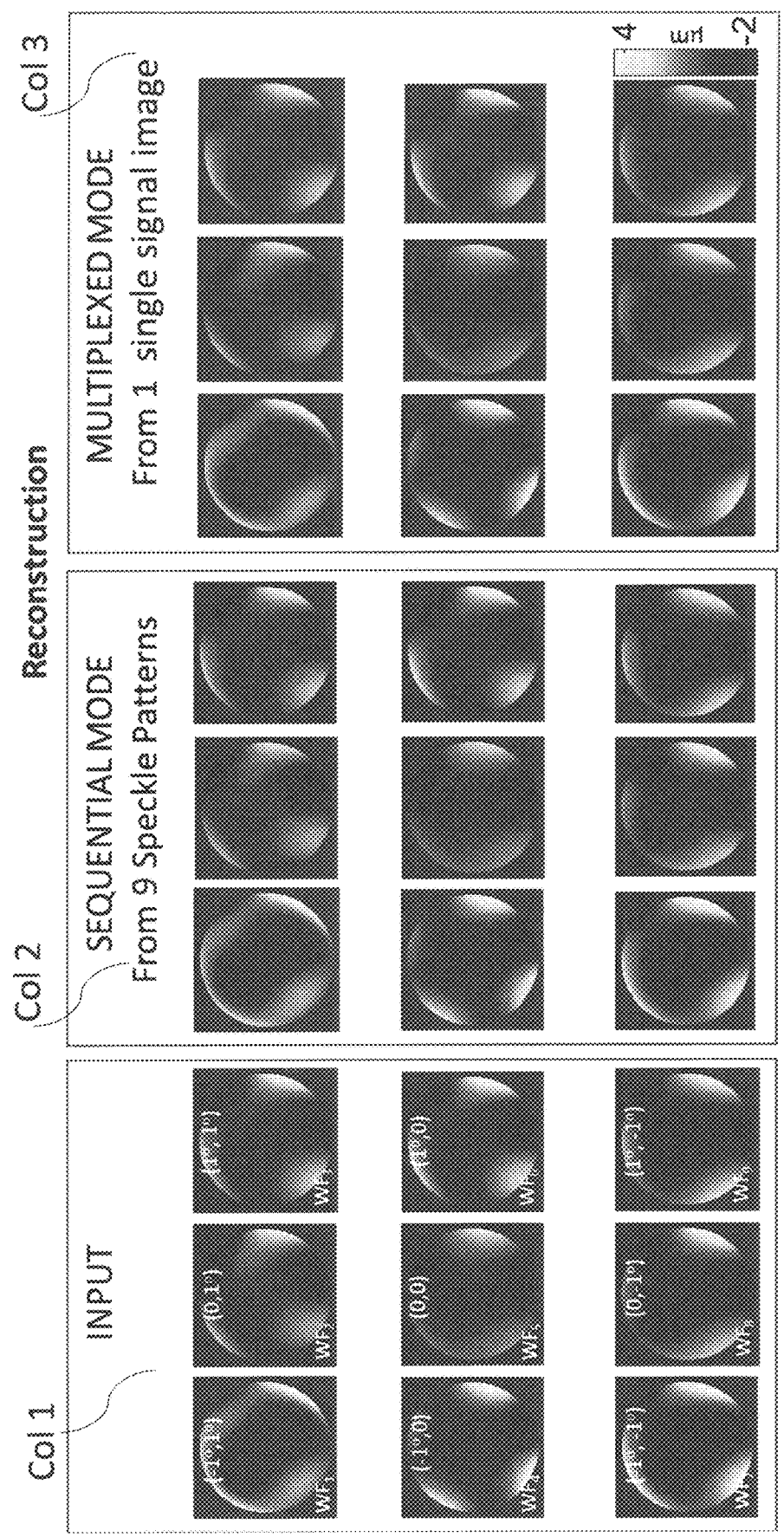
FIG. 14 shows an example of reconstruction of the shapes of wavefront using a method according to the invention.

FIG. 14 displays an example of a reconstruction of a multi-angular light beam illuminated the imaging sensor 18. In the example illustrated herein, a group of 3×3 wavefronts is used as the input, in which each of them is generated by using a sum of Zernike modes with random coefficients), the wavefronts are distributed around the wavefront in the center with a fix separation angle of 1 degree. The left column Col 1 represents the inputs. The column in the middle shows the results using a sequential method.

The right column Col 3 illustrates the wavefronts reconstruction by performing the method according to the present invention. The results show that the multiplexed mode, ie simultaneous angular-wavefront measurement according to the invention, works as well as the sequential mode.

FIGS. 15A to 15D are an experimental demonstration been performed using two fluorescent guide stars S1 and S2. An excitation laser beam excites through a spatial light modulator two fluorescent bead independently. It can be adjusted properly to excite any or both of them, which enables to switch between the sequential modes and the multiplexed mode. The Wavefront sensor is located in a Fourier plane of a microscope objective.

Figure 15A:
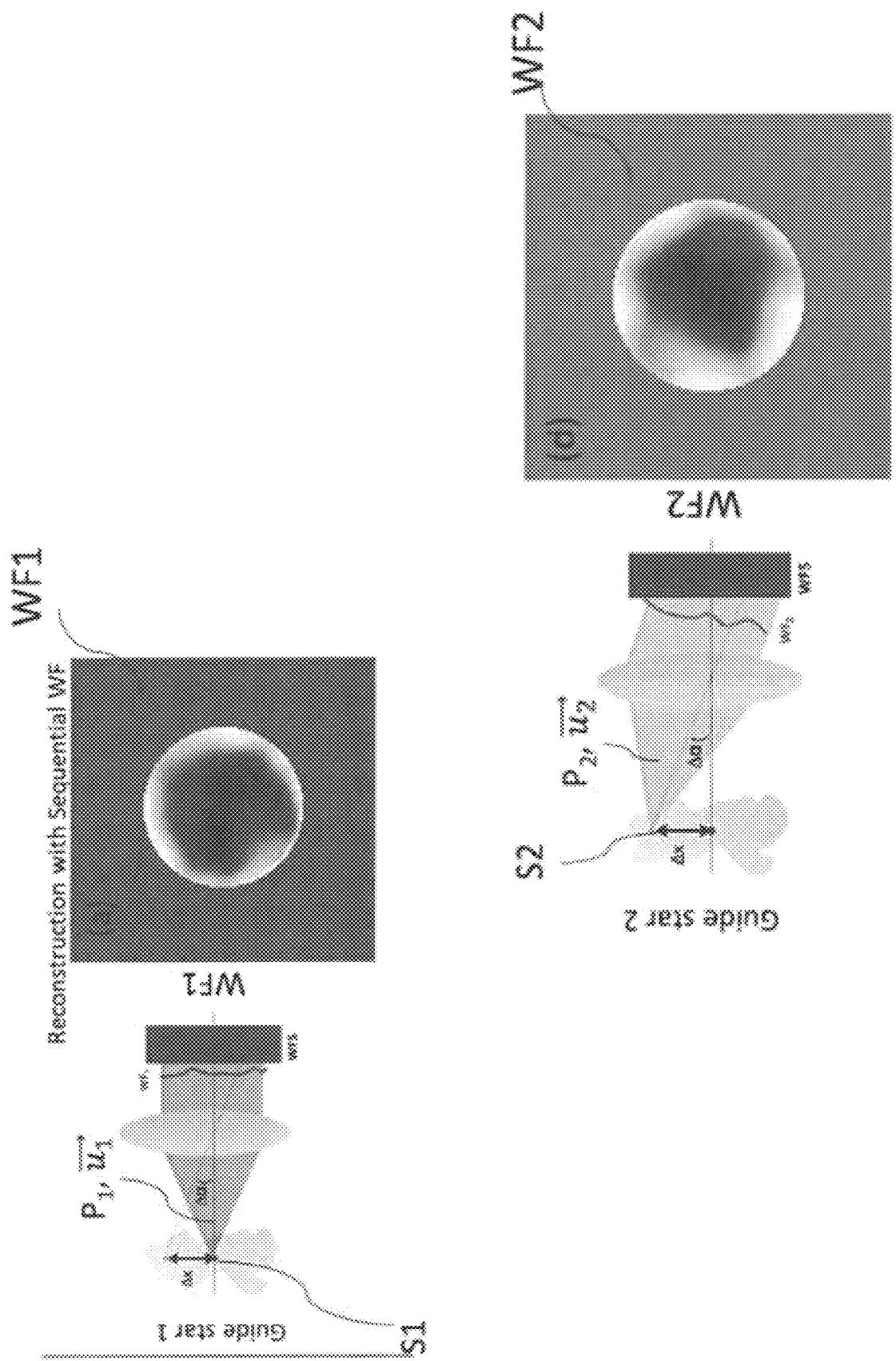
FIG. 15 shows an example of reconstruction of the shapes of wavefront using a method according to the invention.
Figure 15B:
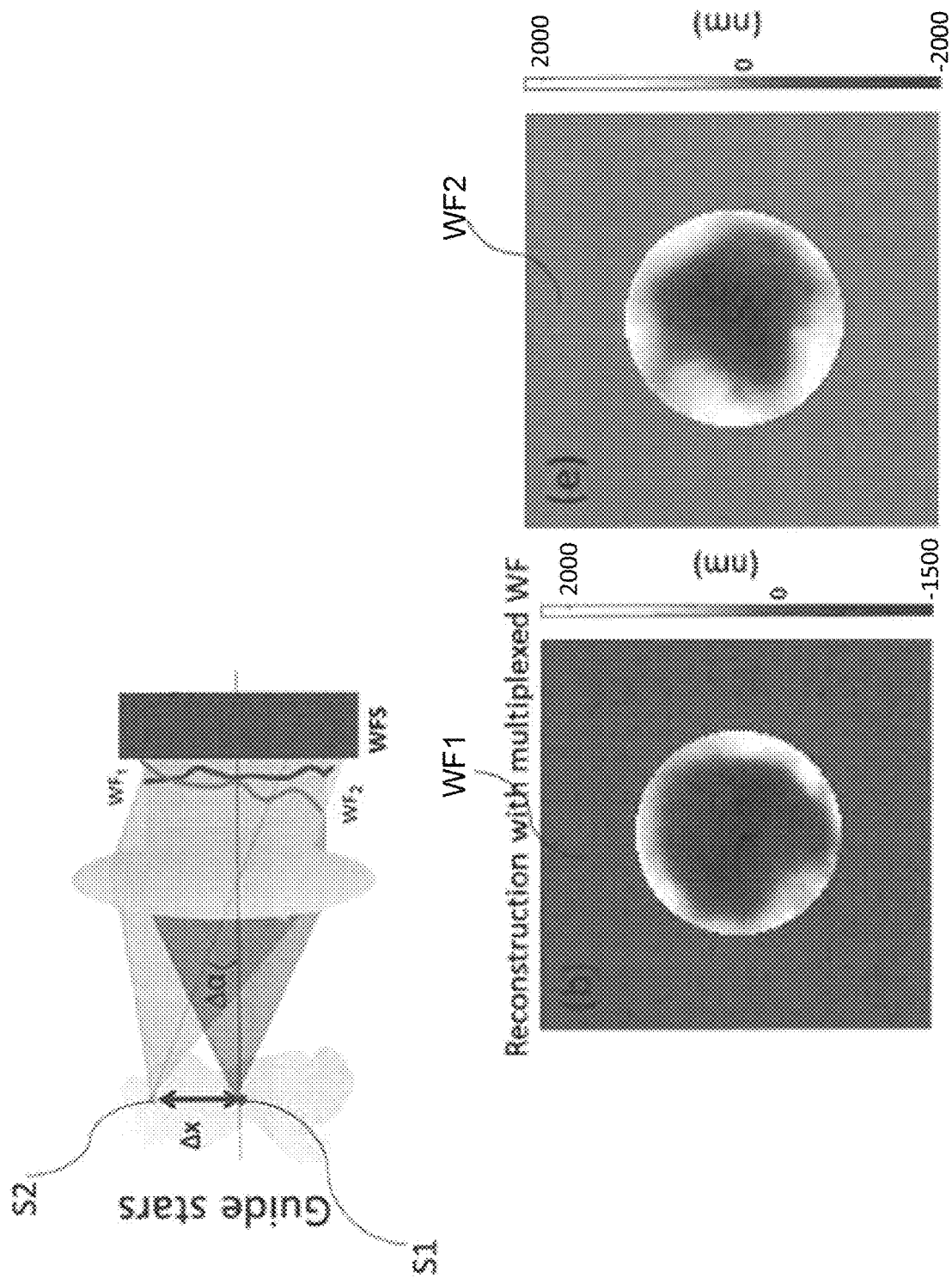
Figure 15C:
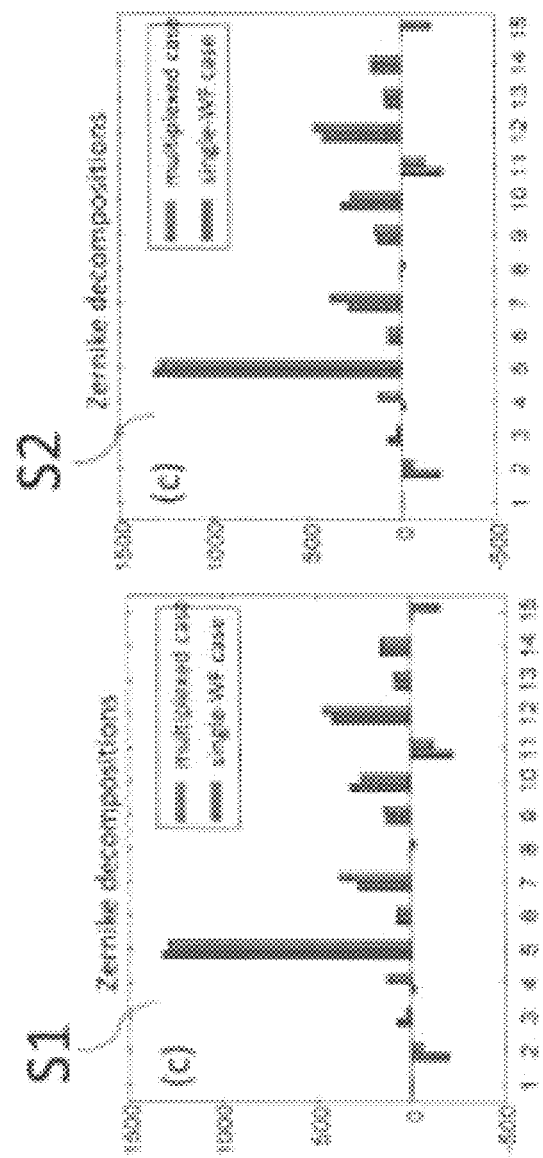

In the case of sequential mode, the two wavefronts are retrieved by sequentially exciting the two guide stars and recover the wavefront as illustrated in FIGS. 15A and 15B. FIG. 15C illustrates the case where the two guides stars are simultaneously excited in the multiplexed mode. As illustrated, the two wavefronts are recovered with a single intensity pattern according to the present invention. As demonstrated in FIG. 15C, the wavefront reconstruction according to the present invention performs as well as the sequential mode by comparing their Zernike decomposition.

FIGS. 16A to 16D refer to a reconstruction of wavefronts of a multi-angular light beam emitting by several guide stars.

Figures 16A, 16B:
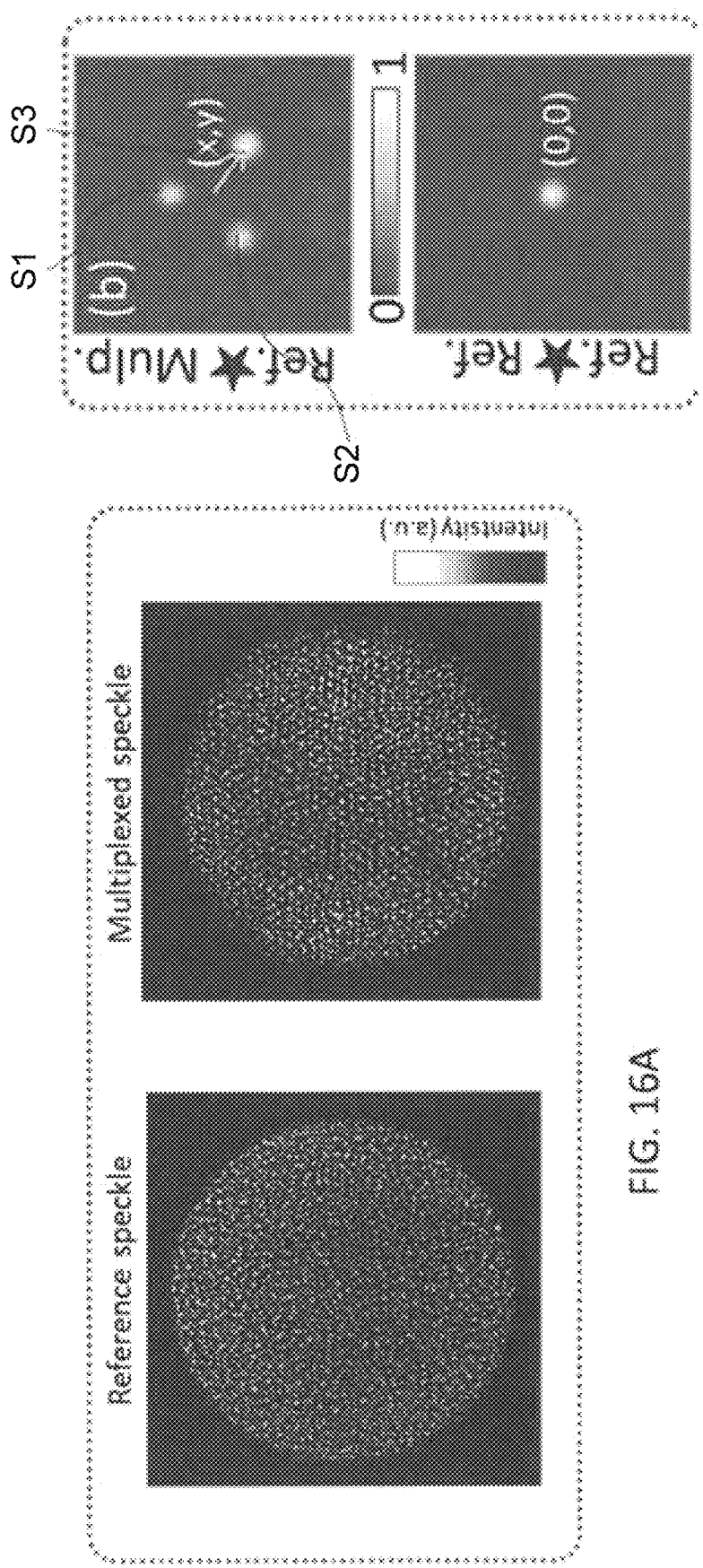
FIG. 16 shows an example of reconstruction of the shapes of wavefront using a method according to the invention.

In the example illustrated in FIG. 16A, an intensity single signal image $I(x,y)$ corresponding to several guide stars S1, S2 and S3 located in the object plan, is recorded using the device 16. The optical mask of the device used herein has a large angular memory effect. In the illustrated example, the optical mask is a diffuser In order to reconstruct the wavefronts contained in the intensity pattern, a reference pattern $R_0$ which is obtained from a plane wave is recorded, as shown in FIG. 16A.

Thanks to the large memory effect range of the diffuser, the individual intensity pattern generated from each guide star S1, S2 and S3 would have a relative global shift, in the case of aberration, i.e. low phase gradient. Therefore, the cross-correlation between the reference R0 and the single signal image $I(x,y)$ enables to find several maxima, corresponding to the number of guide stars, as it can be seen in FIG. 16B.

Since the maximum of the autocorrelation always locates in the center, the relative shift between the reference intensity pattern R0 and the corresponding individual intensity pattern of each guide star can be easily recovered. Each wavefront contained in the single signal image can be retrieved by shifting the reference speckle to corresponding positions. Three wavefronts are retrieved in FIG. 16C with the any one of the optimization methods described above.

Figure 16C:
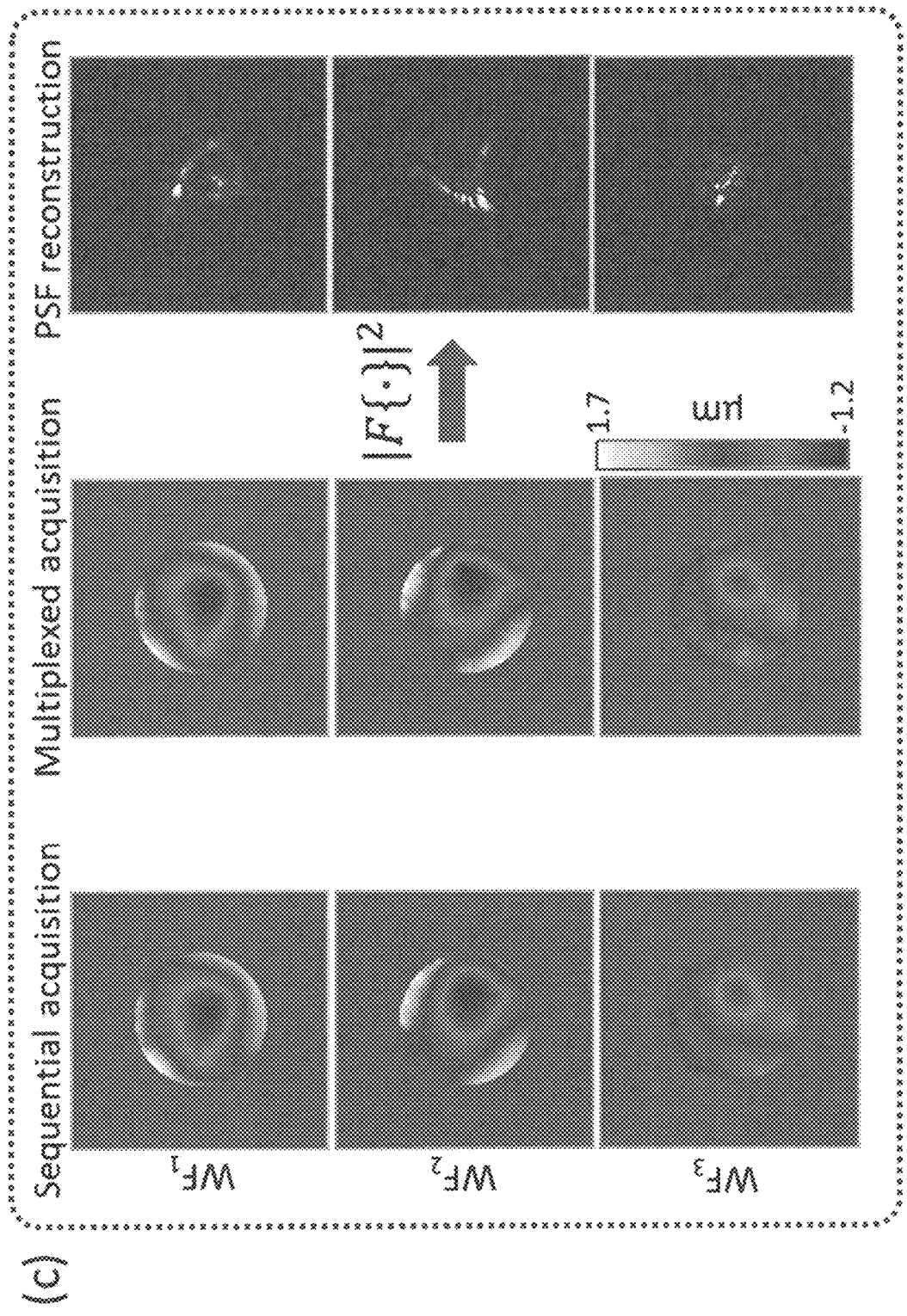

To demonstrate validity of the recovered wavefronts from the single signal image, each retrieved Wavefront is compared with the one obtained using sequential acquisition, ie corresponding to a single intensity pattern, as it is shown in FIG. 16C. In this figure, left column col 1 corresponds to the sequential mode, column in the middle corresponds to the multiplex acquisition according to the present invention and right column col 3 corresponds to Point Spread functions (PSFs).

Figure 16D:
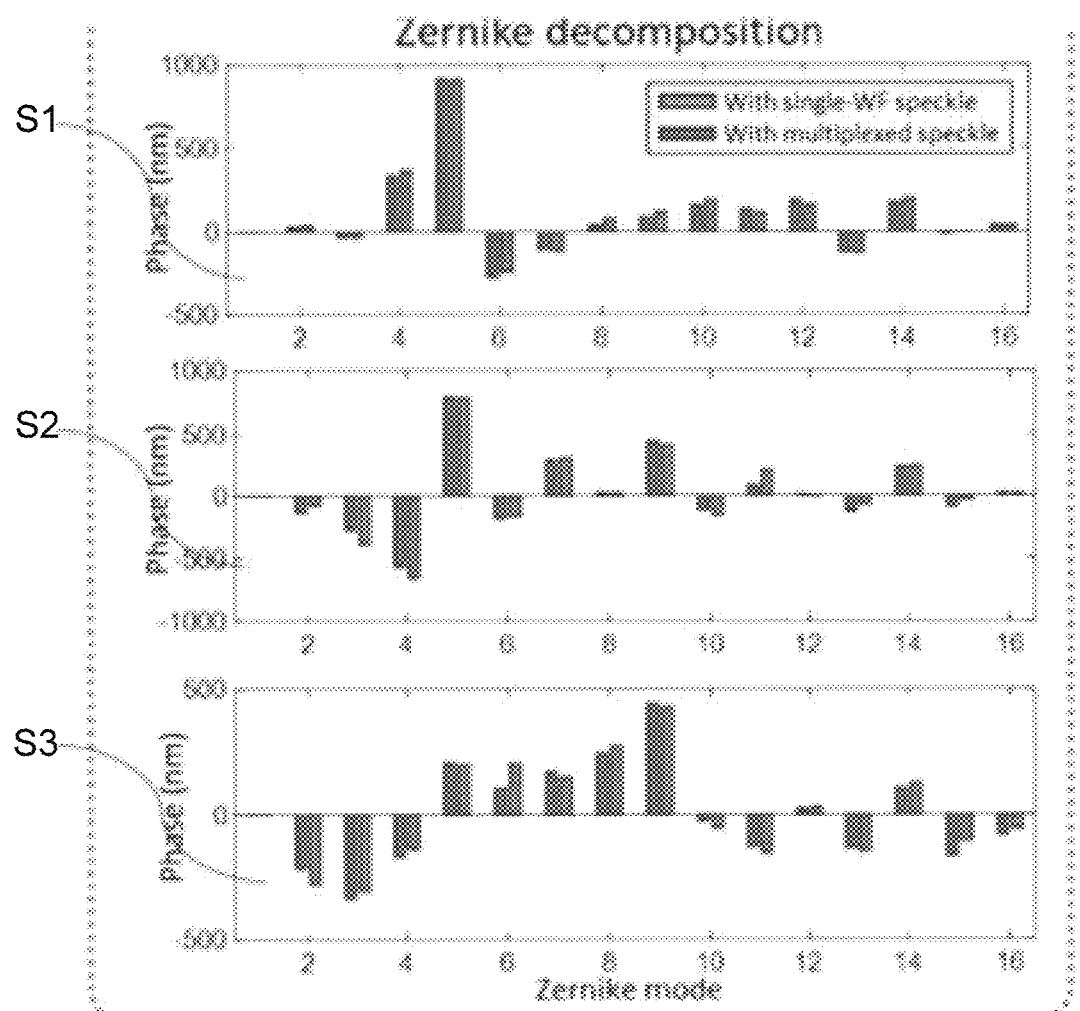

Then, all of them are decomposed into the first 16 Zernike modes, shown in FIG. 15D. As it is shown, a good agreement between sequential and multiplexed measurement. The corresponding Point Spread functions (PSFs) can be calculated from these wavefronts, as shown in FIG. 16D and enable to deconvolve the images.

Figures 17A, 17B:
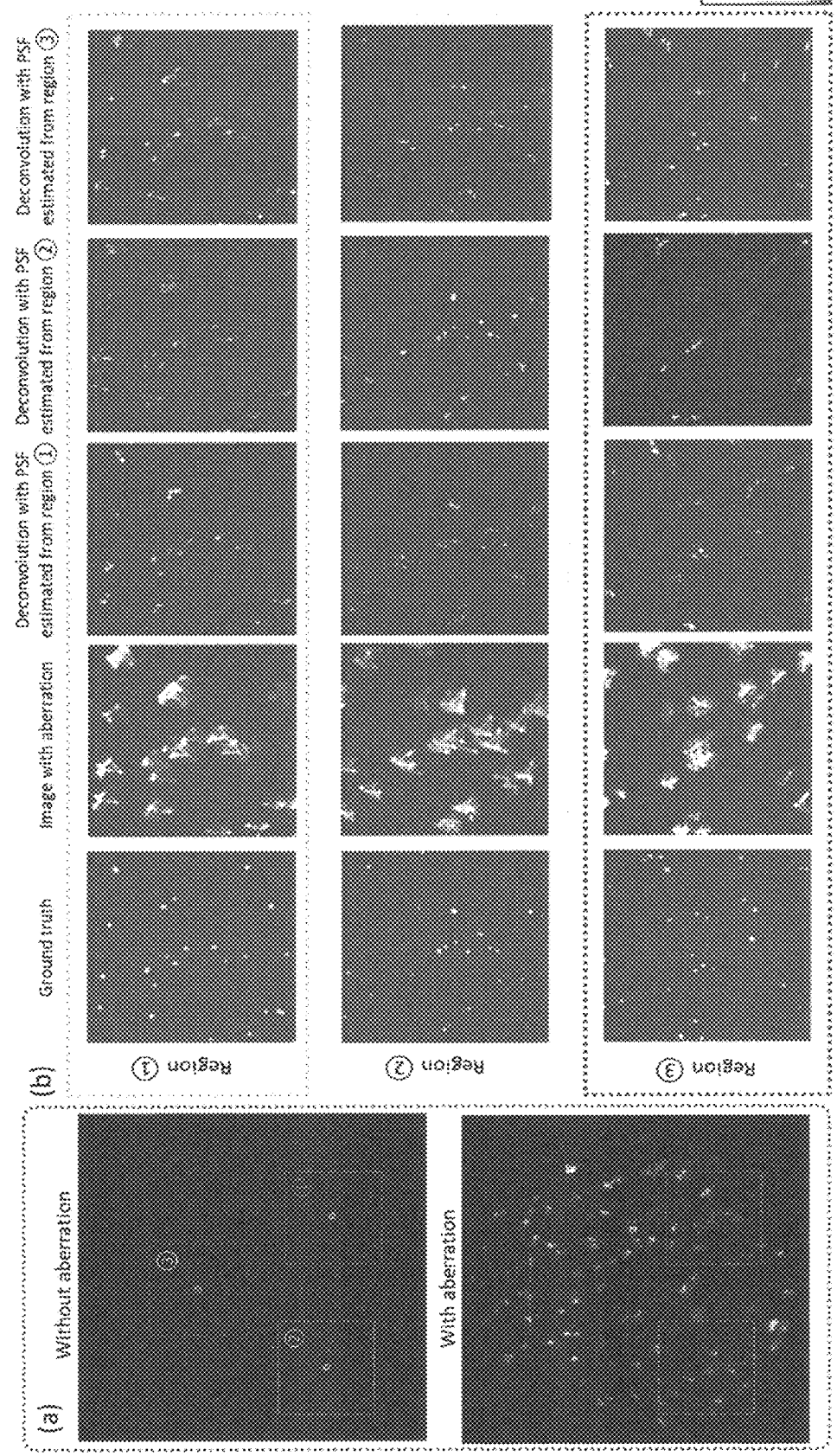
FIG. 17A illustrates the application of reconstruction wavefront method of some embodiments to the adaptive optics.
FIG. 17B illustrates the application of reconstruction wavefront method of some embodiments to the adaptive optics.

FIGS. 17A and 17B illustrate the need in adaptive optics for measuring several wavefronts incoming from different regions in the field of view.

In adaptive optics, the wavefront is generally measure from a single guide star. An image, for instance acquired with a camera located in the image plane can then be corrected from this aberration either using an active correction (eg. spatial light modulator in the pupil plane) or a passive correction (deconvolution). However, as the aberrations vary in the field of view, this correction is generally efficient only within an "isoplanatic patch" around the considered guide star. This effect usually limits the field of view in adaptive optics. The multiplexed wavefront measurement according to the present invention allow to measure the aberrations from different guide stars in different isoplanetic patch and then allow to enlarge the Field of view after correction. Here, a deconvolution method (Richardson-Lucy algorithm) is used to illustrate this point. Many florescent beads are images and the aberration of 3 beads, located in different isoplanetic patches are acquired (Region 1,2,3 in FIG. 17A).

In FIG. 17A, the imaging results are compared with and without the aberration, which is caused here by inserting a diffuser between the sample and the objective. A circle in each region indicates the guide star from which the wavefronts have been measured. Each recovered PSF (from each recovered WF) is used to specifically deconvolve the three selected areas.

The results are shown in FIG. 17B. First, the recovered wavefronts from the single signal Image I(x,y) can be used to decrease the aberration and improve the image quality; second, the multiplexed measurement can increase the FOV of adaptive optic based microscopy. Specifically, the deconvolution results of certain area using the corresponding measured PSF are always better than the others, which even fail to recover the information of the selected area. The invention is not limited to the described embodiments, and various variations and modifications may be made without departing from its scope.

Figures 18A, 18B, 18C:
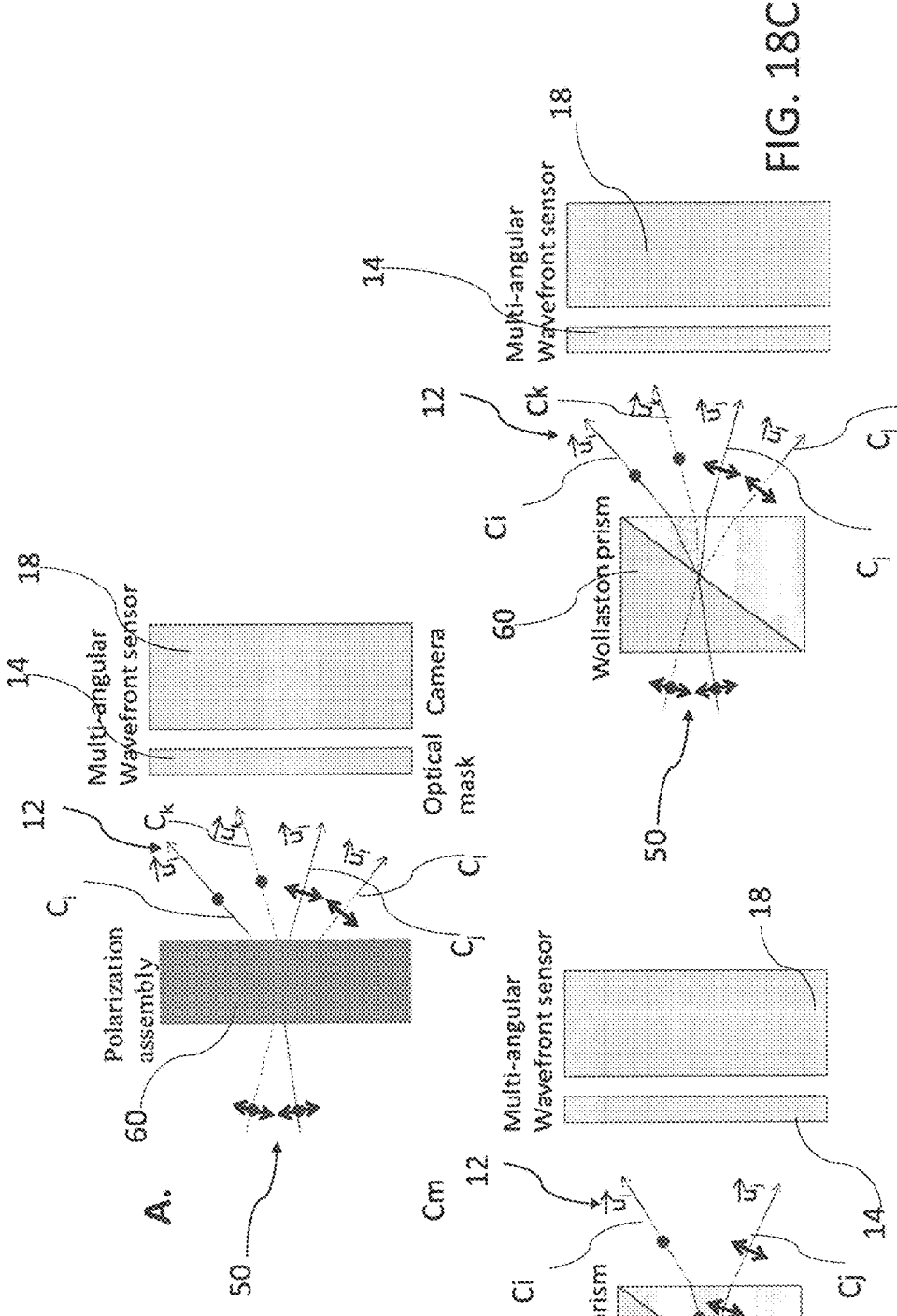
FIG. 18A is a schematic illustration of an embodiment of an optical system according to the invention.
FIG. 18B is a schematic illustration of an embodiment of an optical system according to the invention.
FIG. 18C is a schematic illustration of an embodiment of an optical system according to the invention.

For example, the multi-angular signal light beam 12 may be generated by illuminating a polarization assembly 60 located before the wavefront sensor 14 and 18 by an initial light beam 50 containing at least one angular channel as illustrated in FIG. 18A.

As shown, a polarization assembly 60 is located before the optical mask 14 in order to encode several polarization states of one or several wavefronts into N angular channels $C_L$.

The Polarization assembly 60 may contains at least one polarization optic, for example a quarter wave-plate, a half-waveplate, a polarizer, a Wollaston prism, a Glan-Taylor polarizer, a Glan-Thomson polarizer, a Rochon prism a Nomarski prism or any other polarization dependent optic, so that different polarization states of the initial light beam 50 are encoded into different angular channels Ci, Ck, Cj, Cl of the multi-angular signal light beam 12.

FIGS. 18B and 18C relate to specific embodiments where the polarization assembly 60 is a Wollaston prism which generates for each incident wavefront, two separate linearly polarized outgoing wavefronts with orthogonal polarization and distinct propagation direction.

The invention is not limited to the described embodiments.

The optical mask may be a diffractive optical element.

The optical mask 14 may be an optical fiber bundle, a metasurface, or a freeform optical element.

The optical mask 14 may be an array of micro-optical elements, each micro-optical element generating on the imaging sensor an intensity pattern different from the intensity pattern generated by the micro-optical elements located at least in its vicinity.

The optical mask 14 may be an array of micro-lenses randomly arranged spatially.

ADDITIONAL EXAMPLE OF INVENTION

In an embodiment, a method according to the present invention relies on the specific properties of random intensity patterns generated by diffusers or more generally by an optical mask having the optical properties:

i) to cause the intensity pattern to depend on the wavefront shape, so that a tilt applied to the wavefront shape results in a displacement amount of the intensity pattern, ii) to produce uncorrelated intensity patterns over at least one surface area A of the imaging sensor, for a plurality of respective incident angular beams of different propagation directions having a same wavefront shape, The principle is described below.

If two beams exhibit the same wavefront and the same intensity distribution, and only differ in their propagation direction vector, the intensity patterns on a micropixel will be different. The similarity degree between two intensity patterns $\{s_j\}_{j=1,2}$ obtained at two different propagation direction vectors depends on the separation angle $\Delta\alpha_{ij}$.

The degree of similarity between two patterns can be mathematically characterized using several correlation tools. One solution to characterize two intensity patterns consists in localizing critical points of the intensity such as intensity maxima and to look for correlations between intensity maxima localization of two patterns. The localization correlation can be quantified using a Pearson correlation coefficient. It can also be quantified using the mean average distance to the nearest neighbor weighted by the critical point density. Such correlation characterization between two different populations of critical points in different field patterns was achieved in Gateau et al. ArXiv 1901:11497.

Alternatively, correlation between two intensity patterns is characterized by computing the zero-mean cross-correlation product. The statistical average of the cross-correlation product between two uncorrelated random signals (of zero mean) is zero.

For intensity patterns $\{R_L\}_{L=1,2}$:

$$\langle(R_1 - \langle R_1\rangle) * (R_2 - \langle R_2\rangle)\rangle = 0$$

Where $\langle.\rangle$ stands for a statistical average. This statistical average may be achieved by integrating the intensity pattern over a given surface area of the imaging sensor under ergodic hypothesis. Conversely, the zero-mean cross-correlation product of a signal intensity pattern with itself, also called auto-correlation function, is a peaked function:

$$C(R_1, R_2) = (R_1 - \langle R_1\rangle) * (R_1 - \langle R_1\rangle) = \delta(r)$$

Where $\delta$ designates the Dirac distribution, for example if $s_1$ is assumed to be of variance 1, and r is a spatial coordinate on the imaging sensor.

An optical mask may be designed so that to satisfy orthogonality properties between patterns obtained at different propagation direction vectors.

Alternatively, a diffuser generating propagation direction-dependent random intensity patterns, speckles.

Mathematically, two uncorrelated random intensity patterns (or speckles) are thus statistically orthogonal relatively to the zero-mean cross-correlation product.

In cases where the intensity pattern is a speckle, the integration surface area should at least contain one "speckle grain" and the larger the integration surface area, the better the validity of the orthogonality approximation. The zero-mean cross-correlation product thus provides a useful inner product.

Noteworthy, the orthogonality property satisfied by speckles generated by a diffuser is in particular true in a statistical sense, or in other words, when averaged over a large amount of speckle grains.

In some embodiments, optical masks with tailored properties may be designed to optimize the orthogonality of patterns obtained at different propagation direction vectors. In this case, regular diffuser would be replaced by specifically engineered diffractive optical elements or pseudo-diffusers. Optimizing the orthogonality of patterns not only reduces the cross-talk between angular channels but also provides a simple mean to retrieve the wavefronts at each angular channel thanks to the simple zero-mean cross-correlation product or a Wiener deconvolution.

Mathematical Grounding, Theoretical Principle

Given a signal light beam composed of a plurality of angular channels having propagation direction vectors $\{\vec{u_1}, \ldots, \vec{u_n}\}$.

If illuminating the diffuser with such a multi angular light beam, every individual propagation direction vector will produce its own proper signal intensity pattern. The total signal intensity pattern of the a multi-angular beam is then the sum of all the individual signal intensity patterns. In a calibration step, the reference intensity patterns $s_j(\vec{r})$ are obtained at each individual propagation direction vector $\vec{u_j}$, where $\vec{r}$ is the spatial coordinate vector on the imaging sensor. In an embodiment, the wavefront changes are, in particular, beam-tilts, hence resulting in global shifts of the angular signal intensity patterns at the imaging sensor. The total single signal intensity pattern at the imaging sensor 18 will then be:

$$I(\vec{r}) = \sum_{j=1}^{n} \beta_j R_j(\vec{r} - \vec{r}_j) \quad (1)$$

where $\mu_j$ is the weight of the contribution to the signal beam at propagation direction vector $\vec{u_j}$ and $\vec{r}_j$ a translation vector resulting from the beam-tilt.

Mathematical treatments allow to retrieve every individual $\vec{u_j}$ and $\vec{r}_j$;

To achieve so, the zero-mean cross-correlation product on $R_n$ may be performed:

$$\langle(I - \langle I \rangle) * (R_n - \langle R_n \rangle)\rangle = \sum_{j=1}^{n} \beta_j \langle(R_j(\vec{r} - \vec{r}_j) - \langle R_j \rangle) * (R_n - \langle R_n \rangle)\rangle$$

$$\langle(I - \langle I \rangle) * (R_n - \langle R_n \rangle)\rangle = \beta_n \delta(\vec{r} - \vec{r_n})$$

Where $\langle . \rangle$ stands for a statistical average. The result of this mathematical treatments may be a translation image exhibiting a peaked function of amplitude $\beta_j$, whose peak is centered at $\vec{r}_j$. The parameter $\vec{r}_j$ gives access to the uniform deformation data $T_L(x,y) = -\vec{r}_j$ while $\beta_j$ gives access to the uniform intensity weight data $W_L(x,y) = \beta^j$ of the beam at propagation direction vector $\vec{u_j}$.

In the following, several possible algorithmic implementations are cited for retrieving these parameters. However, whatever the algorithm used, the orthogonality of the propagation direction-dependent reference intensity patterns relatively to the zero-mean cross-correlation product is the common theoretical grounding requirement.

Practical Algorithmic Implementation

In some embodiments, typical wavefront distortions are more complex than simple tilts. Integration of the displacement vector maps will then provide the wavefronts, as described above.

Algorithms such as Demon Algorithm may be used in order to compute directly a distortion map (Berto, P., Rigneault, H., & Guillon, M. (2017), Wavefront sensing with a thin diffuser. Optics letters, 42(24), 5117-5120). Deep-learning computational approaches based on neuronal networks can also be implemented in order to find the distortion maps.

A more simple approach consists in splitting the original intensity map into macro-pixels. At a "local scale", the signal intensity pattern is just translated and pattern deformation may be neglected, making algorithms more simple. The "local" translation of the signal intensity pattern is proportional to the "local tilt" of the wavefront. One algorithmic difficulty consists defining what the size of the "local scale" is, what should the size of the macro-pixel be. In practice, it depends on geometrical and physical parameters of the WFS. This point is thus discussed now.

As a first simple algorithmic implementation, the zero-mean cross-correlation product, extensively discussed above, may be used. At the defined "local scale", the signal intensity pattern is just a translation of the reference intensity pattern. A crop in the pixilated full field camera image of the signal intensity pattern must thus be performed. The crop size now defines a macro-pixel (composed of several camera pixels), which will correspond, in the end, to the phase pixel; i.e. the pixel of the final phase image. Although the simplest solution consists in considering a square macro-pixel of constant size, the macro-pixel size may vary depending on the camera region. The size of the macro-pixel is a balance between the spatial resolution of the final phase image (the larger the macro-pixel, the fewer they are) and the angular resolution of the WFS (the larger the macro-pixel, the larger the number of speckle grains per macro-pixel and the larger the number of orthogonal angular modes over a given angular width).

Once the signal intensity pattern is split into macro-pixels, every macro-pixel can be projected on the corresponding macro-pixels of the reference intensity pattern, thanks to the zero-mean cross-correlation product, as described above.

Alternatively, a Wiener deconvolution can be used rather than a zero-mean cross-correlation product. Wiener deconvolution is very similar to a zero-mean cross-correlation product. This similarity appears when performing these operations in the Fourier domain.

Considering a signal image I and a reference image R, their two-dimensional Fourier transform are then written $\hat{I}$ and $\hat{R}$. The Fourier transform of their cross-correlation is then $F = \hat{R}^* \hat{I}$ where $\widehat{R^*}$ is the complex conjugate of R. By comparison, the Fourier transform of the Wiener deconvolution of S by R is:

$$W = \frac{R * I}{\sigma^2 + R^2}.$$

Here the term $\sigma^2$ is an average signal to noise ratio. Note that both the cross-correlation product and Wiener deconvolution are slightly dissymmetric in R and I. For our data treatment exchanging the role of R and I does not change significantly the result. Our preliminary data presented below are obtained using Wiener deconvolution.

In practice, intensity patterns obtained at different propagation directions are only orthogonal in a statistical sense. Consequently, there may be some cross-talk between angular channels. To reduce these cross-talk Iterative Wiener deconvolution can be implemented to suppress the cross talk effect. In this implementation, an estimate of $\beta_j$ and $\vec{r}_j$ are first deduced from the translation image obtained thanks to a Wiener deconvolution. Second, assuming the expected signal intensity pattern is numerically rebuilt according to equation (1). As a third step, the expected signal intensity pattern is compared to the actual experimental signal intensity pattern and differences are sent as an input for step 1. Steps 1 to 3 can then be iterated.

A more elaborated compressed sensing algorithms can also be used, taking into account that a given propagation directions can only be responsible for a single peak. Such algorithms are optimized to simultaneously minimize two quantities, one of which being the root mean squared error between the experimental data (the signal intensity beam) and the rebuilt data. The other quantity to be minimized here is the number of non-zero coefficients in each translation image. More elaborated reconstruction algorithms may be used among which all techniques relying on matrix inversion: Moore-Penrose pseudo-inversion, singular value decomposition (also called principal component analysis), Tikhonov regularization etc. For instance, principal component analysis was used in N. K. Metzger et al., Nat Commun 8:15610 (2017) to make a very sensitive spectrometer. Such a matrix pseudo-inversion can be achieved the following way. In the Fourier domain, equation (1) can be written:

$$F(I)(\vec{k}) = \sum_{j=1}^{n} \beta_j R_j(\vec{k}) e^{-i\vec{k}\cdot\vec{r}_j}$$

Where $R_n(\vec{k})$ are the 2D Fourier transforms of reference intensity patterns, we then have:

$$R_n^*(\vec{k})F(I)(\vec{k}) = \sum_{j=1}^{n} \beta_j R_n^*(\vec{k}) R_j(\vec{k}) e^{-i\vec{k}\cdot\vec{r}_j}$$

Which can be simply re-written as a matrix equation to invert:

$$V_I(\vec{k}) = M(\vec{k}) V_O(\vec{k})$$

Where $V_I = R_n^* F(I)$, $M_{n,j} = R_n^* R_j$ and $V_O(\vec{k}) = \beta_j e^{-i\vec{k}\cdot\vec{r}_j}$.

The present invention is not limited to these embodiments, and various variations and modifications may be made without departing from its scope.

The invention claimed is:

1. A method for determining wavefront shapes of N angular channels $C_L$ of different propagation directions $P_L$, said propagation directions $P_L$ being determined by a mean propagation direction vector $\vec{u}_L$, from a single signal image acquisition I(x,y) of a multi-angular signal light beam containing said angular channels, each angular channel Ci being separated from other angular channels Cj by an angular separation $\Delta\alpha_{ij}$ defined by $\Delta\alpha_{ij}=\arccos(\vec{u}_i \cdot \vec{u}_j)$, where "." stands for the inner product between $\vec{u}_i$ and $\vec{u}_j$, with a device comprising an optical assembly made at least of an optical mask and an imaging sensor for generating and recording intensity patterns of incident beams, by having these beams reflect on, or propagate through, the optical mask, the optical mask having the optical properties:
  i) to cause the intensity pattern to depend on the wavefront shape, so that a tilt applied to the wavefront shape, with said tilt being smaller than an angular memory effect $\delta\alpha$ of said optical mask, results in a local displacement amount of the intensity pattern, and
  ii) for two incident beams $M_n$, $M_m$ of respective propagation directions $P_n$, $P_m$ determined by mean propagation direction vectors $\vec{u}_n$ and $\vec{u}_m$, respectively, said incident beams $M_n$, $M_m$ having a same wavefront shape and separated from each other by a separation angle defined by $\Delta\alpha_{mn}=\arccos(\vec{u}_m \cdot \vec{u}_n)$ larger than the angular memory effect $\delta\alpha$, ie $\Delta\alpha_{mn}>\delta\alpha$, to produce uncorrelated intensity patterns over a surface area A of the imaging sensor, two uncorrelated random intensity patterns being defined as statistically orthogonal relatively to a zero-mean cross-correlation product, the angular memory effect $\delta\alpha$ being smaller than angular separations $\Delta\alpha_{ij}$ of angular channels $C_L$:

$$\delta\alpha > \Delta\alpha_{ij}, \text{ for all } i, j \in [1, N], \text{ with } i \neq j$$

the method comprising:
  a) providing several reference intensity patterns $R_L(x,y)$, wherein each reference intensity pattern $R_L(x,y)$ corresponds to a respective propagation direction $P_L$, L varying between 1 and N, x and y being coordinates,
  b) recording one single signal image I(x,y) of the intensity pattern generated by said multi-angular signal light beam which comprises the N propagation directions $P_L$ using the device, the single signal image I(x,y) being representative of light impinging on the at least one surface area (A);
  c) computing intensity-weight data $W_L'(x,y)$ and deformation data $T_L'(x,y)$, for all L varying from 1 to N, the intensity-weight data $W_L'(x,y)$ and the deformation data $T_L'(x,y)$ being representative of an intensity modulation and a diffeomorphism, respectively, of each given reference intensity pattern $R_L(x,y)$, at propagation direction $P_L$ for the single signal image I(x,y), all the N intensity-weight data $W_L'(x,y)$ and the N deformation data $T_L'(x,y)$ being computed, for L varying from 1 to N, so as to minimize, for all sampling points (x, y) of the surface area A, from the single signal image I(x,y):

a difference $D_A$ between the single signal image I(x,y) on the one hand, and the sum of reference intensity patterns $R_L$ multiplied by intensity-weight data $W_L'(x,y)$ and deformed by deformation data $T_L'(x,y)$, on the other hand:

N $$D_A = \left\| I(x,y) - \sum_{L=1}^{N} W_L^J(x,y) R_L[(x,y) + T_L^J(x,y)] \right\|_A$$

the symbol $\|.\|_A$ designating a norm calculated for all (x, y) sampling points in the surface area A;

for the surface A, each given reference intensity patterns $R_L(x,y)$ being orthogonal to each reference intensity pattern $R_K(x,y)$ relatively to the zero-mean cross-correlation product, when K natural number different from L and chosen between [1; N];

d) generating data for each propagation direction $P_L$ representative of:

the shape of the wavefront by integrating the deformation data $T_L^I(x,y)$, the intensity map based on the weight $W_L^I(x,y)$.

2. The method according to claim 1, comprising at step a), recording said reference intensity patterns $R_L(x,y)$ using the device, each reference intensity pattern $R_L(x,y)$ being generated by a respective reference incident beam L with propagation direction $P_L$, L varying from 1 to N.

3. The method according to claim 1, the optical mask comprising a diffuser, an engineered pseudo-diffuser, a diffractive element, an optical fiber bundle, a metasurface, a freeform optical element an array of micro-optical elements, each micro-optical element generating on the imaging sensor an intensity pattern different from the intensity pattern generated by the micro-optical elements located at least in its vicinity, an array of micro-lenses with random aberration or an array of micro-lenses randomly arranged spatially, or any combination thereof.

4. The method according to claim 1, wherein the imaging sensor is a matrix imaging sensor, the surface A being a sum of a macro-pixels Ai $A=\Sigma A_i$, The method comprising in step c):

computing intensity-weight data $W_L^I(Ai)$ and deformation data $T_L^I(Ai)$ which are constant for the macro-pixel of surface Ai, for all L varying from 1 to N, by minimizing the difference $D_{Ai}$ updating the intensity-weight data $W_L^I(x,y)$ and the deformation data $T_L^I(x,y)$ for all coordinates (x,y) on the surface A, with $W_L^I(x,y)=W_L^I(Ai)$ and $T_L^I(x,y)=T_L^I(Ai)$ for all (x,y) belongs to Ai.

5. The method according claim 4, wherein an estimate of $T_L^I(Ai)$ and $W_L^I(Ai)$ and of the minimum of the difference $D_{Ai}$ is obtained by computing zero-mean cross-correlation product images for each macropixel of surface Ai, $D_{Ai}$ being defined relatively to the norm $\|.\|_{Ai}$, between the signal image I(x,y) and each of the reference intensity patterns $R_L(x,y)$ with (x,y) coordinates of the portion $A_i$, the zero-mean cross-correlation product image between the signal sub-image and each of the reference intensity patterns having a peak, the intensity-weight data $W_L^I(A_i)$ being the amplitude of the peak and the deformation data $T_L^I(A_i)$ being the displacement vector between the said peak or its centroid, from the center of the zero-mean cross-correlation product image.

6. The method according to claim 4, wherein an estimate of $T_L^I(A_i)$ and $W_L^I(A_i)$ and of the difference $D_A$ is obtained by computing a Wiener deconvolution for each macropixel of surface Ai, $D_{Ai}$ being defined relatively to the norm $\|.\|_{Ai}$, the Wiener deconvolution possibly relating to:

a Wiener deconvolution of the signal sub-images by the reference intensity patterns $R_L(x,y)$, or a Wiener deconvolution of the reference intensity patterns $R_L(x,y)$ by the signal sub-images.

7. The method according to claim 4, wherein an estimate of $T_L^I(A_i)$ and $W_L^I(A_i)$ and of the difference $D_{Ai}$ is obtained for each macropixel of surface Ai, by computing a matrix inversion algorithm, $D_{Ai}$ being defined relatively to the norm $\|.\|_{Ai}$, wherein the matrices to be inverted being related to at least a transform of a sub-image of an intensity pattern $R_L(x,y)$, such as a Fourier transform.

8. The method according to any one of claim 1, wherein an estimate of the difference DA is obtained by computing intensity-weight data $W_L^I(x,y)$ and deformation data $T_L^I(x,y)$ thanks to an iterative optimization algorithm or thanks to a compressed sensing algorithm.

9. The method according to any one of claim 1, wherein an estimate of $T_L^I(x,y)$ and $W_L^I(x,y)$ and of $D_A$ is computed thanks to deep learning approaches using neuronal networks which minimize $D_A$ with a collection of signal images, references images with respective N wavefronts known.

10. The method according to any one of claim 1, wherein intensity-weight data $W_L^I(x,y)$ and deformation data $T_L^I(x,y)$ are computed thanks to a genetic algorithm with a collection of would-be solutions are tested, evaluated, selected for minimizing the value of DA.

11. The method according to claim 1, wherein measured wavefront shapes are characteristic of some aberrations introduced by an optical system, a biological tissue or the atmosphere.

12. The method according to claim 1, wherein the multi-angular signal light beam is generated by illuminating a polarization assembly located before the optical assembly by an initial light beam containing at least one angular channel, the polarization assembly containing at least one polarization optic, notably a quarter wave-plate, a half-waveplate, a polarizer, a Wollaston prism, a Glan-Taylor polarizer, a Glan-Thomson polarizer, a Rochon prism a Nomarski prism or any other polarization dependent optic, so that different polarization states of the initial light beam are encoded into different angular channels CL of the multi-angular signal light beam.

13. A method for determining wavefront shapes of N angular channels $C_L$ of different propagation directions $P_L$, said propagation directions $P_L$, said propagation directions being determined by a mean propagation direction vector $\vec{u_L}$, from a single signal image I(x,y) acquisition of a multi-angular signal light beam containing said angular channels $\alpha_L$, each angular channel Ci being separated from other angular channels Cj by an angular separation $\Delta\alpha_{ij}$, defined by $\Delta\alpha_{ij}=\arccos(\vec{u_i}\cdot\vec{u_j})$, where "·" stands for the inner product between $\vec{u_i}$ and $\vec{u_j}$, with a device comprising an optical assembly made at least of an optical mask and an imaging sensor for generating and recording intensity patterns of incident beams, by having these beams reflect on, or propagate through, the optical mask, the optical mask having the optical properties:

i) to cause the intensity pattern to depend on the wavefront shape, so that a tilt applied to the wavefront shape, with said tilt being smaller than an angular memory effect $\delta\alpha$ of said optical mask, results in a local displacement amount of the intensity pattern, and ii) for two incident beams $M_n$ and $M_m$ of respective propagation directions $P_n$, $P_m$ determined by mean propagation direction vectors $\vec{u_n}$ and $\vec{u_m}$, respectively, said incident beams Mn and Mm having a same wavefront shape and separated from each other by a separation angle $\Delta\alpha_{mn}=\arccos(\vec{u_m}\cdot\vec{u_n})$ smaller than the an angular memory effect $\delta\alpha$, ie $\Delta\alpha_{mn}<\delta\alpha$, to produce uncorrelated intensity patterns over at least one surface area $A_n$ of the imaging sensor, the surface area $A_n$ having a largest spatial extent $L_{A_n}$ smaller that $\Delta\alpha_{mn}\cdot d$, with d being a separation distance between the optical mask and the imaging sensor, two uncorrelated random intensity patterns being defined as statistically orthogonal relatively to a zero-mean cross-correlation product, the angular memory effect $\delta\alpha$ being larger than angular separations $\Delta\alpha_{ij}$ of angular channels $C_L$:

$$\delta\alpha > \Delta\alpha_{ij}, \text{ for all } i, j \in [1, N], \text{ with } i \neq j$$

the method comprising, a) providing several reference intensity patterns $R_L(x, y)$, wherein each reference intensity pattern $R_L(x,y)$ corresponds to a respective propagation direction $P_L$, L varying from 1 to N, x and y are coordinates;

b) recording one single signal image I(x,y) of the intensity pattern generated by said multi-angular signal light beam which comprises the N propagation directions, using the device, the single signal image I(x,y) being representative of light impinging on a surface area A of the imaging sensor; the surface A comprising the at least one surface portion $A_n$;

e) for the at least one surface portion $A_n$:

i) extracting a signal sub-image I'(x,y), representative of light impinging on the at least one surface portion $A_n$, from the single signal image I(x,y):

$$I(x, y) = I'(x, y) \text{ with } (x, y) \in A_n,$$

ii) computing intensity-weight data $W_L^I(x,y)$ and deformation data $T_L^I(x,y)$, with (x, y) coordinates of the surface portion $A_n$, for all L varying from 1 to N, the intensity-weight data $W_L^I(x,y)$ and the deformation data $T_L^I(x,y)$ being representative of an intensity modulation and a diffeomorphism, respectively, of each given reference intensity pattern $R_L(x,y)$, at propagation directions $P_L$, for the signal sub-image I'(x,y), all the N intensity-weight data $W_L^I(x,y)$ and the N deformation data $T_L^I(x,y)$ being computed, for L varying from 1 to N, so as to minimize, for all sampling points (x, y) of the surface portion $A_n$, from the signal sub-image I'(x,y):

a difference $D_{A_n}$ between the single signal image I(x,y) on the one hand, and the sum of reference intensity patterns $R_L$ multiplied by intensity-weight data $W_L^I(x,y)$ and deformed by deformation data $T_L^I(x,y)$, on the other hand:

$$D_{A_n} = \left\| I'(x, y) - \sum_{L=1}^{N} W_L^I(x, y) R_L \left[ (x, y) + T_L^I(x, y) \right] \right\|_{A_n}$$

the symbol $\|.\|_{A_n}$ designating a norm calculated for all (x, y) sampling points in the surface portion $A_n$;

for the surface portion $A_n$, each given reference intensity patterns $R_L(x,y)$ being orthogonal to each reference intensity pattern $R_K(x,y)$ relatively to the zero-mean cross-correlation product, when K natural number different from L and chosen between [1; N];

iii) generating data for each propagation direction $P_L$ representative of:

the shape of the wavefront by integrating the deformation data $T_L^I(x,y)$, the intensity map based on the weight $W_L^I(x,y)$.

14. Method according to claim 13, comprising at step a), recording said reference intensity patterns $R_L(x,y)$ using the device, each reference intensity pattern $R_L(x,y)$ being generated by a respective reference incident beam L with propagation directions $P_L$ L varying from 1 to N.

15. The method according to claim 13, comprising at step a):

recording at least one reference intensity patterns $R_K(x,y)$, using the device, K being between 1 and N; and if necessary, generating numerically the other intensity patterns $R_L(x,y)$, L being between 1 and N different from K, using the recorded intensity pattern $R_K(x,y)$.

16. The method according to claim 15, the other intensity patterns $R_L(x,y)$ being generated numerically by applying a simple translation transformation to the recorded reference intensity pattern $R_K(x,y)$.

17. The method according to any one of claim 15, at step a) generating the reference intensity patterns comprises:

achieving a cross-correlation product of the single signal image I(x, y) and the recorded reference pattern $R_K(x, y)$, the cross-correlation product image between the signal image and each of the recorded intensity patterns $R_K(x,y)$ having N maxima, and shifting spatially the recorded reference pattern $R_K(x,y)$ to the corresponding position based on each maximum position to generate the corresponding reference intensity pattern reference $R_L(x,y)$.

18. The method according to claim 13, comprising at step a):

recording a reference intensity pattern $R_K(x,y)$ corresponding to a propagation direction $P_K$ different from the propagation directions $P_L$ contained in the single signal image I(x,y) using the device, and generating numerically the all N intensity patterns $R_L(x,y)$ using the recorded intensity pattern Rk (x,y), with L varying from 1 to N.

19. The method according to any one of claim 18, at step a) generating the reference intensity patterns comprises:

achieving a cross-correlation product of the single signal image I(x, y) and the recorded reference pattern $R_K(x, y)$, the cross-correlation product image between the signal image and each of the recorded intensity patterns $R_K(x,y)$ having N maxima, and shifting spatially the recorded reference pattern $R_K(x,y)$ to the corresponding position based on each maximum position to generate the corresponding reference intensity pattern reference $R_L(x,y)$.

20. The method according to claim 13, the optical mask comprising a diffuser, an engineered pseudo-diffuser, a diffractive element, an optical fiber bundle, a metasurface, a freeform optical element an array of micro-optical elements, each micro-optical element generating on the imaging sensor an intensity pattern different from the intensity pattern generated by the micro-optical elements located at least in its vicinity, an array of micro-lenses with random aberration or an array of micro-lenses randomly arranged spatially, or any combination thereof.

21. The method according to claim 13, wherein the imaging senor is a matrix imaging sensor, the surface A being as a sum of a plurality of surface portions An, each surface portion An having a largest spatial extent $L_{A_n} < \Delta\alpha_{ij} \cdot d$, for all i, j∈ [1, N], with i≠j:

$$A = \sum_n A_n$$

the method comprising at step c, computing intensity-weight data $W_L^I(A_n)$ and deformation data $T_L^I(A_n)$ for each surface portion $A_n$, for all L varying from 1 to N, by minimizing the differences $D_{A_n}$ for each surface portion $A_n$.

22. The method according to claim 13, wherein the multi-angular signal light beam is generated by illuminating a polarization assembly located before the optical assembly by an initial light beam containing at least one angular channel, the polarization assembly containing at least one polarization optic, so that different polarization states of the initial light beam are encoded into different angular channels CL of the multi-angular signal light beam.

23. Use of a multi-angular wavefront sensor for a multi-angular signal light beam according to claim 22, in:
   Optical metrology;
   Diffraction Tomography;
   Quantitative phase microscopy (Biology, chemistry . . . );
   Adaptive optics;
   Ophthalmology.

24. A wavefront sensor for a multi-angular signal light beam from a single image acquisition of the said multi-angular signal light beam, said multi-angular light beam comprising N angular channels of different propagation directions $P_L$, said propagation directions $P_L$ being determined by a mean propagation direction vector $\vec{u_L}$, each angular channel Ci being separated from other angular channels Cj by an angular separation $\Delta\alpha_{ij}$ defined by $\Delta\alpha_{ij}=\arccos(\vec{u_i}\cdot\vec{u_j})$, where "·" stands for the inner product between $\vec{u_i}$ and $\vec{u_j}$, the wavefront sensor comprising an optical assembly made at least of:
an optical mask and an imaging sensor for generating and recording intensity patterns of incident beams, by having these beams reflect on, or propagate through, the optical mask,
the optical mask having the optical properties:
i) to cause the intensity pattern to depend on the wavefront shape, so that a tilt applied to the wavefront shape, with said tilt being smaller than an angular memory effect $\delta\alpha$ of said optical mask, results in a local displacement amount of the intensity pattern, and
ii) for two incident beams $M_n$, $M_m$ of respective propagation directions $P_n$, $P_m$ determined by mean propagation direction vectors $\vec{u_n}$ and $\vec{u_m}$ respectively, said incident beams $M_n$, $M_m$ having a same wavefront shape and separated from each other by a separation angle defined by $\Delta\alpha_{mn}=\arccos(\vec{u_m}\cdot\vec{u_n})$ larger than the angular memory effect $\delta\alpha$, ie $\Delta\alpha_{mn}>\delta\alpha$, to produce uncorrelated intensity patterns over a surface area A of the imaging sensor,
two uncorrelated random intensity patterns being defined as statistically orthogonal relatively to a zero-mean cross-correlation product,
the angular memory effect $\delta\alpha$ being smaller than angular separations $\Delta\alpha_{ij}$ of angular channels $C_L$:

$$\delta\alpha > \Delta\alpha_{ij}, \text{ for all } i, j \in [1, N], \text{ with } i \neq j$$

the imaging sensor recording:
a) several reference intensity patterns $R_L(x,y)$, each reference intensity pattern $R_L(x,y)$ being generated by having a respective reference incident beam L with propagation directions $P_L$, reflect on or propagate through the optical mask L varying from 1 to N, x and y being coordinates;
b) one single signal image I(x,y) of the intensity pattern generated by having the multi-angular signal light beam which comprises the N propagation directions $P_L$ reflect on or propagate through the optical mask, the single signal image I(x,y) being representative of light impinging on the at least one surface area (A);
computing means for:
c) computing intensity-weight data $W_L^I(x,y)$ and deformation data $T_L^I(x,y)$, the intensity-weight data $W_L^I(x,y)$ and the deformation data $T_L^I(x,y)$ being representative of an intensity modulation and a diffeomorphism, respectively, of each reference intensity pattern at propagation direction $P_L$,
the intensity-weight data $W_L^I(x,y)$ and the deformation data $T_L^I(x,y)$ being computed so that to minimize, for the at least one surface area A, a quantity that depends on the differences $D_A$ between the single signal image I(x,y) on the one hand, and the sum of reference intensity patterns $R_L(x,y)$ multiplied by intensity-weight data $W_L^I(x,y)$ and deformed by deformation data $T_L^I(x,y)$, on the other hand:

$$D_A = \left\| I(x,y) - \sum_L W_L^I(x,y) R_L\left[(x,y) + T_L^I(x,y)\right] \right\|_A$$

the symbol $\|.\|_A$ designating a norm calculated for all (x, y) sampling points in the surface area A;
d) generating data for each propagation direction $P_L$ inclination angle representative of:
the shape of the wavefront by integrating the deformation data $T_L^I(x,y)$,
the intensity map based on the weight $W_L^I(x,y)$.

25. The wavefront sensor according to claim 24, the optical mask comprising a diffuser, an engineered pseudo-diffuser, a diffractive element, an optical fiber bundle, a metasurface, a freeform optical element an array of micro-optical elements, each micro-optical element generating on the imaging sensor an intensity pattern different from the intensity pattern generated by the micro-optical elements located at least in its vicinity, an array of micro-lenses with random aberration or an array of micro-lenses randomly arranged spatially, or any combination thereof.

26. The wavefront sensor according to claim 24, the computing means being configured for:
extracting signal sub-images, each representative of light impinging on a portion A' of the at least one surface area, from the single signal image I(x,y);
estimating deformation data $T_L^I(x,y)$ for each sub-image and for every propagation direction $P_L$ by:
i) computing the intensity-weight data $W_L^I(x,y)$ and the deformation data $T_L^I(x,y)$ between the signal sub-image and each of the reference intensity patterns $R_L(x,y)$ so as to minimize, for the corresponding surface area A', a quantity that depends on the differences $D_{A'}$;
ii) updating the deformation data $T_L^I(x,y)$ by storing the deformation data $T_L^I(x,y)$ at at least one point (x,y) inside said surface area A'.

27. The wavefront sensor according to claim 24, the computing means being configured to estimate the deformation data $T_L^I(x,y)$ by computing zero-mean cross-correlation product images, for each signal sub-image, between the signal sub-image and each of the reference intensity patterns $R_L(x,y)$, the plurality of reference incident beams L being uncorrelated relatively to the zero-mean cross-correlation product, the zero-mean cross-correlation product image between the signal sub-image and each of the reference intensity patterns $R_L(x,y)$ having a peak and the displacement amount being the distance between the said peak, or its centroid, from the center of the zero-mean cross-correlation product image.

28. The wavefront system according to claim 24, the computing means being configured to compute the intensity-weight data $W_L^I(x,y)$ and the deformation data $T_L^I(x,y)$ thanks to:
a Wiener deconvolution of the signal sub-images by the reference intensity patterns $R_L(x,y)$, or
a Wiener deconvolution of the reference intensity patterns $R_L(x,y)$ by the signal sub-images.

29. Use of a multi-angular wavefront sensor for a multi-angular signal light beam according to claim 28, in:
Optical metrology;
Diffraction Tomography;
Quantitative phase microscopy (Biology, chemistry . . . );
Adaptive optics;
Ophthalmology.

30. Optical device with:
a wavefront sensor according to claim 24,
a single light emitting source or an assembly of light emitting sources for generating a multi-angular signal light beam with specific propagation directions.

31. Optical device according to claim 30, comprising a polarization assembly located before the optical assembly, the polarization assembly comprising at least one polarization optic.

32. A wavefront sensor for a multi-angular signal light beam from a single image acquisition of the said multi-angular signal light beam, said multi-angular light beam comprising N angular channels of different propagation directions $P_L$, said propagation directions $P_L$ being determined by a mean propagation direction vector $\vec{u_L}$, each angular channel Ci being separated from other angular channels Cj by an angular separation $\Delta\alpha_{ij}$ defined by $\Delta\alpha_{ij}=\arccos(\vec{u_i}.\vec{u_j})$, where "·" stands for the inner product between $\vec{u_i}$ and $\vec{u_j}$, The wavefront sensor comprising an optical assembly made at least of:
an optical mask and an imaging sensor for generating and recording intensity patterns of incident beams, by having these beams reflect on, or propagate through, the optical mask,
the optical mask having the optical properties:
i) to cause the intensity pattern to depend on the wavefront shape, so that a tilt applied to the wavefront shape, with said tilt being smaller than an angular memory effect $\delta\alpha$ of said optical mask, results in a local displacement amount of the intensity pattern, and
ii) for two incident beams $M_n$ and $M_m$ of respective propagation directions $P_n$, $P_m$ determined by mean propagation direction vectors $\vec{u_n}$ and $\vec{u_m}$, respectively, said incident beams Mn and Mm having a same wavefront shape and separated from each other by a separation angle $\Delta\alpha_{mn}=\arccos(\vec{u_m}.\vec{u_n})$ smaller than the an angular memory effect $\delta\alpha$, ie $\Delta\alpha_{mn}<\delta\alpha$, to produce uncorrelated intensity patterns over at least one surface area $A_n$ of the imaging sensor, the surface area $A_n$ having a largest spatial extent $L_{A_n}$ smaller that $\Delta\alpha_{mn}\cdot d$, with d being a separation distance between the optical mask and the imaging sensor, two uncorrelated random intensity patterns being defined as statistically orthogonal relatively to a zero-mean cross-correlation product,
the angular memory effect $\delta\alpha$ being larger than angular separations $\Delta\alpha_{ij}$ of angular channels $C_L$:

$$\delta\alpha > \Delta\alpha_{ij}, \text{ for all } i, j \in [1, N], \text{ with } i \neq j$$

the imaging sensor recording:
a) at least one reference intensity patterns $R_L(x,y)$, the reference intensity pattern $R_L(x,y)$ being generated by having a respective reference incident beam L with propagation b directions $P_L$, reflect on or propagate through the optical mask L varying from 1 to N, x and y being coordinates;
b) one single signal image $I(x,y)$ of the intensity pattern generated by having the multi-angular signal light beam which comprises at least the N propagation directions $P_L$ reflect on or propagate through the optical mask, the single signal image $I(x,y)$ being representative of light impinging on at least one surface area A comprising the at least one surface portion $A_n$;
computing means for:
c) if necessary generating numerically one or several reference intensity patterns $R_L(x,y)$ using the recorded reference pattern $R_K(x,y)$,
d) for the at least one surface $A_n$:
i) extracting a signal sub-image $I'(x,y)$, representative of light impinging on the at least one surface $A_n$, from the single signal image $I(x,y)$:

$$I(x, y) = I'(x, y) \text{ with } (x, y) \in A_n,$$

ii) computing intensity-weight data $W_L^I(x,y)$ and deformation data $T_L^I(x,y)$, with (x, y) coordinates of the surface portion $A_n$, for all L varying from 1 to N, the intensity-weight data $W_L^I(x,y)$ and the deformation data $T_L^I(x,y)$ being representative of an intensity modulation and a diffeomorphism, respectively, of each given reference intensity pattern $R_L(x,y)$, at propagation direction $P_L$, for the signal sub-image $I'(x,y)$,
all the N intensity-weight data $W_L^I(x,y)$ and the N deformation data $T_L^I(x,y)$ being computed, for L varying from 1 to N, so as to minimize, for all sampling points (x, y) of the surface area $A_n$, from the signal sub-image $I'(x,y)$:
a difference $D_{A_n}$ between the single signal image $I(x,y)$ on the one hand, and the sum of reference intensity patterns $R_L$ multiplied by intensity-weight data $W_L^I(x,y)$ and deformed by deformation data $T_L^I(x,y)$, on the other hand:

$$D_{A_n} = \left\| I'(x, y) - \sum_{L=1}^{N} W_L^I(x, y) R_L[(x, y) + T_L^I(x, y)] \right\|_{A_n}$$

the symbol $\|.\|_{A_n}$ designating a norm calculated for all (x, y) sampling points in the surface area $A_n$;

for the surface $A_n$, each given reference intensity patterns $R_L(x,y)$ being orthogonal to each reference intensity pattern $R_K(x,y)$ relatively to the zero-mean cross-correlation product, when K natural number different from L and chosen between [1; N];

iii) generating data for each propagation direction $P_L$ representative of:

the shape of the wavefront by integrating the deformation data $T_L^I(x,y)$, the intensity map based on the weight $W_L^I(x,y)$.

33. The wavefront according to the claim 32, wherein the computing means being configured for:

splitting the surface A of the imaging sensor into a plurality of surface portion $A_n$ having a largest spatial extent $L_{An} < \Delta\alpha_{ij}$, for all i, j∈[1, N], with i≠j, estimating deformation data $T_L^I(x,y)$ for each sub-image and for every propagation direction $P_L$ by:

i) computing the intensity-weight data $W_L^I(x,y)$ and the deformation data $T_L^I(x,y)$ between the signal sub-image and each of the reference intensity patterns $R_L(x,y)$ so as to minimize, for the corresponding surface portion $A_n$, a quantity that depends on the differences $D_{An}$;

ii) updating the deformation data $T_L^I(x,y)$ by storing the deformation data $T_L^I(x,y)$ at at least one point (x,y) inside said surface portion $A_n$.

34. Optical device with:

a wavefront sensor according to claim 32, a single light emitting source or an assembly of light emitting sources for generating a multi-angular signal light beam with specific propagation directions.

* * * * *